United States Patent
Luo et al.

(10) Patent No.: US 12,414,186 B2
(45) Date of Patent: Sep. 9, 2025

(54) WIRELESS DATA TRANSMISSION METHOD AND RELATED DEVICE THEREOF

(71) Applicant: Huawei Technologies Co., Ltd., Shenzhen (CN)

(72) Inventors: Hao Luo, Wuhan (CN); Yang Zhou, Wuhan (CN); Liang Ning, Xi'an (CN); Qiuyu Wu, Wuhan (CN); Jin Liu, Wuhan (CN)

(73) Assignee: HUAWEI TECHOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 18/006,513

(22) PCT Filed: Jul. 26, 2021

(86) PCT No.: PCT/CN2021/108501
§ 371 (c)(1),
(2) Date: Jan. 23, 2023

(87) PCT Pub. No.: WO2022/022474
PCT Pub. Date: Feb. 3, 2022

(65) Prior Publication Data
US 2023/0284319 A1    Sep. 7, 2023

(30) Foreign Application Priority Data
Jul. 28, 2020  (CN) .......................... 202010738834.8

(51) Int. Cl.
*H04W 76/20*    (2018.01)
*H04B 17/318*   (2015.01)

(52) U.S. Cl.
CPC .......... *H04W 76/20* (2018.02); *H04B 17/328* (2023.05)

(58) Field of Classification Search
CPC ..... H04W 76/20; H04W 48/18; H04W 88/06; H04W 88/10; H04W 36/0085;
(Continued)

(56) References Cited

U.S. PATENT DOCUMENTS

| 11,063,675 | B2* | 7/2021 | Silverman | H04B 17/382 |
| 2015/0271829 | A1* | 9/2015 | Amini | H04W 24/02 |
| | | | | 370/329 |
| 2015/0351096 | A1* | 12/2015 | Sidhu | H04W 72/0453 |
| | | | | 370/329 |

FOREIGN PATENT DOCUMENTS

| CN | 104125615 A | 10/2014 |
| CN | 105228133 A | 1/2016 |

(Continued)

*Primary Examiner* — Huy C Ho
(74) *Attorney, Agent, or Firm* — Conley Rose, P.C.

(57) ABSTRACT

A method includes a first electronic device that detects a signal strength when the first electronic device communicates with a second electronic device, and determines whether the signal strength is less than a preset value. When the signal strength is less than the preset value, the first electronic device determines a current service state of the second electronic device, and determines, based on the current service state, working modes including a first working mode and a second working mode that respectively correspond to the first electronic device and the second electronic device and that are suitable for the current service state. The first electronic device switches a working mode of the first electronic device to the determined first working mode, and sends an instruction to indicate to the second electronic device to switch a working mode of the second electronic device to the second working mode.

20 Claims, 38 Drawing Sheets

(58) Field of Classification Search
CPC ..... H04W 36/06; H04W 36/14; H04W 36/30; H04B 17/328; Y02D 30/70
USPC .......................................................... 370/329
See application file for complete search history.

(56) References Cited

FOREIGN PATENT DOCUMENTS

| | | |
|---|---|---|
| CN | 105656500 A | 6/2016 |
| CN | 106604339 A | 4/2017 |
| CN | 106658571 A | 5/2017 |
| CN | 107295571 A | 10/2017 |
| CN | 107566015 A | 1/2018 |
| CN | 107682882 A | 2/2018 |
| CN | 108337699 A | 7/2018 |
| CN | 108834223 A | 11/2018 |
| CN | 109474968 A | 3/2019 |
| CN | 109640310 A | 4/2019 |
| CN | 109982399 A | 7/2019 |
| CN | 110233937 A | 9/2019 |
| CN | 110518950 A | 11/2019 |
| CN | 112105068 A | 12/2020 |
| WO | 2017166609 A1 | 10/2017 |
| WO | 2019183760 A1 | 10/2019 |

* cited by examiner

WIRELESS DATA TRANSMISSION METHOD AND RELATED DEVICE THEREOF

CROSS-REFERENCE TO RELATED APPLICATIONS

This is a U.S. National Stage of International Patent Application No. PCT/CN2021/108501 filed on Jul. 26, 2021, which claims priority to Chinese Patent Application No. 202010738834.8 filed on Jul. 28, 2020. Both of the aforementioned applications are hereby incorporated by reference in their entireties.

TECHNICAL FIELD

Embodiments of the present invention relate to the field of wireless communications technologies, and in particular, to a wireless data transmission method and a related device thereof.

BACKGROUND

In wireless, 2.4G or 5G specifically refers to a signal transmission frequency band. A 2.4G frequency band is a technical standard based on IEEE 802.11b, and ranges from 2.400 GHz to 2.4835 GHz. A 5G frequency band is a technical standard based on IEEE 802.11ac, and ranges from 5.15 GHz to 5.825 GHz. A comparison between a 2.4G wireless signal and a 5G wireless signal is as follows: The 2.4G wireless signal works on the 2.4 GHz frequency band, has a low frequency and a long wavelength, is relatively slightly attenuated when being propagated in air or an obstacle, and may be propagated over a longer distance. However, the 2.4G signal has a relatively narrow bandwidth. Most household appliances and wireless devices use the 2.4G frequency band. There is a relatively congested wireless environment and relatively strong interference. The 5G Wi-Fi signal has a relatively wide bandwidth, there is a relatively clean wireless environment, weak interference, and a stable network rate, and a higher wireless rate may be supported. In addition, the 5G signal has a relatively high frequency, is relatively greatly attenuated when being propagated in air or an obstacle, and has a coverage distance that is usually shorter than that of the 2.4G signal.

In an actual application scenario, when an AP communicates with a STA on the 5G frequency band, and a location of the STA changes with movement of a user, there may be poor signal connection strength between the STA and the AP due to a limited coverage area of a 5G signal. Consequently, communication quality deteriorates. When the AP communicates with the STA on the 2.4G frequency band, and there are a relatively large quantity of access devices, a wireless signal is prone to interference due to a relatively narrow signal bandwidth. Consequently, there is a decrease in a network rate, and communication quality deteriorates.

SUMMARY

Embodiments of this application provide a wireless data transmission method and a related device thereof, to improve communication quality and data transmission efficiency by using a throughput advantage and an anti-interference feature of a 5G frequency band and an advantage of a strong coverage capability of a 2.4G frequency band.

According to a first aspect of the embodiments of this application, a wireless data transmission method is provided. The method includes the following steps: A first electronic device detects signal strength existing when the first electronic device communicates with a second electronic device, and determines whether the signal strength is less than a preset value, where both the first electronic device and the second electronic device work in a first mode or a second mode; when the signal strength is less than the preset value, the first electronic device determines a current service state of the second electronic device, and determines, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band; and the first electronic device switches a working mode to the determined working mode that corresponds to the first electronic device and that is suitable for the current service state, and sends an instruction to indicate the second electronic device to switch a working mode to the determined working mode that corresponds to the second electronic device and that is suitable for the current service state.

In the foregoing embodiment, the working mode may be switched based on the service state, and a throughput advantage and an anti-interference feature of the 5G frequency band and an advantage of a strong coverage capability of the 2.4G frequency band are used. Therefore, communication quality and data transmission efficiency are improved, and a fault that an entire service is stalled and interrupted due to a weak wireless signal when transmission is performed on a single frequency band is avoided.

In a possible implementation of the first aspect of the embodiments of this application, that the first electronic device determines a current service state of the second electronic device includes at least one of the following: determining whether the service state is the first service state, where the first service state includes that a current service of the second electronic device is a preset service, and the preset service is a game service or a voice service; and determining which one of the second service state and the third service state is the service state, where the second service state is that an uplink service volume is greater than a downlink service volume, and the third service state is that a downlink service volume is greater than an uplink service volume.

In this embodiment, the method further includes at least one of the following: determining, by using a format of a data frame, whether the service state is the first service state; and determining, by using a data throughput, which one of the second service state and the third service state is the service state.

In a possible implementation of the first aspect of the embodiments of this application, that the first electronic device determines a current service state of the second electronic device includes at least one of the following: determining, based on the data throughput, which one of the first service state, the second service state, and the third service state is the service state, where the first service state is that a difference between an uplink service volume and a downlink service volume falls within a preset range; the second service state is that the uplink service volume is greater than the downlink service volume, and a difference is greater than a preset value; and the third service state is that the downlink service volume is greater than the uplink service volume, and a difference is greater than the preset value.

In the foregoing embodiment, when the first electronic device and the second electronic device are switched to the third mode, the fourth mode, or the fifth mode, a 2.4G channel or a 5G channel is added to perform data transmission, and advantages that a 2.4G signal can be transmitted over a long distance and a 5G signal has a high transmission rate are used. Therefore, overall communication quality and transmission efficiency are improved. In addition, a transmission frequency band is added, and therefore usage of an original data transmission frequency band can be reduced, and a transmission speed of data on the original frequency band is increased.

In a possible implementation of the first aspect of the embodiments of this application, the method further includes: when the second electronic device is in the first service state, and the working modes of both the first electronic device and the second electronic device are the third mode, the first electronic device sends same data on the 2.4G frequency band and the 5G frequency band.

In the foregoing embodiment, a same data packet is simultaneously transmitted on the 2.4G frequency band and the 5G frequency band, to reduce a packet loss rate. Therefore, a data transmission speed can be increased, and communication quality can be improved.

In a possible implementation of the first aspect of the embodiments of this application, after the first electronic device switches the working mode to the determined working mode that corresponds to the first electronic device and that is suitable for the current service state, and sends an instruction to indicate the second electronic device to switch the working mode to the determined working mode that corresponds to the second electronic device and that is suitable for the current service state, the method further includes: detecting whether communication quality is improved; and if the communication quality is improved, maintaining the working mode to perform data transmission; or if the communication quality is not improved, switching the working mode to the first mode or the second mode, and sending an instruction to indicate the second electronic device to switch the working mode to the first mode or the second mode.

In the foregoing embodiment, the communication quality is detected, and an effect of the working mode obtained after switching is evaluated, to select a working mode suitable for the current service state for data transmission.

In a possible implementation of the first aspect of the embodiments of this application, the method further includes: if the working modes of both the first electronic device and the second electronic device are the fourth mode or the fifth mode, the fourth mode is a fourth mode in a second state, and the fifth mode is a fifth mode in the second state, where the second state is a full-duplex data transmission manner.

According to a second aspect of the embodiments of this application, a wireless data transmission method is provided. In the method, a second electronic device detects signal strength existing when a first electronic device communicates with the second electronic device, and determines whether the signal strength is less than a preset value, where both the first electronic device and the second electronic device work in a first mode or a second mode; when the signal strength is less than the preset value, the second electronic device determines a current service state, and determines, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band; and the second electronic device switches a working mode to the determined working mode that corresponds to the second electronic device and that is suitable for the current service state, and sends an instruction to indicate the first electronic device to switch a working mode to the determined working mode that corresponds to the first electronic device and that is suitable for the current service state.

In the foregoing embodiment, the working mode may be switched based on the service state, and a throughput advantage and an anti-interference feature of the 5G frequency band and an advantage of a strong coverage capability of the 2.4G frequency band are used. Therefore, communication quality and data transmission efficiency are improved, and a fault that an entire service is stalled and interrupted due to a weak wireless signal when transmission is performed on a single frequency band is avoided.

In a possible implementation of the second aspect of the embodiments of this application, that the second electronic device determines a current service state includes at least one of the following: determining whether the service state is the first service state, where the first service state includes a state in which a current service of the second electronic device is a preset service, and the preset service is a game service or a voice service; and determining which one of the second service state and the third service state is the service state, where the second service state is that an uplink service volume is greater than a downlink service volume, and the third service state is that a downlink service volume is greater than an uplink service volume.

In this embodiment, the method further includes at least one of the following: determining, by using a format of a data frame, whether the service state is the first service state; and determining, by using a data throughput, which one of the second service state and the third service state is the service state.

In a possible implementation of the second aspect of the embodiments of this application, that the second electronic device determines a current service state includes at least one of the following: determining, based on a data throughput, which one of the first service state, the second service state, and the third service state is the service state, where the first service state is that a difference between an uplink service volume and a downlink service volume falls within a preset range; the second service state is that an uplink service volume is greater than a downlink service volume, and a difference is greater than a preset value; and the third service state is that a downlink service volume is greater than an uplink service volume, and a difference is greater than the preset value.

In the foregoing embodiment, when the first electronic device and the second electronic device are switched to the third mode, the fourth mode, or the fifth mode, a 2.4G channel or a 5G channel is added to perform data transmission, and advantages that a 2.4G signal can be transmitted over a long distance and a 5G signal has a high transmission rate are used. Therefore, overall communication quality and transmission efficiency are improved. In addition, a transmission frequency band is added, and therefore usage of an original data transmission frequency band can be reduced, and a transmission speed of data on the original frequency band is increased.

In a possible implementation of the second aspect of the embodiments of this application, the method further includes: when the second electronic device is in the first service state, and the working modes of both the first electronic device and the second electronic device are the third mode, the second electronic device sends same data on the 2.4G frequency band and the 5G frequency band.

In the foregoing embodiment, a same data packet is simultaneously transmitted on the 2.4G frequency band and the 5G frequency band, to reduce a packet loss rate. Therefore, a data transmission speed can be increased, and communication quality can be improved.

In a possible implementation of the second aspect of the embodiments of this application, after the first electronic device switches the working mode to the determined working mode that corresponds to the first electronic device and that is suitable for the current service state, and sends an instruction to indicate the second electronic device to switch the working mode to the determined working mode that corresponds to the second electronic device and that is suitable for the current service state, the method further includes, detecting whether communication quality is improved; and if the communication quality is improved, maintaining the working mode to perform data transmission; or if the communication quality is not improved, switching the working mode to the first mode or the second mode, and sending an instruction to indicate the first electronic device to switch the working mode to the first mode or the second mode.

In the foregoing embodiment, the communication quality is detected, and an effect of the working mode obtained after switching is evaluated, to select a working mode suitable for the current service state for data transmission.

According to a third aspect of the embodiments of this application, a first electronic device is provided. The first electronic device includes: a detection module, configured to: detect signal strength existing when the first electronic device communicates with a second electronic device, and determine whether the signal strength is less than a preset value, where both the first electronic device and the second electronic device work in a first mode or a second mode; and a processing module, configured to: when the signal strength is less than the preset value, determine a current service state of the second electronic device, and determine, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band, where the processing module is further configured to: switch a working mode to the determined working mode that corresponds to the first electronic device and that is suitable for the current service state, and send an instruction to indicate the second electronic device to switch a working mode to the determined working mode that corresponds to the second electronic device and that is suitable for the current service state.

In the foregoing embodiment, the working mode may be switched based on the service state, and a throughput advantage and an anti-interference feature of the 5G frequency band and an advantage of a strong coverage capability of the 2.4G frequency band are used. Therefore, communication quality and data transmission efficiency are improved, and a fault that an entire service is stalled and interrupted due to a weak wireless signal when transmission is performed on a single frequency band is avoided.

In a possible implementation of the third aspect of the embodiments of this application, that a processing module is configured to determine a current service state of the second electronic device includes at least one of the following: determining whether the service state is the first service state, where the first service state includes that a current service of the second electronic device is a preset service, and the preset service is a game service or a voice service; and determining which one of the second service state and the third service state is the service state, where the second service state is that an uplink service volume is greater than a downlink service volume, and the third service state is that a downlink service volume is greater than an uplink service volume.

In this embodiment, the processing module is further configured to: determine, by using a format of a data frame, whether the service state is the first service state; and determine, by using a data throughput, which one of the second service state and the third service state is the service state.

In a possible implementation of the third aspect of the embodiments of this application, that a processing module is configured to determine a current service state of the second electronic device includes at least one of the following: determining, based on the data throughput, which one of the first service state, the second service state, and the third service state is the service state, where the first service state is that a difference between an uplink service volume and a downlink service volume falls within a preset range; the second service state is that the uplink service volume is greater than the downlink service volume, and a difference is greater than a preset value; and the third service state is that the downlink service volume is greater than the uplink service volume, and a difference is greater than the preset value.

In the foregoing embodiment, when the first electronic device and the second electronic device are switched to the third mode, the fourth mode, or the fifth mode, a 2.4G channel or a 5G channel is added to perform data transmission, and advantages that a 2.4G signal can be transmitted over a long distance and a 5G signal has a high transmission rate are used. Therefore, overall communication quality and transmission efficiency are improved. In addition, a transmission frequency band is added, and therefore usage of an original data transmission frequency band can be reduced, and a transmission speed of data on the original frequency band is increased.

In a possible implementation of the third aspect of the embodiments of this application, the processing module is further configured to: when the second electronic device is in the first service state, and the working modes of both the first electronic device and the second electronic device are the third mode, send same data on the 2.4G frequency band and the 5G frequency band.

In the foregoing embodiment, a same data packet is simultaneously transmitted on the 2.4G frequency band and the 5G frequency band, to reduce a packet loss rate. Therefore, a data transmission speed can be increased, and communication quality can be improved.

In a possible implementation of the third aspect of the embodiments of this application, the detection module is further configured to detect whether communication quality is improved; and the processing module is further configured to: if the communication quality is not improved, switch the working mode to the first mode or the second mode, and send an instruction to indicate the second electronic device to switch the working mode to the first mode or the second mode.

In the foregoing embodiment, the communication quality is detected, and an effect of the working mode obtained after switching is evaluated, to select a working mode suitable for the current service state for data transmission.

According to a fourth aspect of the embodiments of this application, a second electronic device is provided. The second electronic device includes: a detection module, configured to: detect signal strength existing when a first electronic device communicates with the second electronic device, and determine whether the signal strength is less than a preset value, where both the first electronic device and the second electronic device work in a first mode or a second mode; and a processing module, configured to: when the signal strength is less than the preset value, determine a current service state, and determine, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band, where the processing module is further configured to: switch a working mode to the determined working mode that corresponds to the second electronic device and that is suitable for the current service state, and send an instruction to indicate the first electronic device to switch a working mode to the determined working mode that corresponds to the first electronic device and that is suitable for the current service state.

In the foregoing embodiment, the working mode may be switched based on the service state, and a throughput advantage and an anti-interference feature of the 5G frequency band and an advantage of a strong coverage capability of the 2.4G frequency band are used. Therefore, communication quality and data transmission efficiency are improved, and a fault that an entire service is stalled and interrupted due to a weak wireless signal when transmission is performed on a single frequency band is avoided.

In a possible implementation of the fourth aspect of the embodiments of this application, that a processing module is configured to determine a current service state includes at least one of the following: determining whether the service state is the first service state, where the first service state includes a state in which a current service of the second electronic device is a preset service, and the preset service is a game service or a voice service.

In this embodiment, the processing module is further configured to: determine, by using a format of a data frame, whether the service state is the first service state; and determine, by using a data throughput, which one of the second service state and the third service state is the service state.

In a possible implementation of the fourth aspect of the embodiments of this application, that a processing module is configured to determine a current service state includes at least one of the following: determining, based on a data throughput, which one of the first service state, the second service state, and the third service state is the service state, where the first service state is that a difference between an uplink service volume and a downlink service volume falls within a preset range; the second service state is that an uplink service volume is greater than a downlink service volume, and a difference is greater than a preset value; and the third service state is that a downlink service volume is greater than an uplink service volume, and a difference is greater than the preset value.

In the foregoing embodiment, when the first electronic device and the second electronic device are switched to the third mode, the fourth mode, or the fifth mode, a 2.4G channel or a 5G channel is added to perform data transmission, and advantages that a 2.4G signal can be transmitted over a long distance and a 5G signal has a high transmission rate are used. Therefore, overall communication quality and transmission efficiency are improved. In addition, a transmission frequency band is added, and therefore usage of an original data transmission frequency band can be reduced, and a transmission speed of data on the original frequency band is increased.

In a possible implementation of the fourth aspect of the embodiments of this application, the processing module is further configured to: when the second electronic device is in the first service state, and the working modes of both the first electronic device and the second electronic device are the third mode, send same data on the 2.4G frequency band and the 5G frequency band.

In the foregoing embodiment, a same data packet is simultaneously transmitted on the 2.4G frequency band and the 5G frequency band, to reduce a packet loss rate. Therefore, a data transmission speed can be increased, and communication quality can be improved.

In a possible implementation of the fourth aspect of the embodiments of this application, the detection module is further configured to detect whether communication quality is improved; and the processing module is further configured to: if the communication quality is not improved, switch the working mode to the first mode or the second mode, and send an instruction to indicate the first electronic device to switch the working mode to the first mode or the second mode.

In the foregoing embodiment, the communication quality is detected, and an effect of the working mode obtained after switching is evaluated, to select a working mode suitable for the current service state for data transmission.

According to a fifth aspect of the embodiments of this application, an electronic device is provided. The electronic device includes a processor, a memory, and a transceiver. The processor, the memory, and the transceiver are coupled to each other. The memory stores program instructions, and when the program instructions stored in the memory are executed by the processor, the electronic device is enabled to implement the method according to the first aspect.

According to a sixth aspect of the embodiments of this application, an electronic device is provided. The electronic device includes a processor, a memory, and a transceiver. The processor, the memory, and the transceiver are coupled to each other. The memory stores program instructions, and when the program instructions stored in the memory are executed by the processor, the electronic device is enabled to implement the method according to the second aspect.

According to a seventh aspect of the embodiments of this application, a computer-readable storage medium is provided. The computer storage medium stores a computer program, and the computer program includes program instructions. When the program instructions are executed by a processor, the processor is enabled to perform the method according to the first aspect.

According to an eighth aspect of the embodiments of this application, a computer-readable storage medium is provided. The computer storage medium stores a computer program, and the computer program includes program instructions. When the program instructions are executed by a processor, the computer is enabled to perform the method according to the second aspect.

According to a ninth aspect of the embodiments of this application, a chip system is provided. The chip system includes a processor and a data interface. The processor reads, by using the data interface, instructions stored in a memory, to perform the method according to the first aspect.

According to a tenth aspect of the embodiments of this application, a chip system is provided. The chip system includes a processor and a data interface. The processor reads, by using the data interface, instructions stored in a memory, to perform the method according to the first aspect.

The embodiments of the present invention provide the wireless data transmission method. It may be learned from the foregoing technical solutions that in the embodiments of the present invention, when there is relatively weak signal strength during communication, a service state is determined, and a wireless router is switched to a working mode corresponding to the service state. In the embodiments of the present invention, a proper wireless transmission frequency band may be selected based on the service state, and a throughput advantage and an anti-interference feature of the 5G frequency band and an advantage of a strong coverage capability of the 2.4G frequency band are used. Therefore, communication quality and data transmission efficiency are improved, and a fault that an entire service is stalled and interrupted due to a weak wireless signal when transmission is performed on a single frequency band is avoided.

BRIEF DESCRIPTION OF DRAWINGS

To describe the technical solutions in embodiments of the present invention or in a conventional technology more clearly, the following briefly describes the accompanying drawings for describing the embodiments or the conventional technology. It is clear that the accompanying drawings in the following description show some embodiments of the present invention, and a person of ordinary skill in the art may still derive other drawings from these accompanying drawings without creative efforts.

FIG. 16-1 is a schematic diagram of communication existing when working modes of both an AP and a STA are a third mode M3 according to an embodiment of this application;

FIG. 16-2 is a schematic diagram of communication existing when working modes of both an AP and a STA are a third mode M3 according to an embodiment of this application;

FIG. 16-3 is a schematic diagram of communication existing when working modes of both an AP and a STA are a third mode M3 according to an embodiment of this application;

FIG. 17-1 to FIG. 17-3 are schematic diagrams of data transmission existing when working modes of both an AP and a STA are a third mode M3 according to an embodiment of this application:

FIG. 18-1 to FIG. 18-3 are schematic diagrams of communication existing when a STA is in a fifth mode M5 and an AP is in a fourth mode M4 according to an embodiment of this application:

FIG. 21-1 to FIG. 21-4 are schematic diagrams of communication between an AP and a STA in a half-duplex data transmission manner according to an embodiment of this application;

FIG. 21-5 and FIG. 21-6 are schematic diagrams of communication between an AP and a STA in a full-duplex data transmission manner according to an embodiment of this application;

DESCRIPTION OF EMBODIMENTS

To make the objectives, technical solutions, and advantages of the embodiments of the present invention clearer, the following clearly and completely describes the technical solutions in a possible implementation with reference to the accompanying drawings in the possible implementation. Apparently, the described embodiments are some but not all of the embodiments of the present invention. Other embodiments obtained by a person of ordinary skill in the art based on the embodiments of the present invention without creative efforts shall fall within the protection scope of the present invention.

In a possible implementation, there is a first electronic device and a second electronic device. The first electronic device or the second electronic device may be a wireless router or a terminal device. The wireless router includes a Wi-Fi wireless router, an optical network terminal, a Wi-Fi wireless repeater, or a CPE (Customer Premise Equipment) terminal. The terminal device may be a mobile phone, a tablet computer, a notebook computer, a large-screen television, a smart home product, a PDA (Personal Digital Assistant, personal digital assistant), a POS (Point of Sales, point of sales), a vehicle-mounted computer, or the like.

Types of wireless routers include a single-band wireless router and a dual-band wireless router. The dual-band wireless router can perform communication on two wireless frequency bands, for example, a 2.4 GHz frequency band and a 5 GHz frequency band. The single-band wireless router supports communication only on one specific wireless frequency band, for example, supports communication on the 2.4 GHz wireless frequency band, or supports communication only on the 5 GHz wireless frequency band. Wi-Fi chip types of terminal devices include a single-channel wireless chip and a dual-channel wireless chip. The single-channel wireless chip supports communication only on one specific wireless frequency band. The dual-channel wireless chip can perform communication on two wireless frequency bands.

An AP and a STA that support dual-band combination may automatically switch to the 2.4G frequency band or the 5G frequency band for transmission based on an actual situation. However, in existing dual-band combination, there is low automatic switching sensitivity, and there is repeated switching between the two frequency bands. Consequently, data transmission is affected, and working can be implemented only on the 5G frequency band or the 2.4G frequency band. An AP and a STA that do not support dual-band combination may be connected only to a signal with relatively poor signal strength. Consequently, a service may be stalled and interrupted.

In a possible implementation, a Wi-Fi chip type of each of the AP and the STA includes a selectable dual-channel chip, a selectable four-channel chip, or a controllable dual-channel chip.

Figure 1:
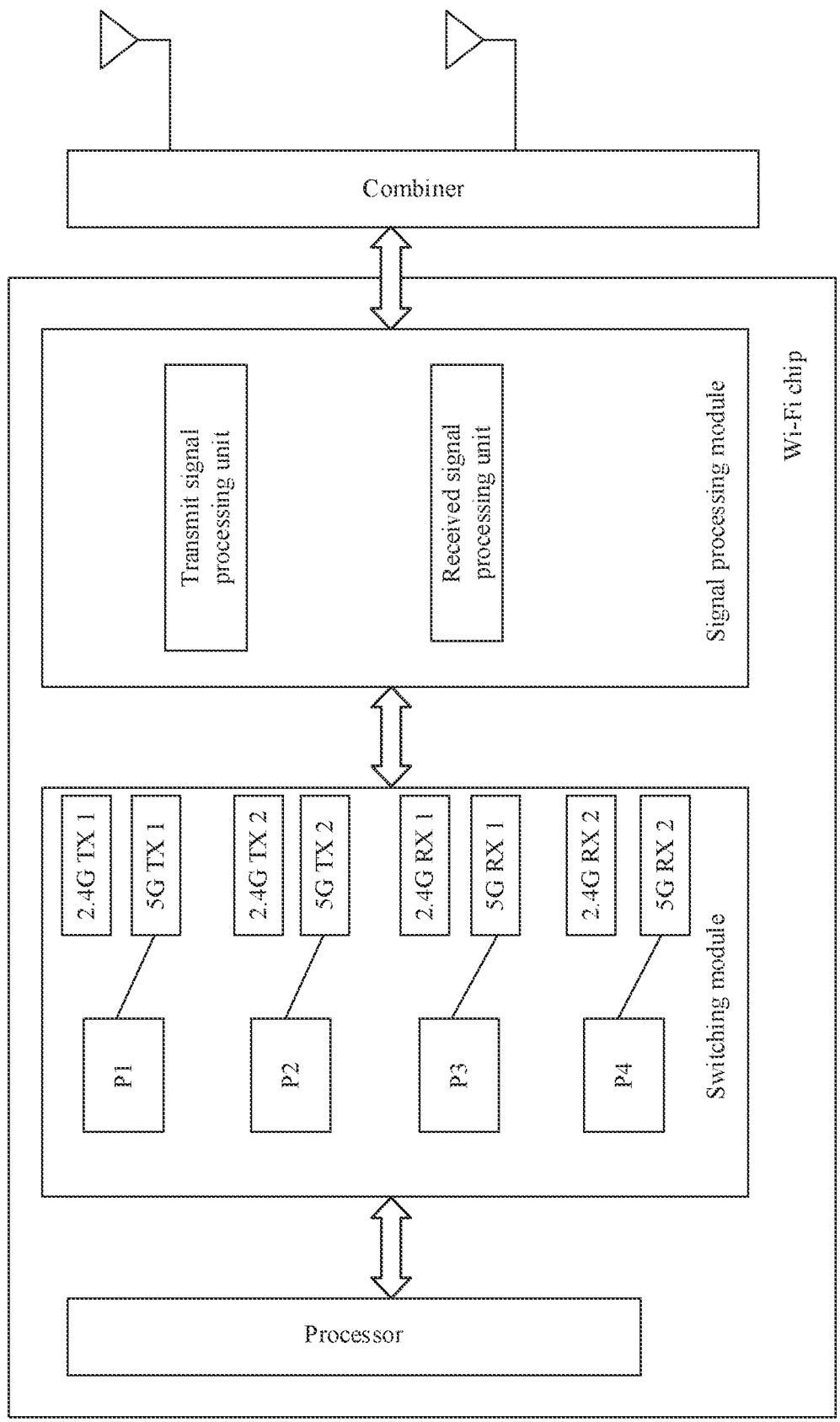
FIG. 1 is a schematic diagram of a structure of a first mode M1 of a selectable dual-channel chip according to an embodiment of this application.

FIG. 1 is a schematic diagram of a structure of a first mode M1 of a selectable dual-channel chip. As shown in the figure, the Wi-Fi chip includes a processor, a switching module, a signal processing module, a combiner, and an antenna. The switching module includes a switching switch, a TX channel, and an RX channel. The signal processing module includes a transmit signal processing unit and a received signal processing unit. The processor may perform analysis and calculation based on received data, and send an instruction. This includes: determining whether signal strength is less than a preset value, determining a service state, and determining a working mode corresponding to the service state.

The switching module may switch a state of each switching switch based on an instruction of the processor. The instruction includes a location and a connection state of each switching switch. For example, the instruction sent by the processor is "wpriv wl1 write_reg b (channel switching), wpriv wl2 write_reg b (channel switching), 808 (storage location of a switch), 11 (state)", "wpriv wl1 write_reg b" represents switching a switch on a 2.4G channel, "wpriv wl2 write_reg b" represents switching a switch on a 5G channel, "808" is a storage address of a switch location, and "11" represents a state of the switch. Specifically, "11" is an 8-decimal number "00010001", which indicates that states of eight switches are respectively "off, off, off, on, off, off, off, and on". The switching switch of the switching module changes a connection relationship with a TX or/and an RX based on the instruction sent by the processor.

The signal processing module includes the transmit signal processing unit and the received signal processing unit. The transmit signal processing unit may include a digital-to-analog converter (DAC), a filter (Filter), a mixer (Mixer), a VGA, and a power amplifier (PA). The received signal processing unit may include a low noise amplifier (LNA), a mixer (Mixer), a filter (Filter), a voltage gain attenuator (VGA), and an analog-to-digital converter (ADC). Signals of the transmit signal processing module are combined into the combiner, and the combiner maps a transmit signal to at least one antenna for sending based on a frequency of the transmit signal. After receiving the signal, the antenna transmits the signal to the received signal processing module by using the combiner, to process the received signal.

There is at least one antenna. A same antenna can simultaneously send signals only at a same frequency. Similarly, the same antenna can simultaneously receive signals only at a same frequency. In a half-duplex manner, an uplink channel and a downlink channel may share an antenna by using the combiner. By turning on or turning off the combiner, the antenna is configured to only send an uplink signal or receive a downlink signal at a same time, and receiving and sending are implemented in a time division multiplexing manner. In this case, a same carrier frequency or different carrier frequencies may be used to receive and transmit signals. In a full-duplex data transmission manner, an uplink channel and a downlink channel may share an antenna by using a filter group. Different carrier frequencies are used to receive and transmit signals, and therefore the antenna sends an uplink signal and receives a downlink signal at a same time, and receiving and sending are implemented in a frequency division multiplexing manner.

In an embodiment of the present invention, the Wi-Fi chip is a selectable N-channel chip, and includes 2N switching switches, 2N TXs, and 2N RXs, where N is 2, 4, or another positive integer. The 2N TXs are divided into N groups, and each group includes one 2.4G TX and one 5G TX. The 2N RXs are divided into N groups, and each group includes one 2.4G RX and one 5G RX. In each group, one switching switch chooses to connect to one channel. As shown in FIG. 1, in an embodiment of the present invention, four switching switches P1 to P4, four TXs, and four RXs are disposed in the selectable dual-channel chip. The four TXs include a 2.4G TX 1, a 5G TX 1, a 2.4G TX 2, and a 5G TX 2. The 2.4G TX 1 and the 5G TX 1 form a group, and P1 chooses to connect to one of the TXs. The 2.4G TX 2 and the 5G TX 2 form a group, and P2 chooses to connect to one of the TXs. The four RXs include a 2.4G RX 1, a 5G RX 1, a 2.4G RX 2, and a 5G RX 2. The 2.4G RX 1 and the 5G RX 1 form a group, and P3 chooses to connect to one of the RXs. The 2.4G RX 2 and the 5G RX 2 form a group, and P4 chooses to connect to one of the RXs.

In a possible implementation, working modes of the wireless router and the electronic device include a first mode M1 and a second mode M2. The first mode M1 is that all switching switches choose to connect to a 5G frequency band channel, a switching switch of a control TX chooses to connect to a 5G TX channel, and a switching switch of a control RX chooses to connect to a 5G RX channel. The second mode M2 is that all the switching switches choose to connect to a 2.4G frequency band channel, the switching switch of the control TX chooses to connect to a 2.4G TX channel, and the switching switch of the control RX chooses to connect to a 2.4G RX channel.

FIG. 1 is a schematic diagram of a structure of a first mode M1 of a selectable dual-channel chip. In the figure, P1 chooses to connect to the 5G TX 1, P2 chooses to connect to the 5G TX 2, P3 chooses to connect to the 5G RX 1, and P4 chooses to connect to the 5G RX 2.

Figure 2:
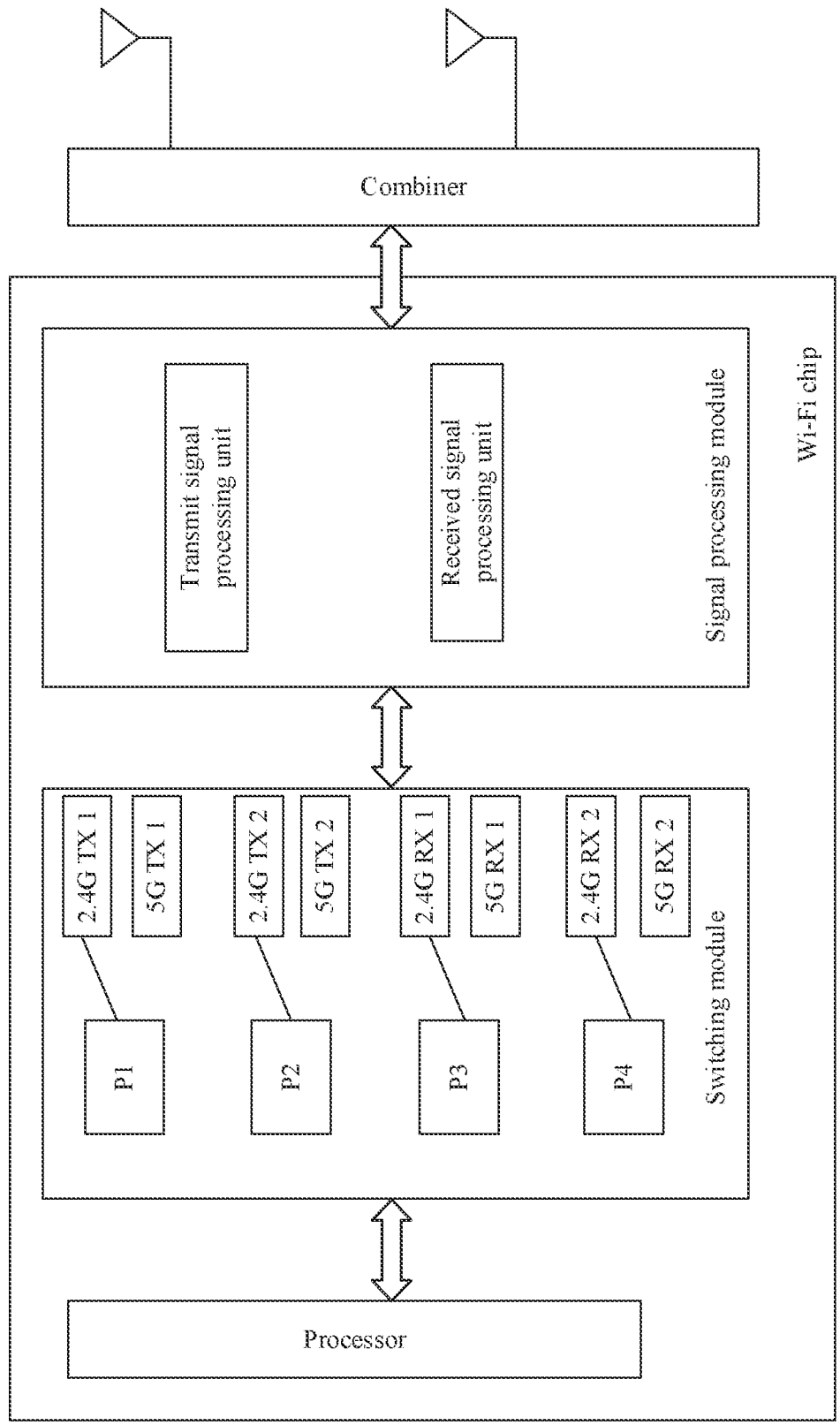
FIG. 2 is a schematic diagram of a structure of a second mode M2 of a selectable dual-channel chip according to an embodiment of this application.

FIG. 2 is a schematic diagram of a structure of a second mode M2 of a selectable dual-channel chip. In the figure, P1 chooses to connect to the 2.4G TX 1, P2 chooses to connect to the 2.4G TX 2, P3 chooses to connect to the 2.4G RX 1, and P4 chooses to connect to the 2.4G RX 2.

In another embodiment of the present invention, the working modes of the wireless router and the electronic device further include a third mode M3, a fourth mode M4, and a fifth mode M5. The third mode M3 is that the switching switch of the control TX chooses to connect to both the 5G TX channel and the 2.4G TX channel, and the switching switch of the control RX chooses to connect to both the 5G RX channel and the 2.4G RX channel. The fourth mode M4 is that the switching switch of the control TX chooses to connect to the 2.4G TX channel, and the switching switch of the control RX chooses to connect to the 5G RX channel. The fifth mode M5 is that the switching switch of the control TX chooses to connect to the 5G TX channel, and the switching switch of the control RX chooses to connect to the 2.4G RX channel.

Figure 3:
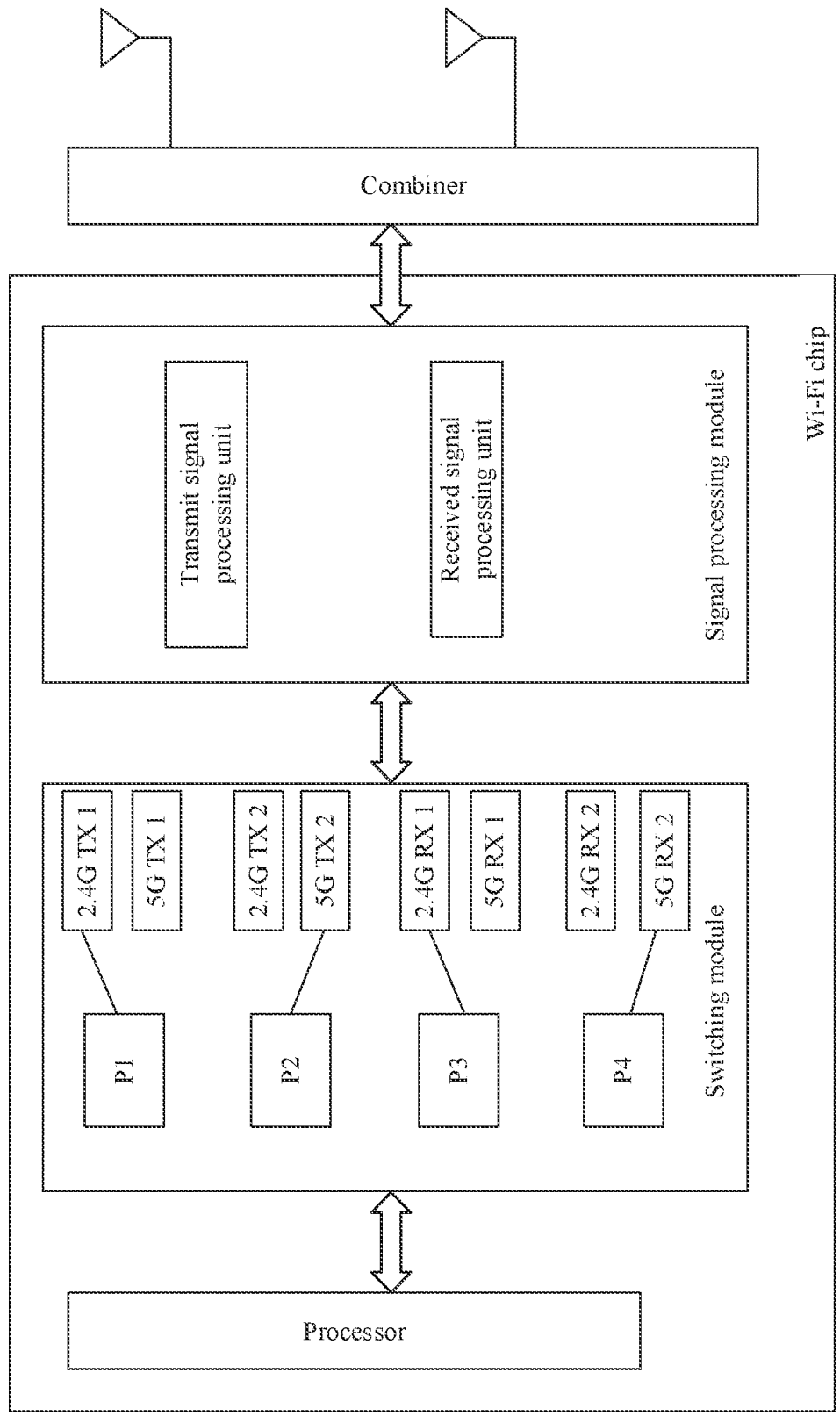
FIG. 3 is a schematic diagram of a structure of a third mode M3 of a selectable dual-channel chip according to an embodiment of this application.

FIG. 3 is a schematic diagram of a structure of a third mode M3 of a selectable dual-channel chip. In the figure, P1 chooses to connect to the 2.4G TX 1, P2 chooses to connect to the 5G TX 2, P3 chooses to connect to the 2.4G RX 1, and P4 chooses to connect to the 5G RX 2.

Figure 4:
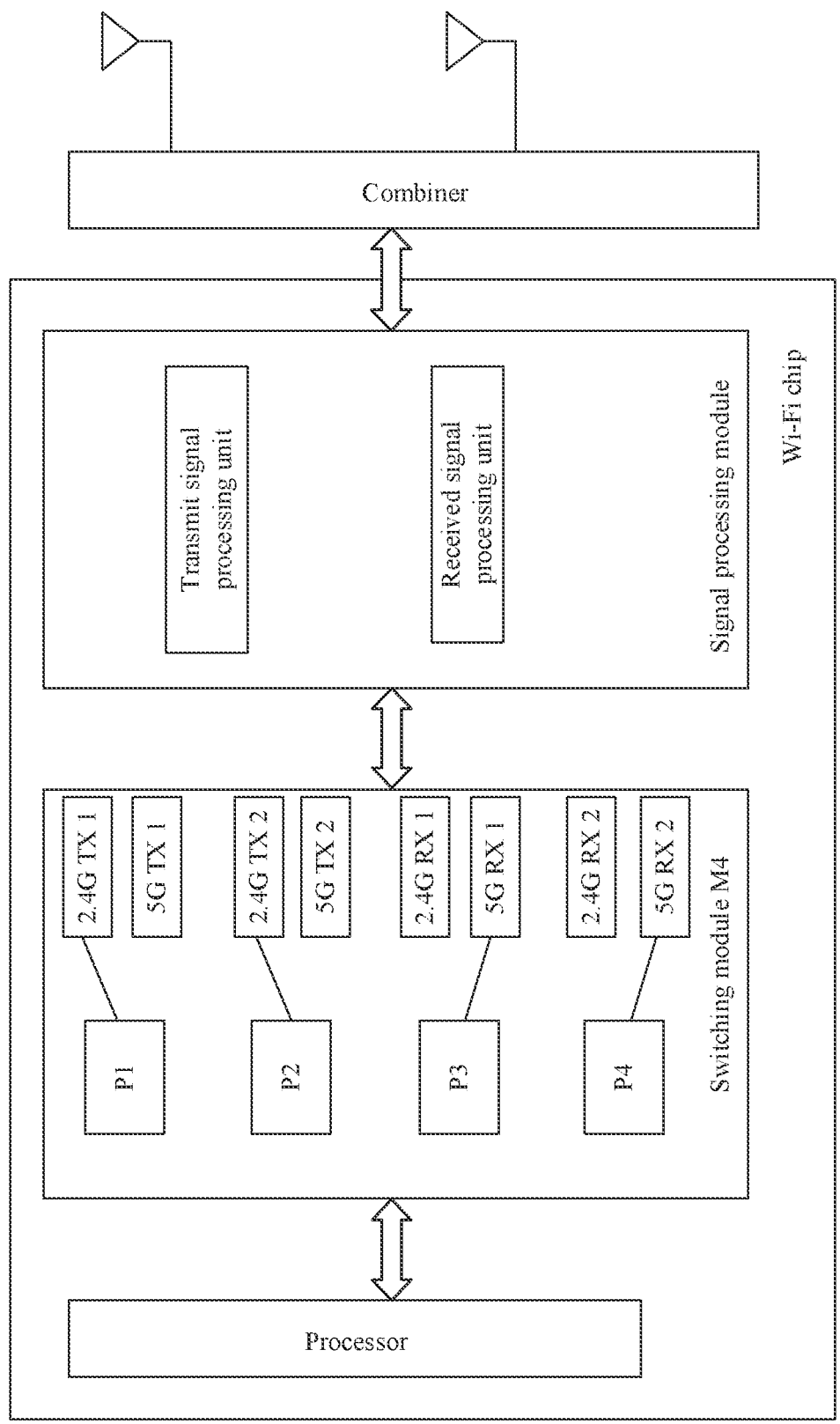
FIG. 4 is a schematic diagram of a structure of a fourth mode M4 of a selectable dual-channel chip according to an embodiment of this application.

FIG. 4 is a schematic diagram of a structure of a fourth mode M4 of a selectable dual-channel chip. In the figure, P1 chooses to connect to the 2.4G TX 1, P2 chooses to connect to the 2.4G TX 2, P3 chooses to connect to the 5G RX 1, and P4 chooses to connect to the 5G RX 2.

Figure 5:
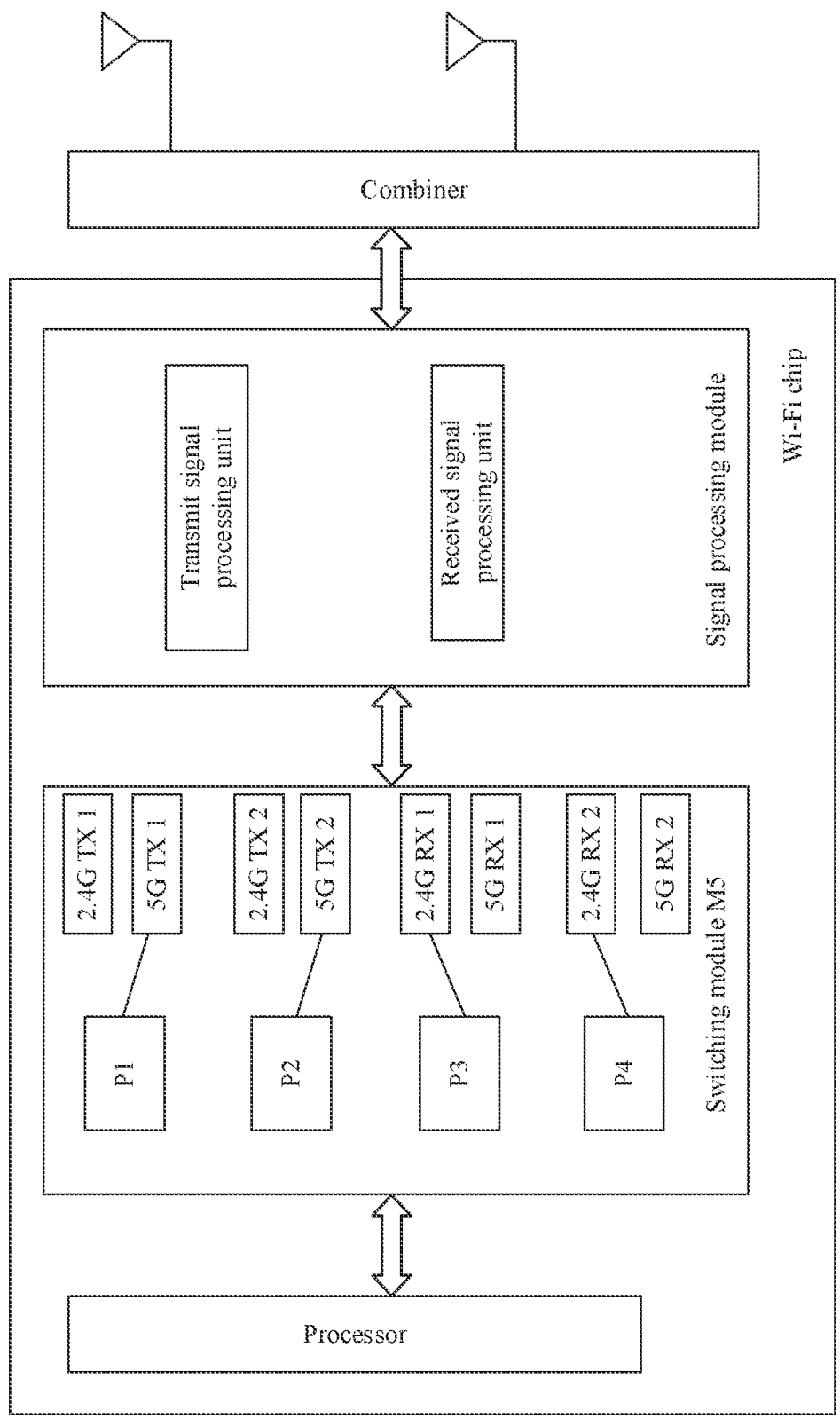
FIG. 5 is a schematic diagram of a structure of a fifth mode M5 of a selectable dual-channel chip according to an embodiment of this application.

FIG. 5 is a schematic diagram of a structure of a fifth mode M5 of a selectable dual-channel chip. In the figure, P1 chooses to connect to the 5G TX 1, P2 chooses to connect to the 5G TX 2, P3 chooses to connect to the 2.4G RX 1, and P4 chooses to connect to the 2.4G RX 2.

Figure 6:
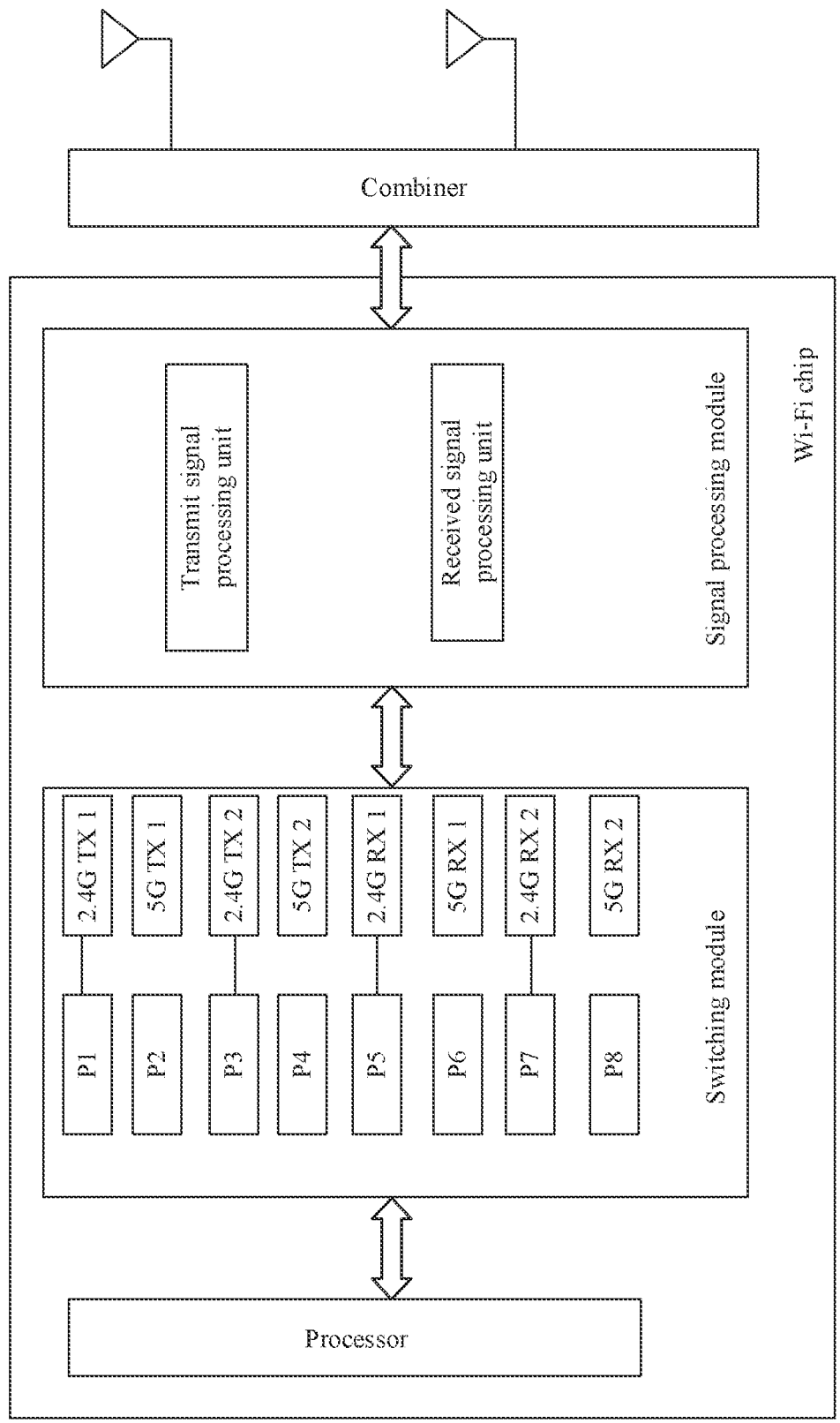
FIG. 6 is a schematic diagram of a structure of a first mode M1 of a controllable dual-channel chip according to an embodiment of this application.

In an embodiment of the present invention, the Wi-Fi chip is a controllable N-channel chip, and the Wi-Fi chip includes 4N switching switches, 2N TXs, and 2N RXs, where N is a positive integer not less than 2. Each TX or RX is provided with a switching switch, and the switching switch chooses to or not to connect to the channel. In an embodiment of the present invention, FIG. 6 is a schematic diagram of a structure of a first mode M1 of a controllable dual-channel chip. Eight switching switches P1 to P8, four TXs, and four RXs are disposed in the controllable dual-channel chip. The four TXs include a 2.4G TX 1, a 5G TX 1, a 2.4G TX 2, and a 5G TX 2. The four RXs include a 2.4G RX 1, a 5G RX 1, a 2.4G RX 2, and a 5G RX 2. P1 may choose to connect to or be disconnected from the 2.4G TX 1, P2 may choose to connect to or be disconnected from the 5G TX 1, P3 may choose to connect to or be disconnected from the 2.4G TX 2, P4 may choose to connect to or be disconnected from the 5G TX 2, P5 may choose to connect to or be disconnected from the 2.4G RX 1, P6 may choose to connect to or be disconnected from the 5G RX 1, P7 may choose to connect to or be disconnected from the 2.4G RX 2, and P8 may choose to connect to or be disconnected from the 5G RX 2.

In a possible implementation, working modes of the wireless router and the electronic device include a first mode M1 and a second mode M2. The first mode M1 is that all switching switches choose to connect to a 5G frequency band channel, a switching switch of a control TX chooses to connect to a 5G TX channel, and a switching switch of a control RX chooses to connect to a 5G RX channel. The second mode M2 is that all the switching switches choose to connect to a 2.4G frequency band channel, the switching switch of the control TX chooses to connect to a 2.4G TX channel, and the switching switch of the control RX chooses to connect to a 2.4G RX channel.

FIG. 6 is a schematic diagram of a structure of a first mode M1 of a controllable dual-channel chip. In the figure, P2 chooses to connect to the 5G TX 1, P4 chooses to connect to the 5G TX 2, P6 chooses to connect to the 5G RX 1, and P8 chooses to connect to the 5G RX 2.

Figure 7:
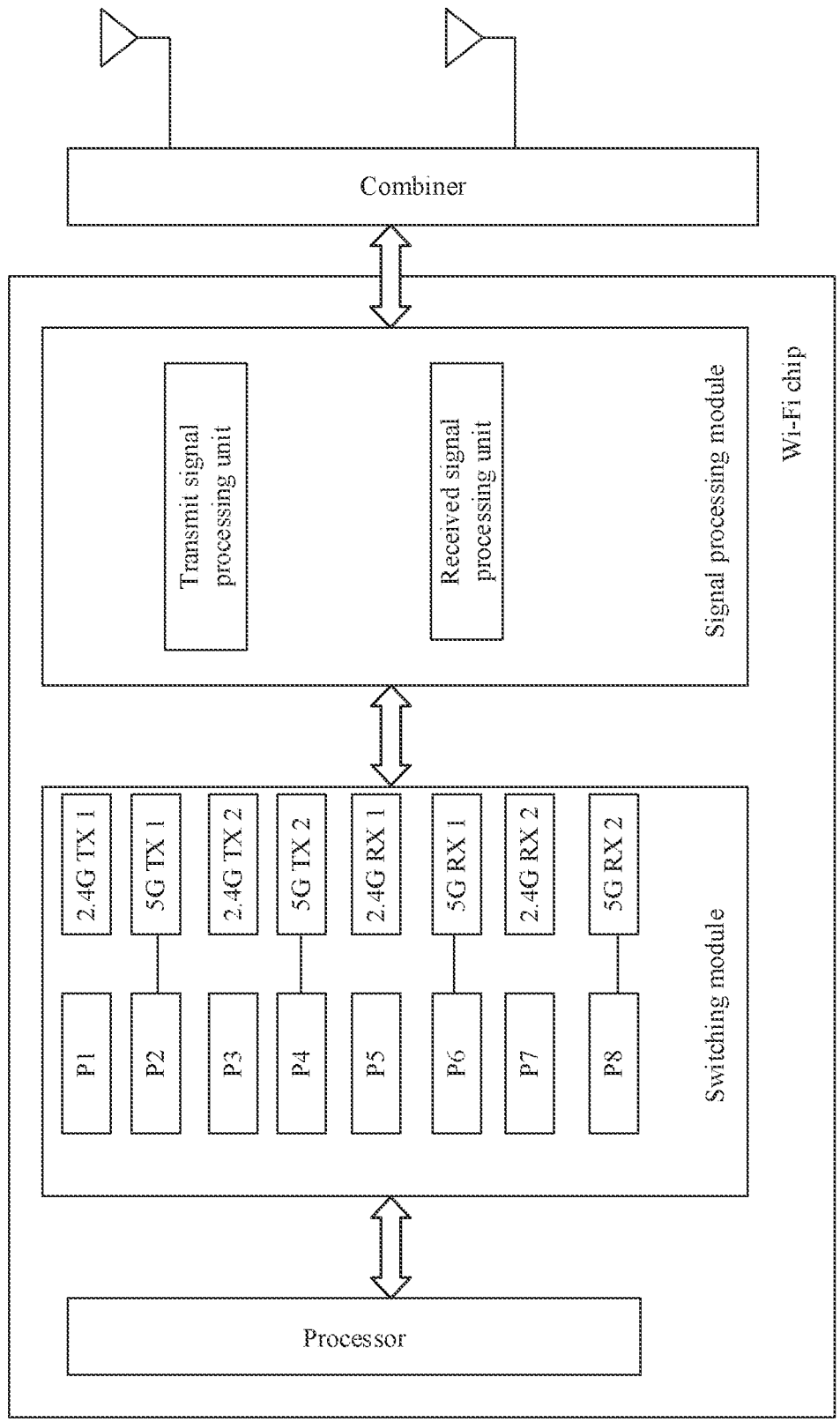
FIG. 7 is a schematic diagram of a structure of a second mode M2 of a controllable dual-channel chip according to an embodiment of this application.

FIG. 7 is a schematic diagram of a structure of a second mode M2 of a controllable dual-channel chip. In the figure, P1 chooses to connect to the 2.4G TX 1, P3 chooses to connect to the 2.4G TX 2, P5 chooses to connect to the 2.4G RX 1, and P7 chooses to connect to the 2.4G RX 2.

In another embodiment of the present invention, the working modes of the wireless router and the electronic device include a third mode M3, a fourth mode M4, and a fifth mode M5. The third mode M3 is that the switching switch of the control TX chooses to connect to both the 5G TX channel and the 2.4G TX channel, and the switching switch of the control RX chooses to connect to both the 5G RX channel and the 2.4G RX channel. The fourth mode M4 is that the switching switch of the control TX chooses to connect to the 2.4G TX channel, and the switching switch of the control RX chooses to connect to the 5G RX channel. The fifth mode M5 is that the switching switch of the control TX chooses to connect to the 5G TX channel, and the switching switch of the control RX chooses to connect to the 2.4G RX channel.

Figure 8:
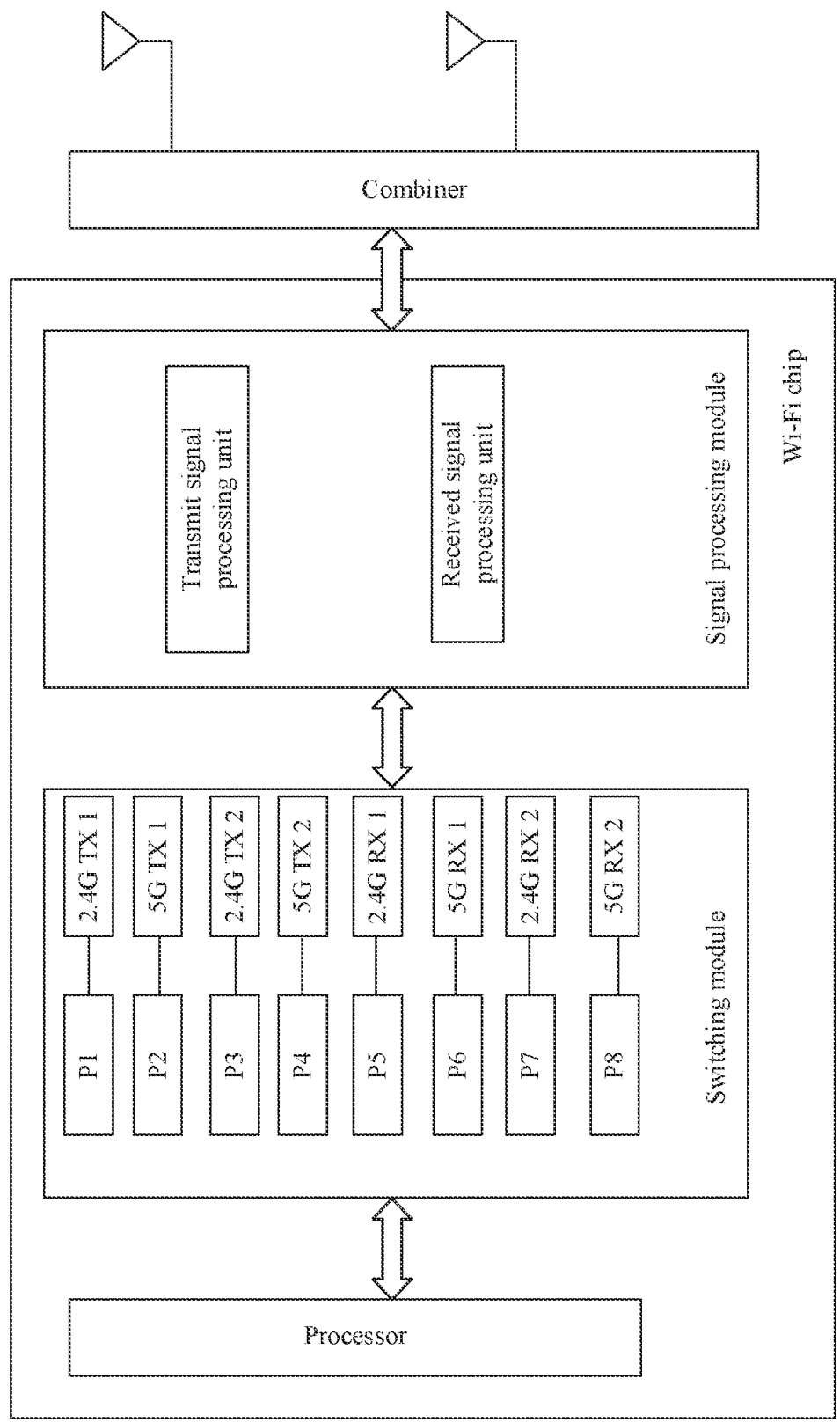
FIG. 8 is a schematic diagram of a structure of a third mode M3 of a controllable dual-channel chip according to an embodiment of this application.

FIG. 8 is a schematic diagram of a structure of a third mode M3 of a controllable dual-channel chip. In the figure, P1 chooses to connect to the 2.4G TX 1, P2 chooses to connect to the 5G TX 1, P3 chooses to connect to the 2.4G TX 2, P4 chooses to connect to the 5G TX 2, P5 chooses to connect to the 2.4G RX 1, P6 chooses to connect to the 5G RX 1, P7 chooses to connect to the 2.4G RX 2, and P8 chooses to connect to the 5G RX 2.

Figure 9:
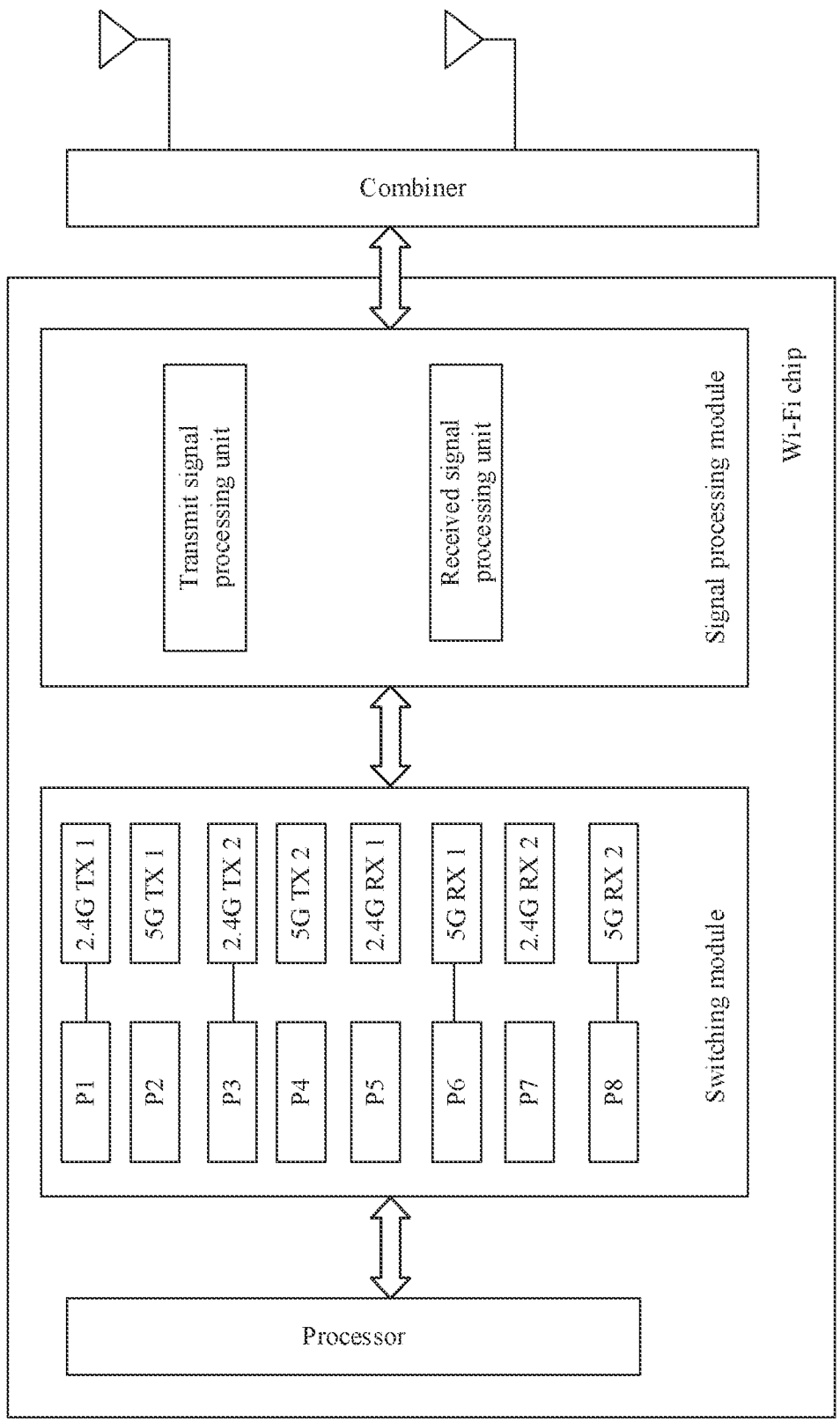
FIG. 9 is a schematic diagram of a structure of a fourth mode M4 of a controllable dual-channel chip according to an embodiment of this application.

FIG. 9 is a schematic diagram of a structure of a fourth mode M4 of a controllable dual-channel chip. In the figure, P1 chooses to connect to the 2.4G TX 1, P3 chooses to connect to the 2.4G TX 2, P6 chooses to connect to the 5G RX 1, and P8 chooses to connect to the 5G RX 2.

Figure 10:
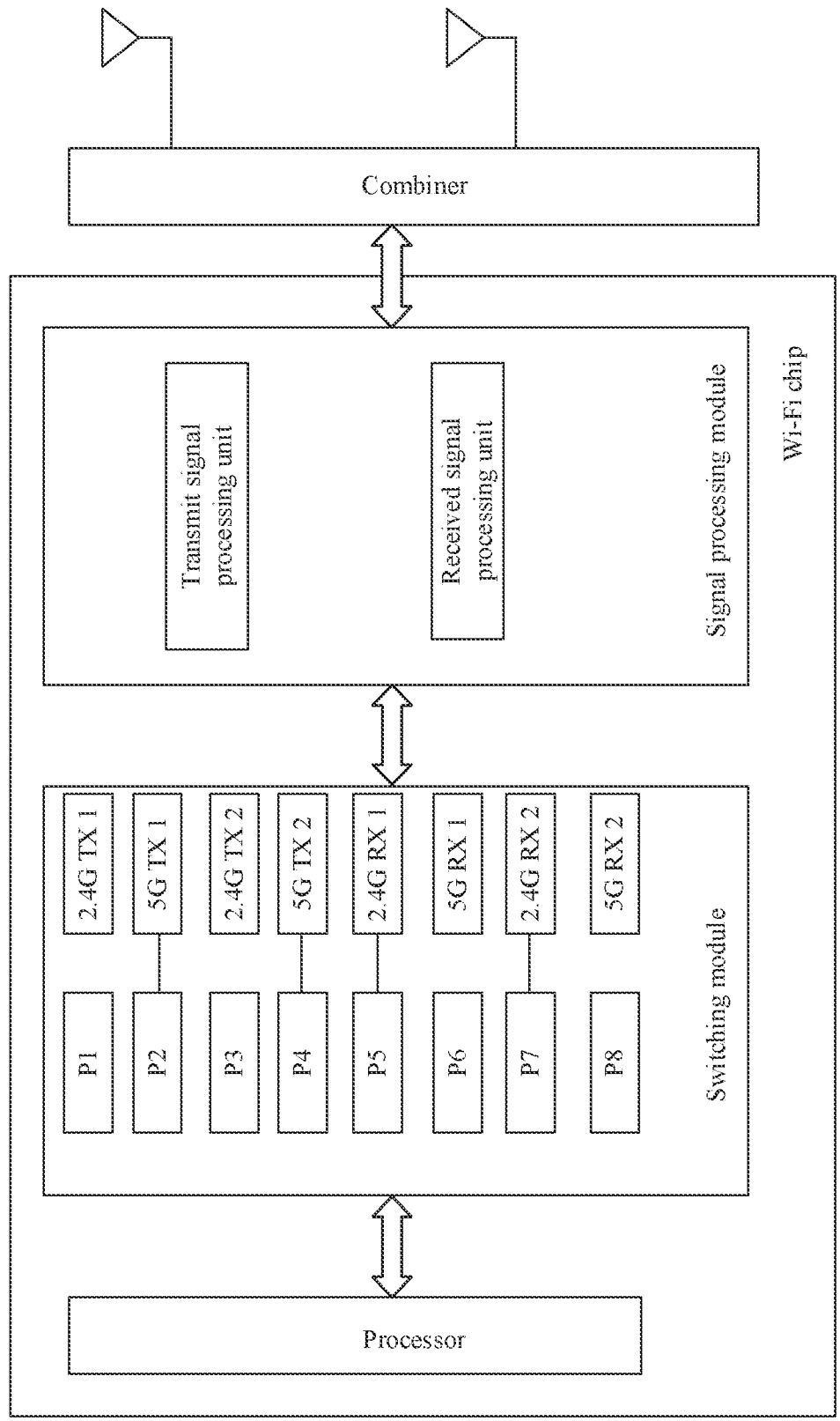
FIG. 10 is a schematic diagram of a structure of a fifth mode M5 of a controllable dual-channel chip according to an embodiment of this application.

FIG. 10 is a schematic diagram of a structure of a fifth mode M5 of a controllable dual-channel chip. In the figure, P2 chooses to connect to the 5G TX 1, P4 chooses to connect to the 5G TX 2, P5 chooses to connect to the 2.4G RX 1, and P7 chooses to connect to the 2.4G RX 2.

In some embodiments of this application, the first electronic device is an AP, and the second electronic device is a STA. The AP is a dual-band wireless router, and the STA includes a dual-channel wireless Wi-Fi chip. Both the AP and the STA may support communication on the 2.4 GHz wireless frequency band and the 5 GHz wireless frequency band, and a user may choose to connect to the 2.4 GHz frequency band or the 5 GHz frequency band based on a requirement.

Figure 11:
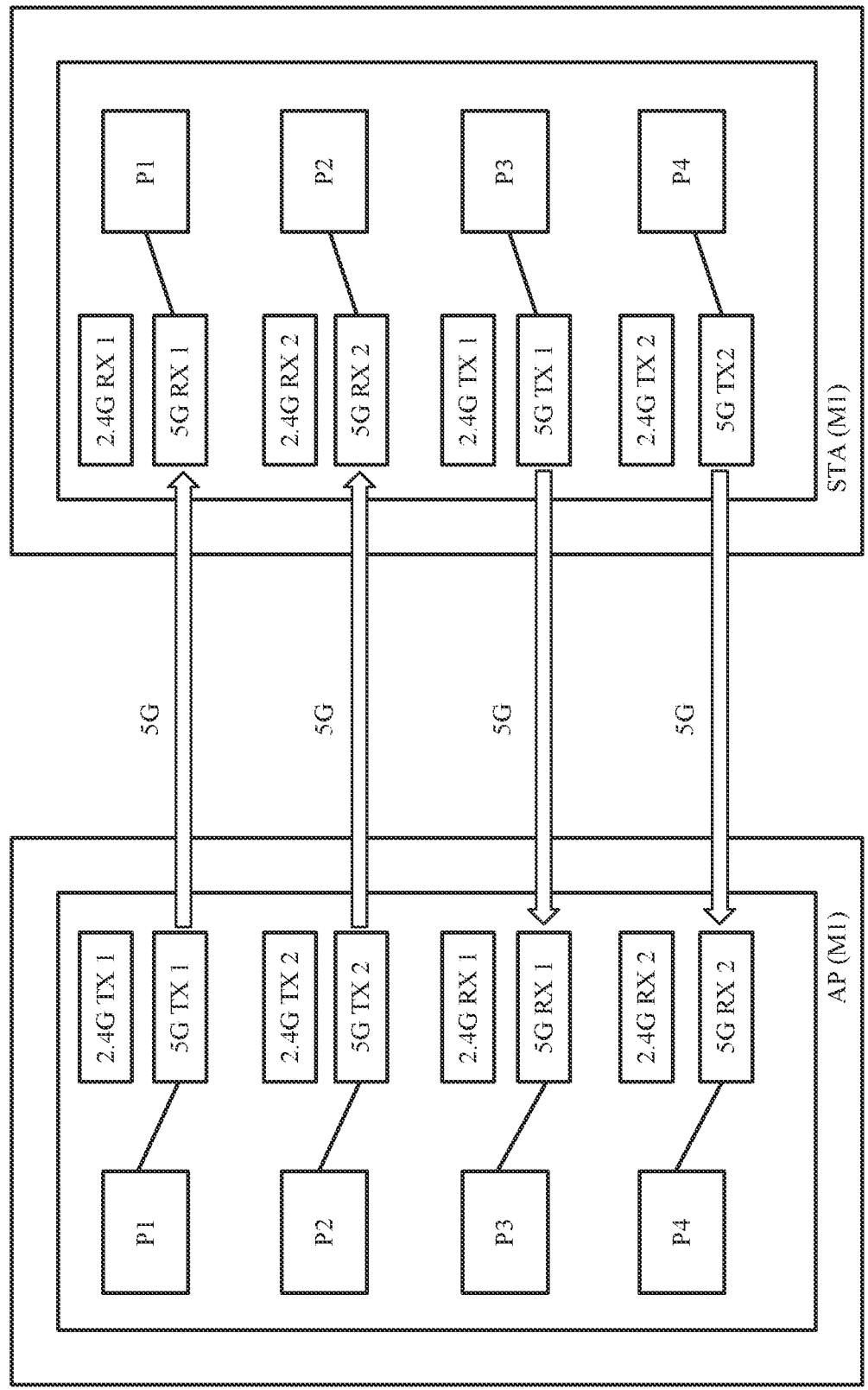
FIG. 11 is a schematic diagram of communication existing when working modes of both an AP and a STA are a first mode M1 according to an embodiment of this application.
Figure 12:
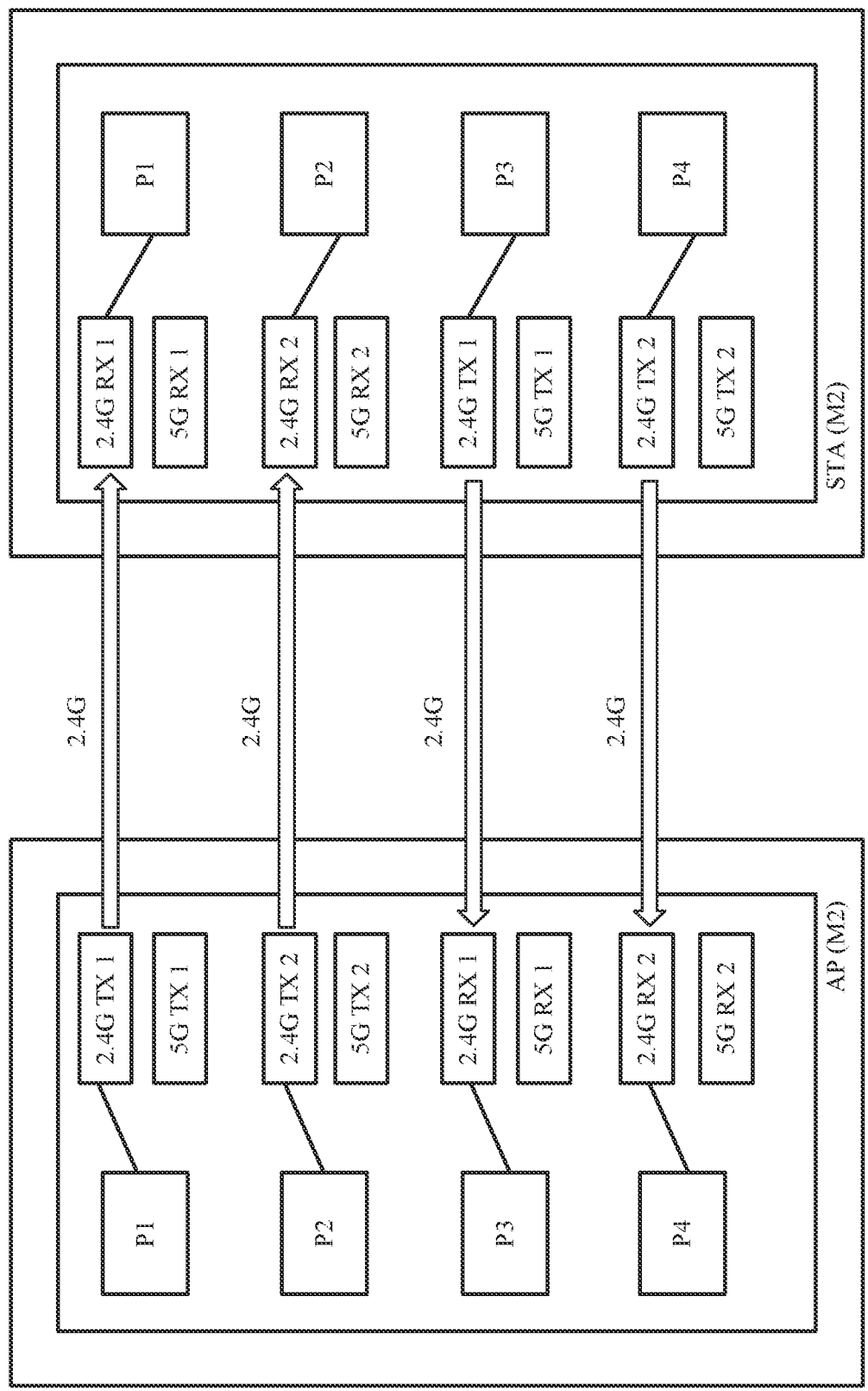
FIG. 12 is a schematic diagram of communication existing when working modes of both an AP and a STA are a second mode M2 according to an embodiment of this application.

In this embodiment, normal working modes of the wireless router AP and the STA include a first mode M1 or a second mode M2. FIG. 11 is a schematic diagram of communication existing when working modes of both the AP end and the STA are the first mode M1. For more intuitive display, the figure shows a switching module and a schematic diagram of communication related to this embodiment. In this embodiment, both the wireless router AP and the STA are selectable dual-channel chips. Both uplink service data and downlink service data of the STA are transmitted on a 5G frequency band. The first mode M1 is that all TXs and RXs of Wi-Fi chips in the AP and the STA are on the 5G frequency band. FIG. 12 is a schematic diagram of communication existing when working modes of both the AP end and the STA are the second mode M2. In this embodiment, both the wireless router AP and the STA are selectable dual-channel chips. Both uplink service data and downlink service data of the STA are transmitted on a 2.4G frequency band. The second mode M2 is that all TXs and RXs of Wi-Fi chips in the AP and the STA are on the 2.4G frequency band. Wi-Fi chip types of the wireless router AP and the STA may be selected based on a communication requirement of an actual product.

In another embodiment of the present invention, the wireless router AP communicates with a plurality of STAs. In this case, there is time division-based communication between the AP and the plurality of STAs, that is, the AP communicates only with one of the plurality of STAs and performs data transmission at a same time. Therefore, the wireless router AP may switch to different working states at different times based on a communication method in the following embodiments, and perform data transmission after establishing a communication connection to a STA. Therefore, overall data transmission efficiency is improved.

Figure 13:
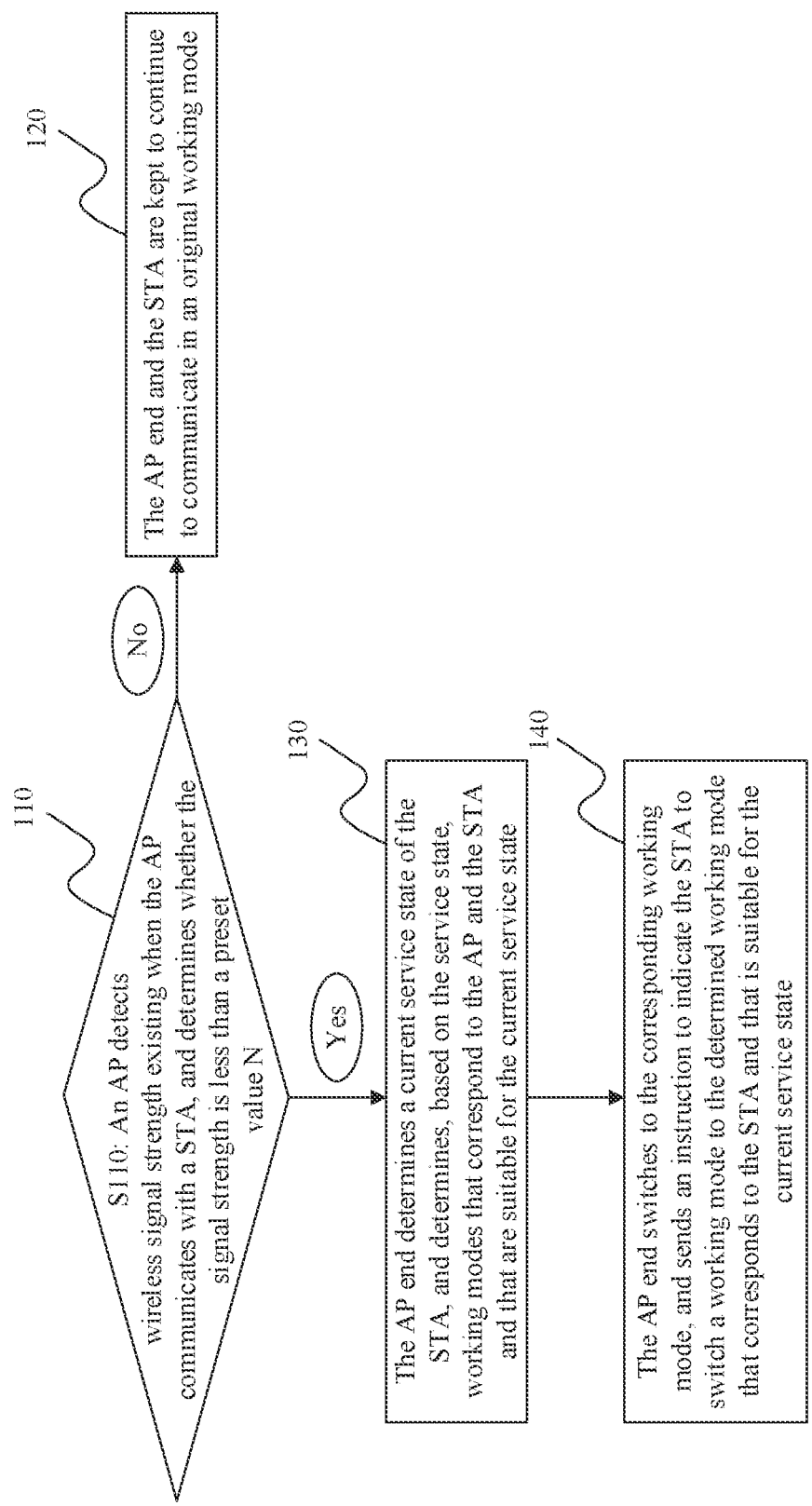
FIG. 13 is a flowchart of a wireless data transmission method between an AP and a STA according to an embodiment of this application.

FIG. 13 is a flowchart of a communication method between an AP and a STA in a possible implementation. S110: The AP detects wireless signal strength existing when the AP communicates with the STA, and determines whether the signal strength is less than a preset value N. In this embodiment, the AP end detects signal strength received by an RX to evaluate the wireless signal strength between the AP and the STA. The wireless signal strength is an RSSI value. A method for obtaining the RSSI value may be as follows: A Wi-Fi chip of the AP end executes an AT drive command "iwpriv wl0 set_mib rssi_dump=1", or a Wi-Fi chip of the AP end invokes a corresponding interface for query.

Compared with transmit signal strength of the STA, a transmit signal of the AP end is stronger. Therefore, when the STA and the AP perform service communication on a 5G frequency band, uplink data transmission of the STA becomes a link disadvantage due to a weaker transmit signal of the STA, and consequently an entire service is stalled and interrupted. In this embodiment of the present invention, the AP end detects the signal strength received by the RX, in other words, detects the transmit signal strength of the STA, and a link disadvantage in a communication process is evaluated to evaluate communication strength and quality between the AP and the STA.

In a possible implementation, a timing period T is set, and after the timing period T is reached, the AP end automatically initiates signal strength detection.

In a possible implementation, the preset value N is RSSI=−70 dBm.

S120: If the detected wireless signal strength is not less than the preset value N, it indicates that there is a good communication state between the AP and the STA, and in this case, the AP end and the STA are kept to continue to communicate in an original working mode, where the original working mode is a first mode M1 or a second mode M2.

S130: If the detected wireless signal strength is less than the preset value N, it indicates that there is poor wireless signal strength or a poor communication connection between the AP and the STA, and in this case, the AP end determines a current service state of the STA, and determines, based on the service state, working modes that correspond to the AP and the STA and that are suitable for the current service state.

The service state may be classified into an uplink service and a downlink service. In a process of communication between the STA and the AP, the uplink service means that the STA uploads data, and the downlink service means that the STA downloads data. In an actual service, a video or a web page state is mainly a downlink service; live streaming, file uploading, or the like is mainly an uplink service; and a game or a voice is usually a service in which there is a balance between an uplink service and a downlink service.

S140: The AP end switches to the corresponding working mode, and sends an instruction to indicate the STA to switch a working mode to the determined working mode that corresponds to the STA and that is suitable for the current service state, to perform data transmission.

Figure 14:
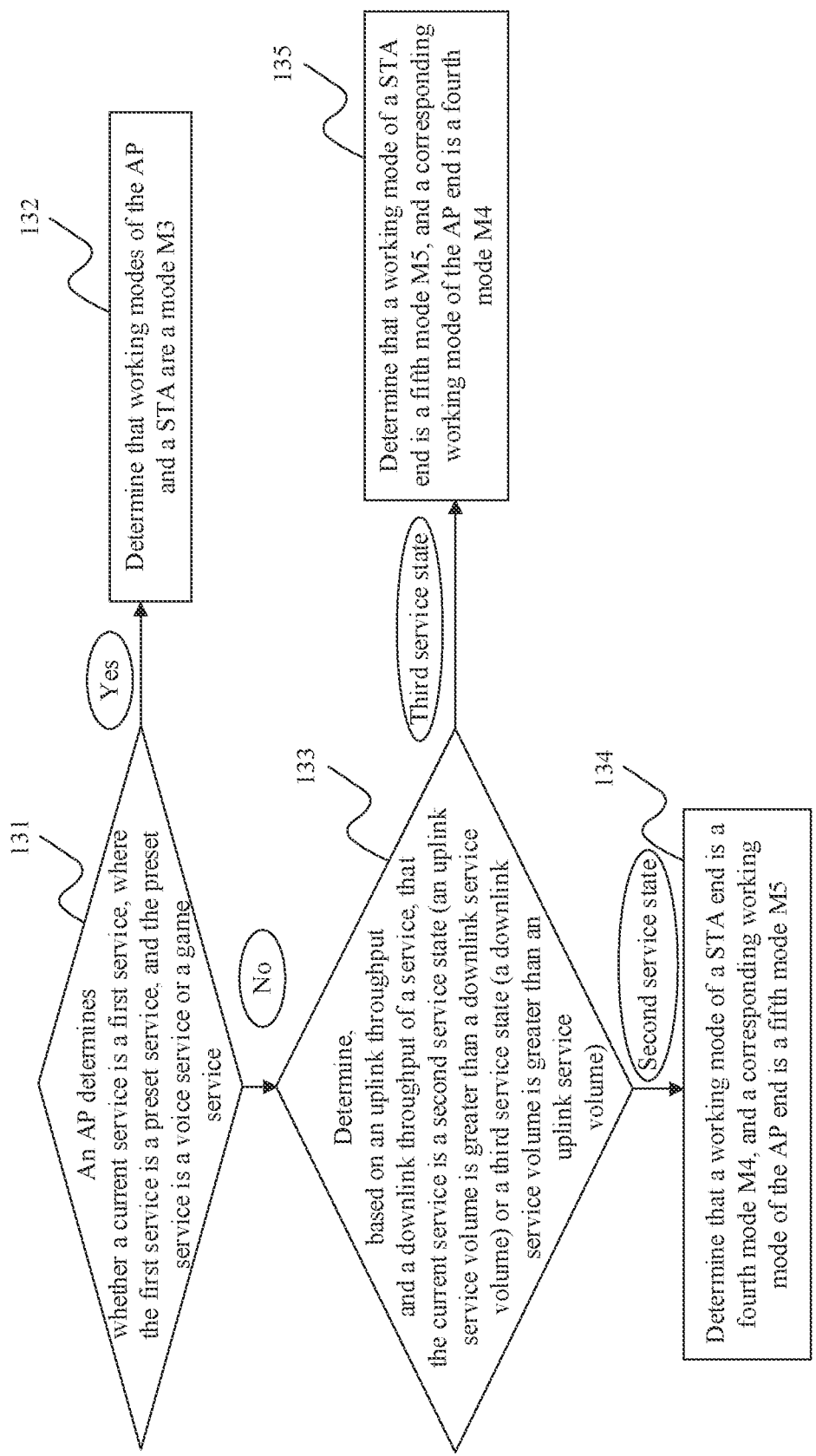
FIG. 14 is a flowchart of a method for determining a corresponding working mode according to an embodiment of this application.

In a possible implementation. FIG. 14 is a flowchart of a method for determining, based on the service state, the working modes that correspond to the AP and the STA and that are suitable for the current service state in a possible implementation. Step S130 of determining, based on the service state, working modes that correspond to the AP and the STA and that are suitable for the current service state includes:

S131: Determine whether the service state of the electronic device is a first service state. In this embodiment, the first service state is that there is a balance between an uplink service volume and a downlink service volume, for example, a voice service, a game service, or another service in which there is a balance between an uplink volume and a downlink volume. A service type may be determined by determining a frame header of a data frame. For example, for the voice service and the game service, according to the communications protocol 802.11, a service flag is set in a frame header of a wireless data frame. For example, if the flag in the frame header is AC_VO, the data frame is a voice service data frame, or if the flag in the frame header is AC_GAME, the data frame is a game service data frame.

Figure 15:
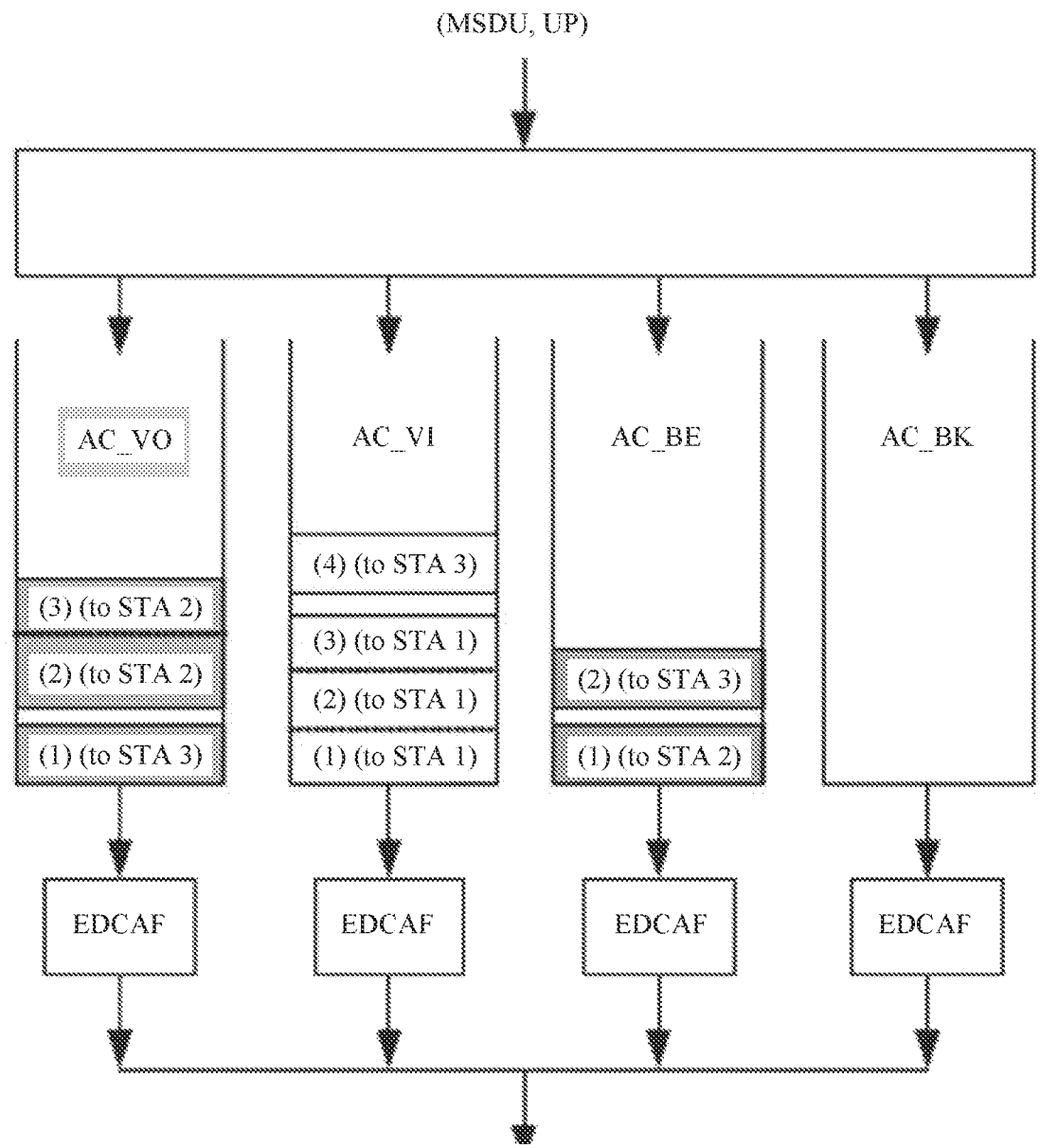
FIG. 15 is a schematic diagram of an encapsulation format of a voice data frame according to an embodiment of this application.

FIG. 15 is a schematic diagram of an encapsulation format of a voice data frame in a possible implementation. In a frame header of the data frame, there is the flag AC_VO that represents the voice service, and therefore it indicates that the data frame is a voice service data frame, and there is the first service state in this embodiment.

S132: If determining that the service state is the first service state, determine that the working modes of the AP and the STA are a third mode M3, where the third mode is sending data on a 2.4G frequency band and the 5G frequency band, and receiving data on the 2.4G frequency band and the 5G frequency band.

Figures 1, 16:
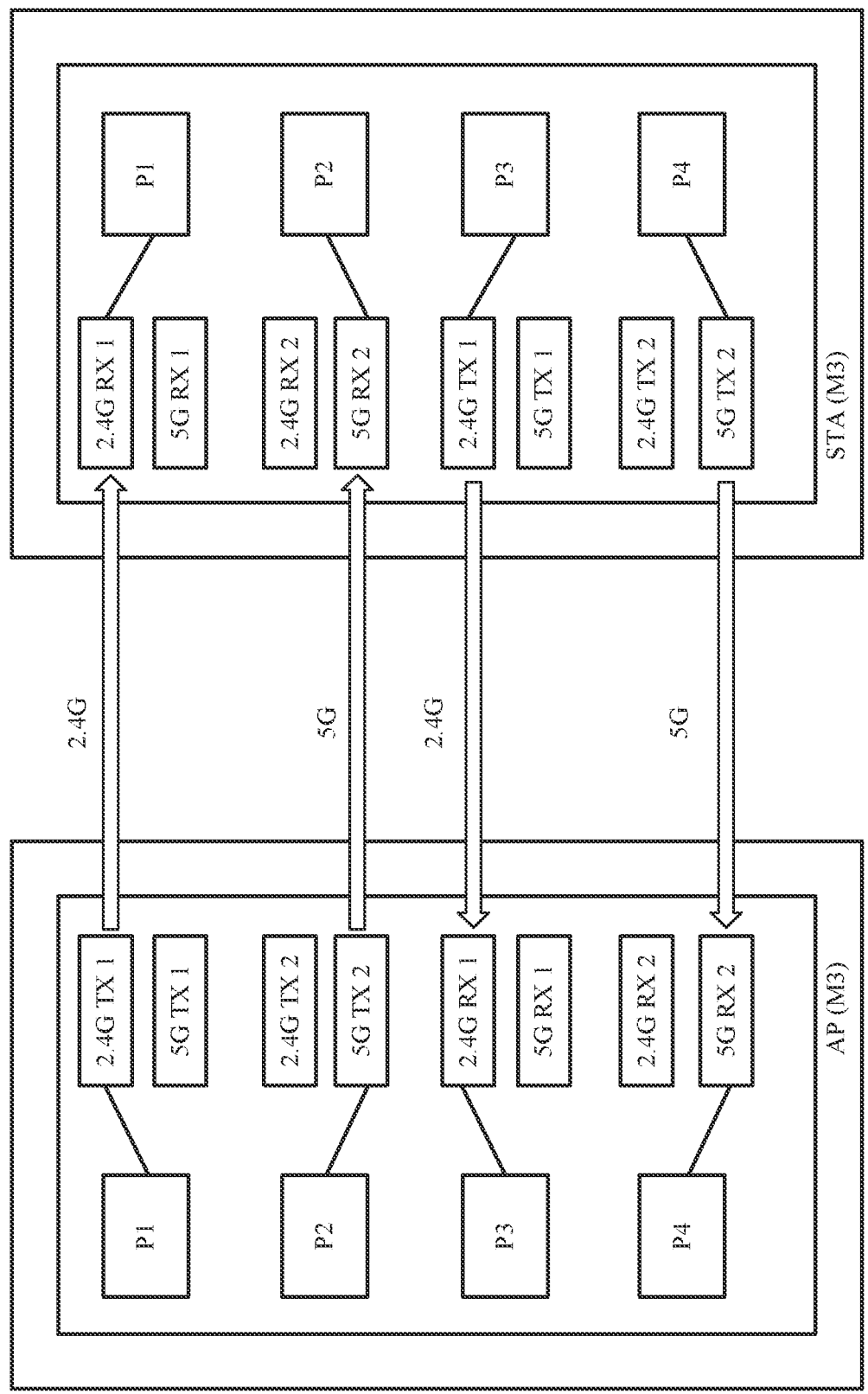
Figures 2, 16:
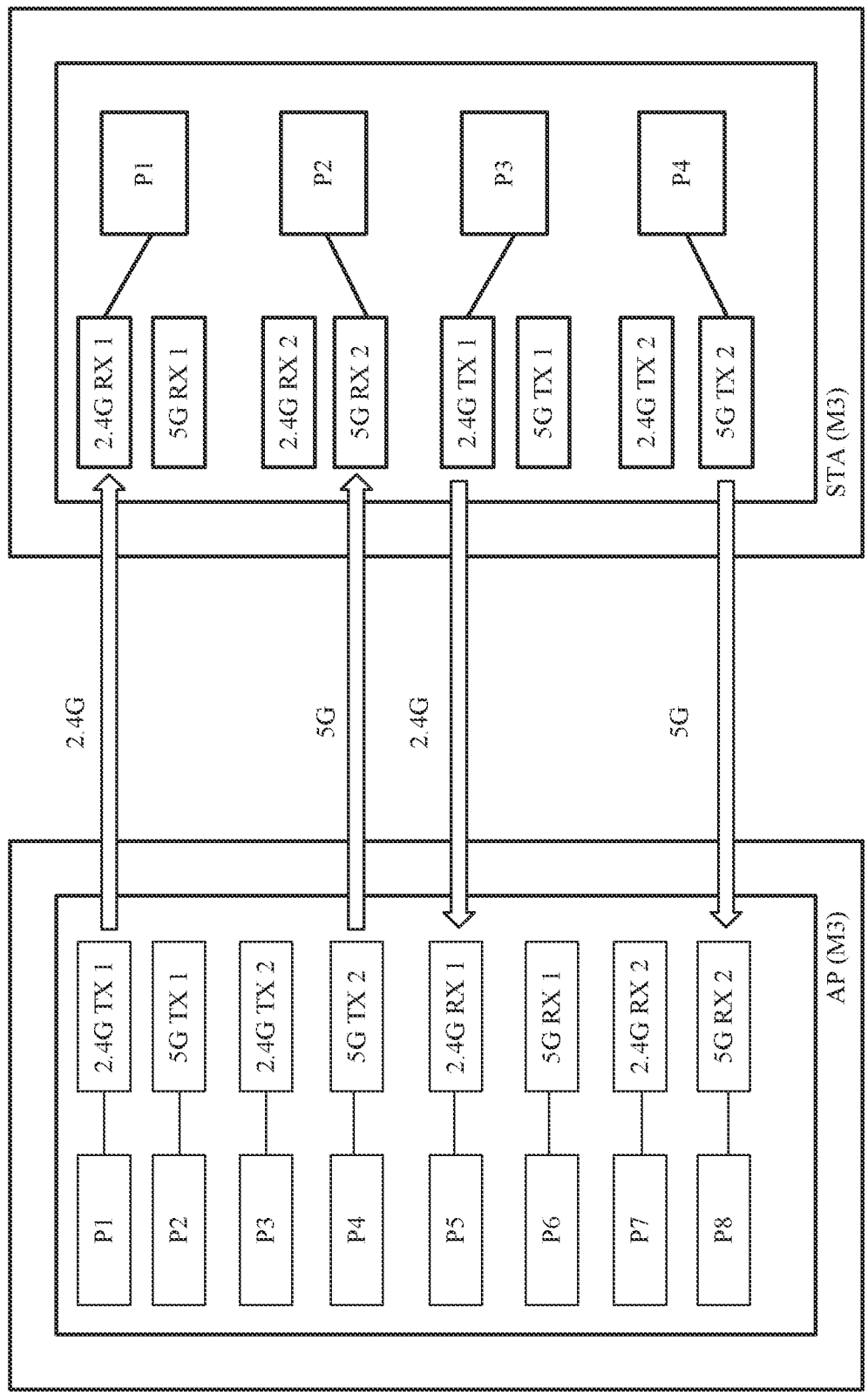
Figures 3, 16:
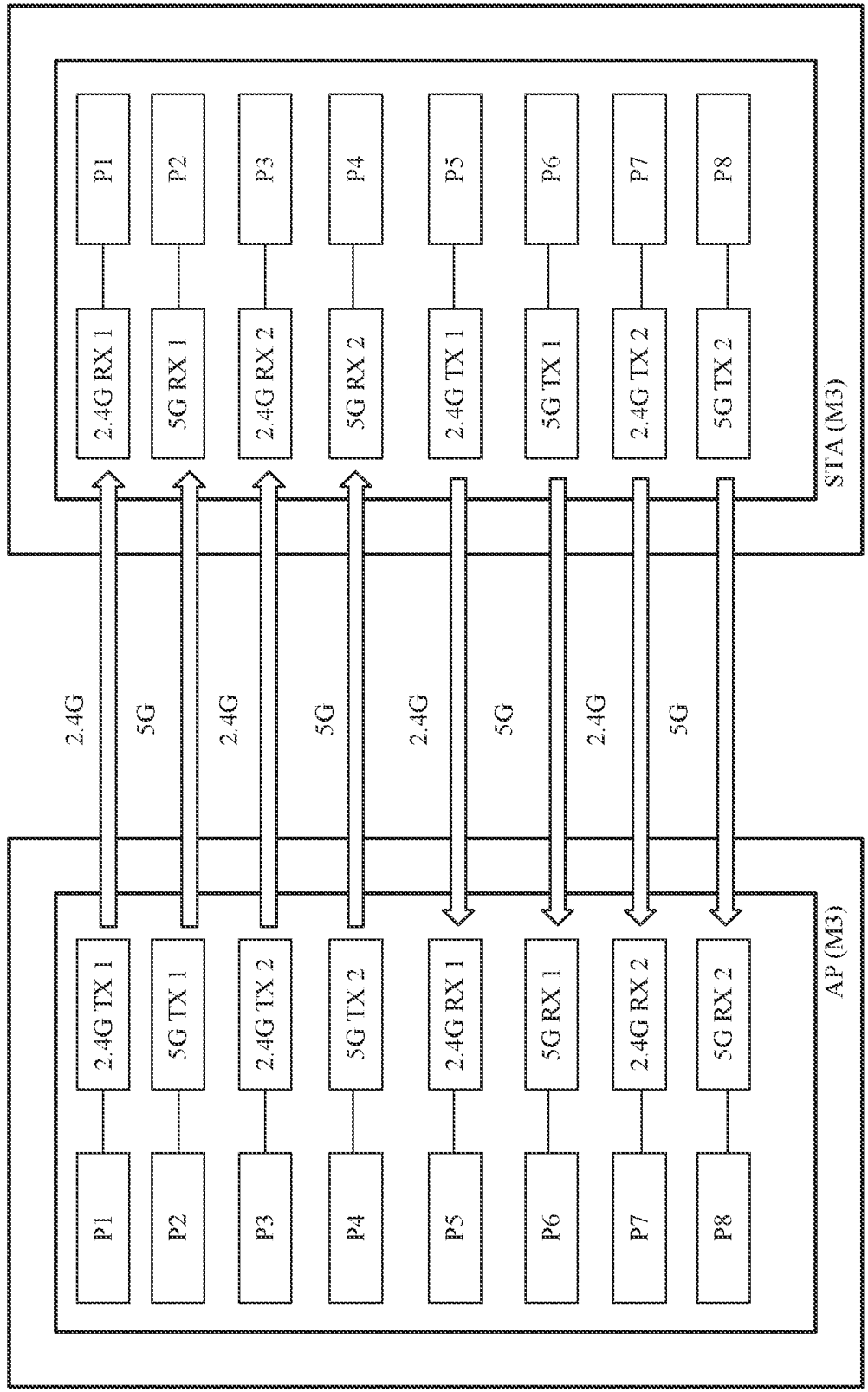

FIG. 16-1, FIG. 16-2, and FIG. 16-3 are schematic diagrams of communication existing when the working modes of both the AP end and the STA are the third mode M3 in a possible implementation. In this embodiment, both the wireless router AP and the STA are selectable dual-channel chips. Reference may be made to FIG. 16-1. In another embodiment of the present invention, the wireless router AP is a controllable dual-channel chip, and the STA is a selectable dual-channel chip. Reference may be made to FIG. 16-2. In solutions in FIG. 16-1 and FIG. 16-2, one 2.4G TX, one 5G TX, one 2.4G RX, and one 5G RX are disposed in each of the AP and the STA, and the AP and the STA may use dual-band concurrent of 1×1+1×1, and may simultaneously support transmission of one data stream on each of the 2.4G frequency band the 5G frequency band (in other words, 1×1 @2.4 GHz+1×1 @5 GHz). In another embodiment of the present invention, the wireless router AP is a controllable dual-channel chip, and the STA is a controllable dual-channel chip. Reference may be made to FIG. 16-3. In an embodiment in FIG. 16-3, two 2.4G TXs, two 5G TXs, two 2.4G RXs, and two 5G RXs are disposed in each of the AP and the STA, and the AP and the STA may use dual-band concurrent of 2×2+2×2, and may simultaneously support transmission of two data streams on each of the 2.4G frequency band the 5G frequency band (in other words, 2×2@2.4 GHz+2×2 @5 GHz).

When the working modes of both the AP end and the STA are the third mode M3, the uplink service data and the downlink service data of the STA are communicated on both the 2.4G frequency band and the 5G frequency band. The uplink service data of the STA may be uploaded by using the 2.4 TX and the 5G TX, and correspondingly, the AP end receives the data by using the 2.4 RX and the 5G RX. The downlink service data of the STA is downloaded by using the 2.4 RX and the 5G RX, and correspondingly, the AP end sends the data by using the 2.4 TX and the 5G TX.

Figures 1, 17:
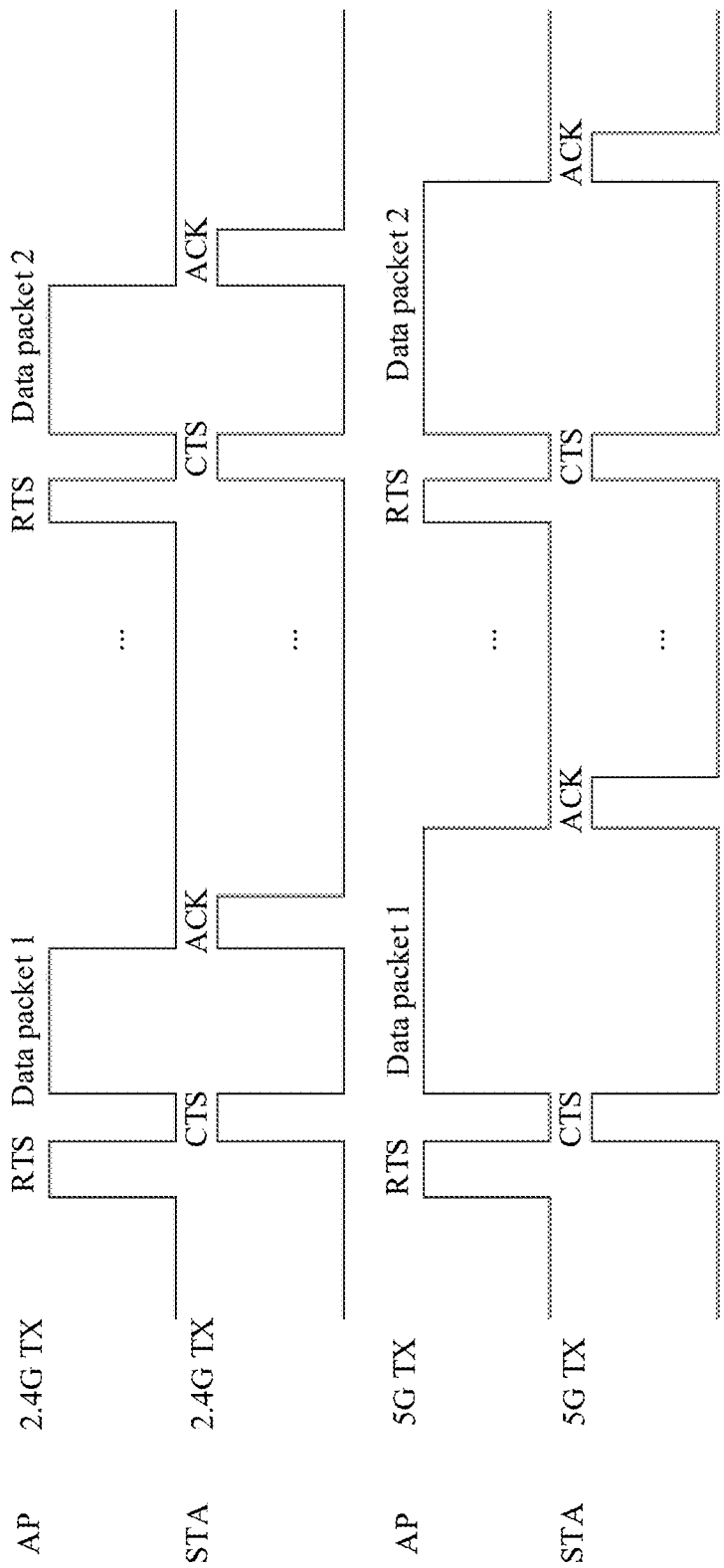
Figures 2, 17:
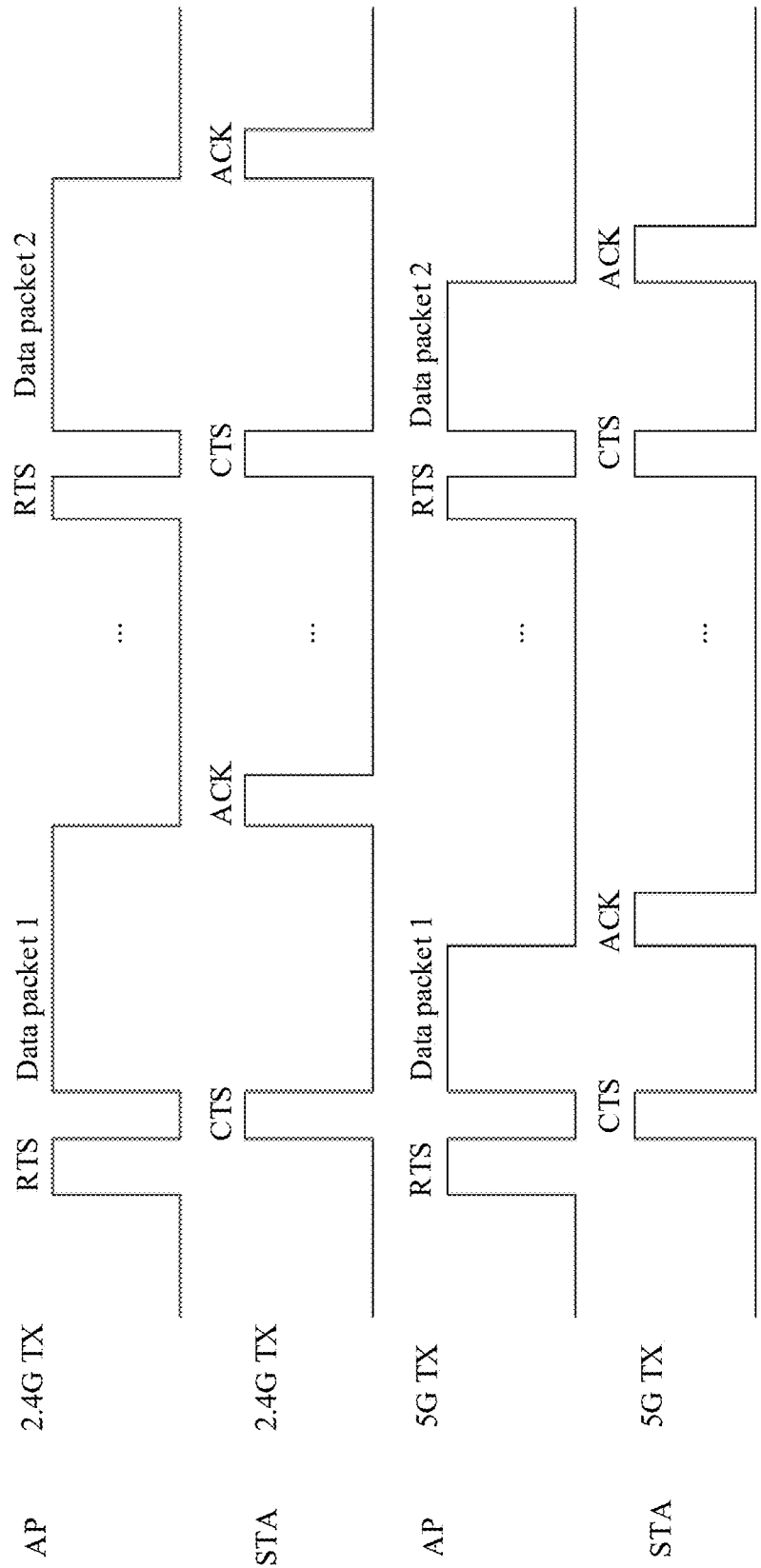
Figures 3, 17:
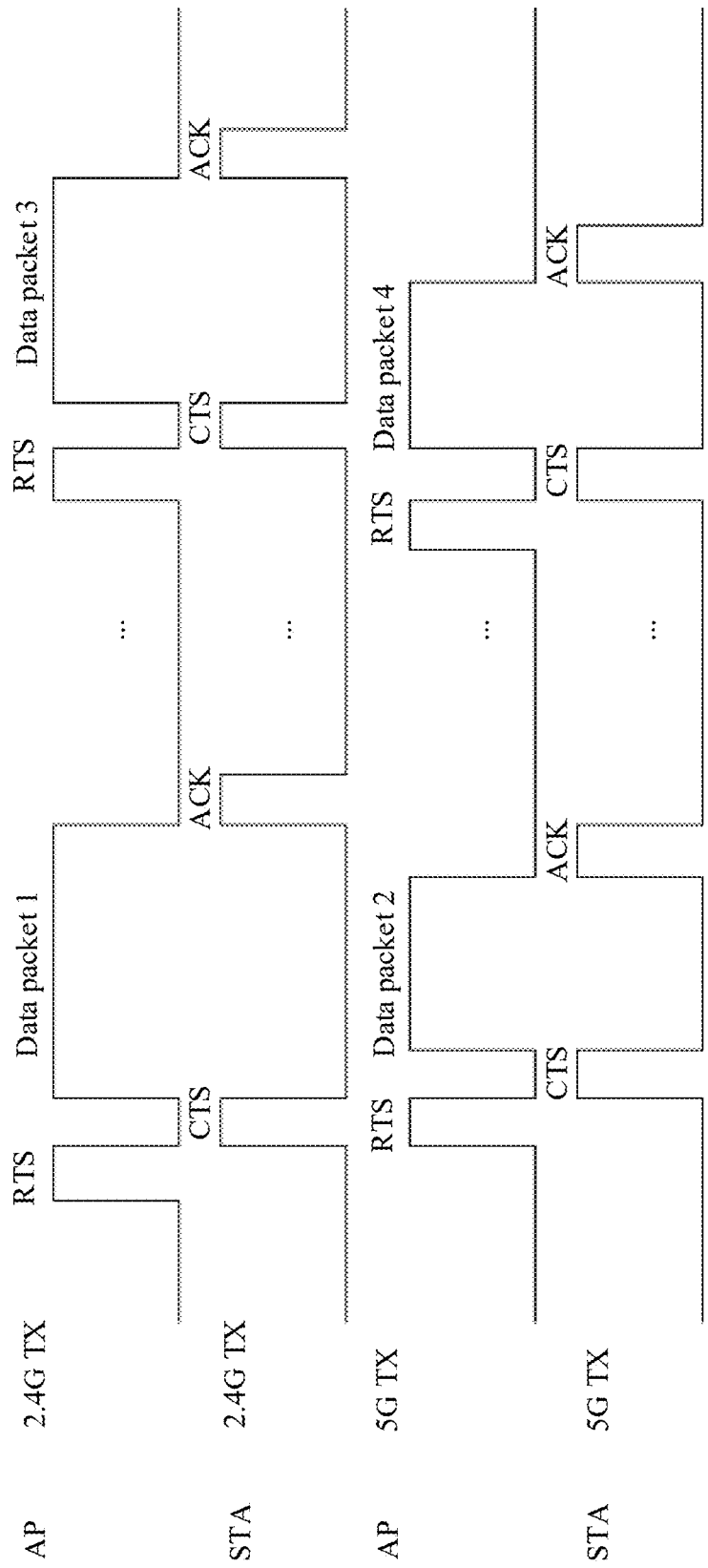

Data may be simultaneously transmitted on the 2.4G frequency band or the 5G frequency band. Therefore, when both the AP and the STA are in the third mode M3, the AP and the STA may transmit a same data packet or different data packets by using the 2.4G frequency band and the 5G frequency band. A Wi-Fi chip may be selected based on a specific requirement in a situation. For example, in a possible embodiment, based on different service types, it is preset that the third mode M3 is that a same data packet is transmitted when there are some service types. Some services may be services such as a game service, a video call, and a voice service, or may be other services that require a real-time high network rate. Different data packets are transmitted when there are some service types. Some services may be services such as evaluation, viewing a high-definition video, and screen casting, or may be other services that require a relatively high bandwidth or a relatively large data transmission amount. FIG. 17-1, FIG. 17-2, and FIG. 17-3 are schematic diagrams of data transmission existing when the working modes of both the AP end and the STA are the third mode M3 according to an embodiment of this application. Due to a relatively long distance between the terminal device and the wireless router end, there is a relatively weak 5G signal between the two devices. In this case, a transmission speed of data on the 2.4G frequency band or the 5G frequency band is not determined, and there may be a case in which the data is transmitted on the 2.4G frequency band at a higher speed or transmitted on the 5G frequency band at a higher speed. Therefore, during data transmission, the STA may simultaneously transmit a same data packet on the 2.4G frequency band and the 5G frequency band. As shown in FIG. 17-1 and FIG. 17-2, the 2.4G TX and 5G TX of the AP send a same data packet 1 to the STA. When receiving a data packet, a Wi-Fi chip of the STA receives, based on arrival times of data packets on the 2.4G frequency band and the 5G frequency band, the data packet 1 that arrives first, and discards the data packet 1 that arrives later. As shown in FIG. 17-1, there is a higher transmission speed on the 2.4G frequency band, and therefore the data packet sent on the 2.4G frequency band is first received. As shown in FIG. 17-2, there is a higher transmission speed on the 5G frequency band, and therefore the data packet sent on the 5G frequency band is first received. The Wi-Fi chip may parse the data packets, to determine whether the data packets are a same data packet. In a possible embodiment, an encapsulation process for a communication message usually includes a physical layer, a data link layer, a network layer, a transport layer, a session layer, a presentation layer, and an application layer from top to bottom A data packet is encapsulated from top to bottom based on the foregoing principle. The receive end decapsulates the data packet in an opposite direction, in other words, decapsulates the data packet from bottom to top. In a process of decompressing a data packet by the STA, if it is determined that data at a layer and data of a previous data packet are duplicate, it is determined that the data packet is a repeatedly transmitted data packet, and the data packet is discarded. A same data packet is simultaneously transmitted on the 2.4G frequency band the 5G frequency band, and therefore a data transmission speed can be increased.

FIG. 17-3 is a schematic diagram of data transmission existing when the working modes of both the AP end and the STA are the third mode M3 according to an embodiment of this application. As shown in the figure, at a same time, the AP transmits different data packets to the STA on the 2.4G frequency band and the 5G frequency band, the 2.4G TX of the AP sends a data packet 1, and the 5G TX sends a same data packet 2. Alternatively, at a same time, the 2.4G TX of the AP sends a data packet 3, and the 5G TX sends a same data packet 4. The Wi-Fi chip performs automatic allocation for the data packets, and sequentially sends the data packets on different frequency bands. Different data packets are simultaneously transmitted on the 2.4G frequency band and the 5G frequency band, and therefore a throughput of data transmission in a unit time can be increased.

When the working mode of the STA is the first service state, there is a balance between the uplink service volume and the downlink service volume, and therefore the STA chooses to connect to the 2.4G RX, the 2.4 TX, the 5G RX, and the 5G TX, so that information can be evenly sent and received on the 2.4G frequency band and the 5G frequency band, and there is a balance between an uplink data transmission rate and a downlink data transmission rate. In comparison with the first mode M1, a 2.4G channel is added to perform data transmission, and therefore a radiation range of a wireless signal is expanded, and the wireless signal strength can be improved. In addition, advantages that a 2.4G signal can be transmitted over a long distance and a 5G signal has a high transmission rate are used, and therefore overall communication quality and transmission efficiency are improved.

S133: If determining that the service state is not the first service state, determine, based on an uplink throughput and a downlink throughput of a service, that the service state is a second service state or a third service state.

When the service state is that an uplink service volume is greater than a downlink service volume, it is determined that the service state is the second service state. When the service state is that a downlink service volume is greater than an uplink service volume, it is determined that the service state is the third service state. The service volume may be evaluated by using the uplink throughput and the downlink throughput.

The uplink throughput and the downlink throughput of the service may be obtained by executing AT drive commands "iwpriv wl0 get_tx_throughput" and "iwpriv wl0 get_rx_throughput" or same functional commands, or by querying corresponding interface parameters by the Wi-Fi chip of the AP end. In a possible implementation, in a preset time T, for example, 10 seconds, when the AP end detects that a TX throughput is greater than an RX throughput, and correspondingly, a TX throughput of the STA is less than an RX throughput in this case, it is determined that the service state is the second service state; or when the AP detects that a TX throughput is less than an RX throughput, and correspondingly, a TX throughput of the STA is greater than an RX throughput in this case, it is determined that the service state is the third service state.

In another embodiment of the present invention, if the AP establishes a communication connection to a plurality of STAs, a TX throughput or an RX throughput of a STA is obtained by using a MAC address or an ID address in a data frame.

S134: If the service state is the second service state, determine that the working mode of the STA is a fourth mode M4, and the corresponding working mode of the AP end is a fifth mode M5, where the fourth mode is sending data on the 2.4G frequency band, and receiving data on the 5G frequency band, and the fifth mode is sending data on the 5G frequency band, and receiving data on the 2.4G frequency band.

Figures 1, 18:
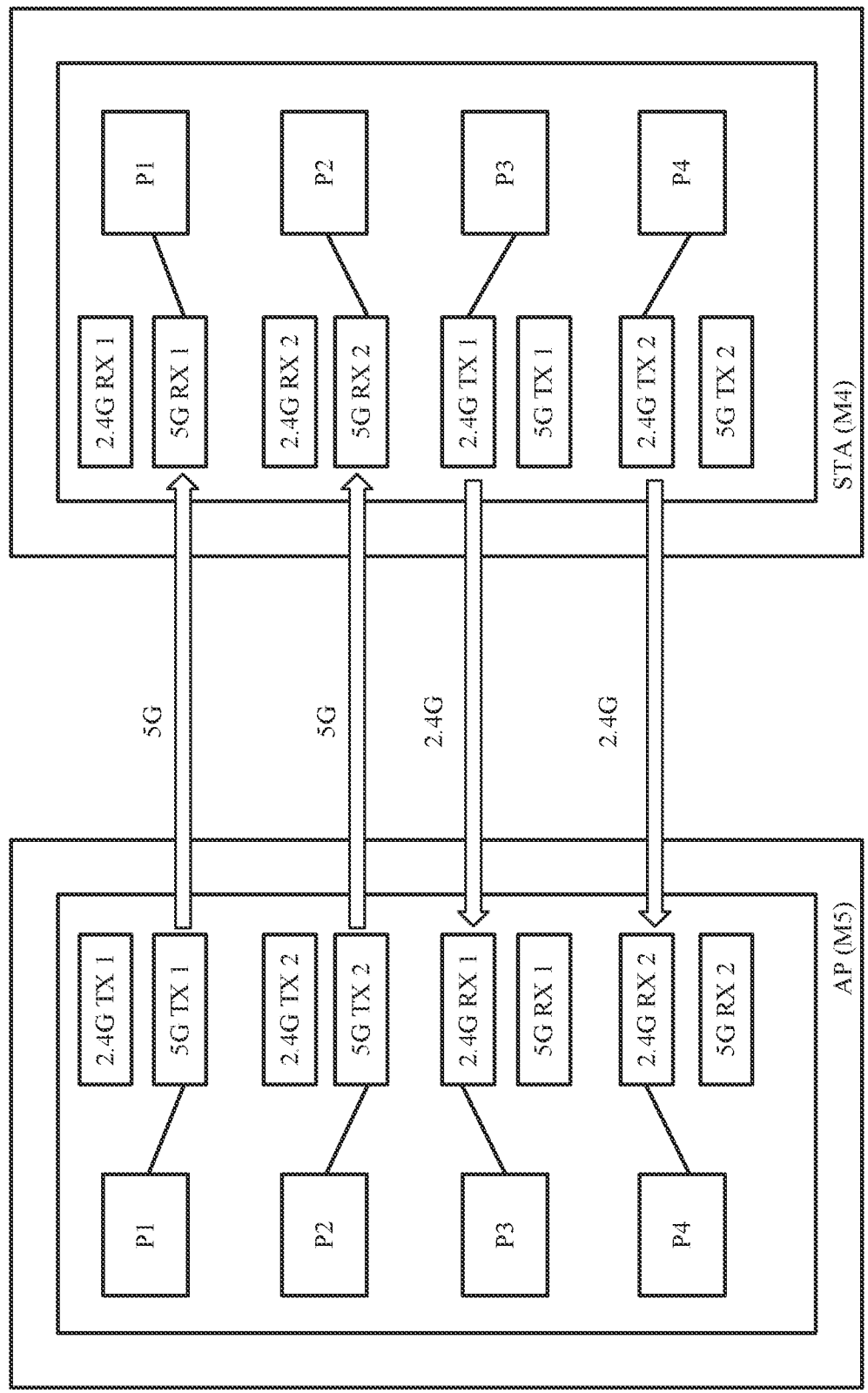
Figures 2, 18:
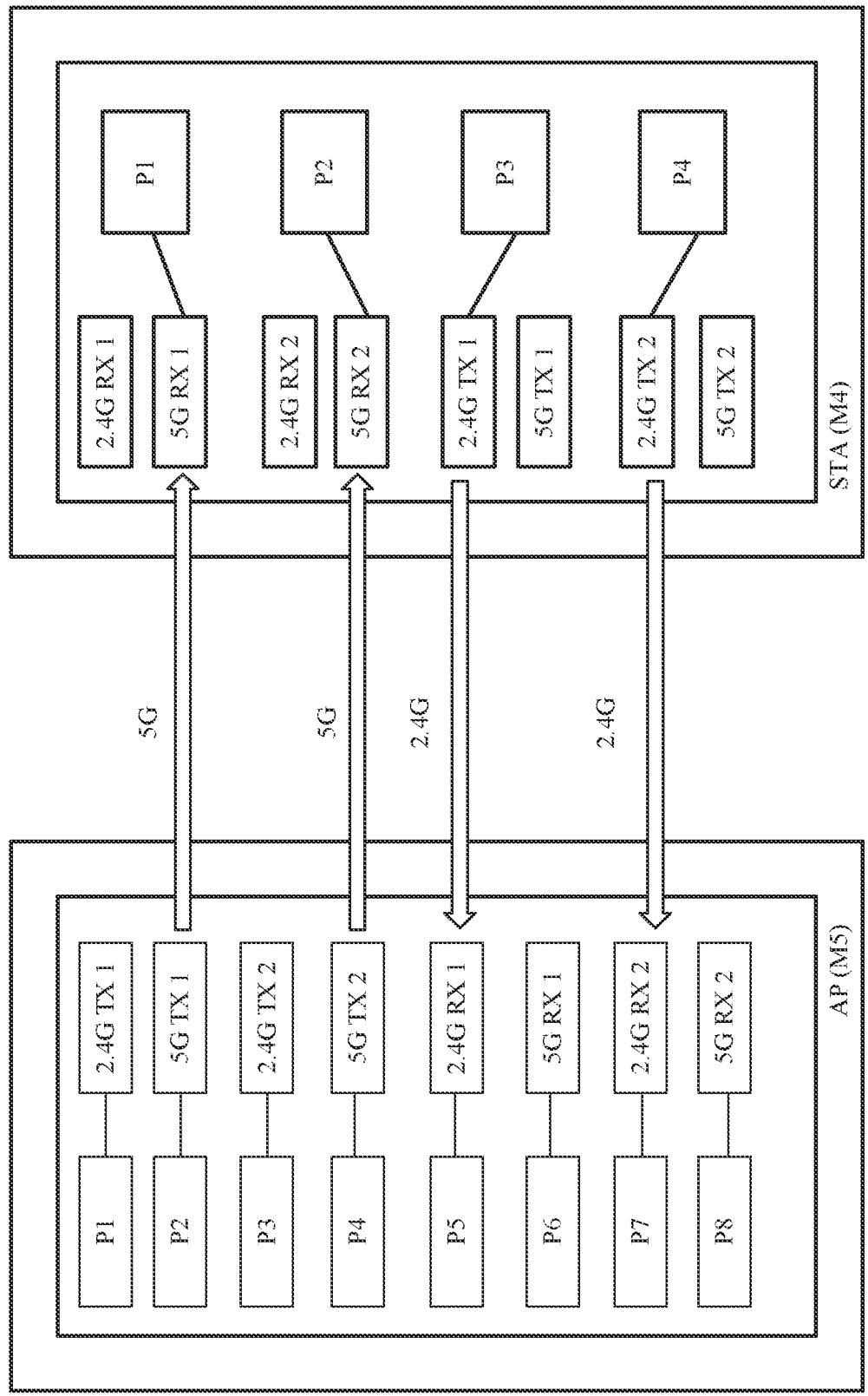
Figures 3, 18:
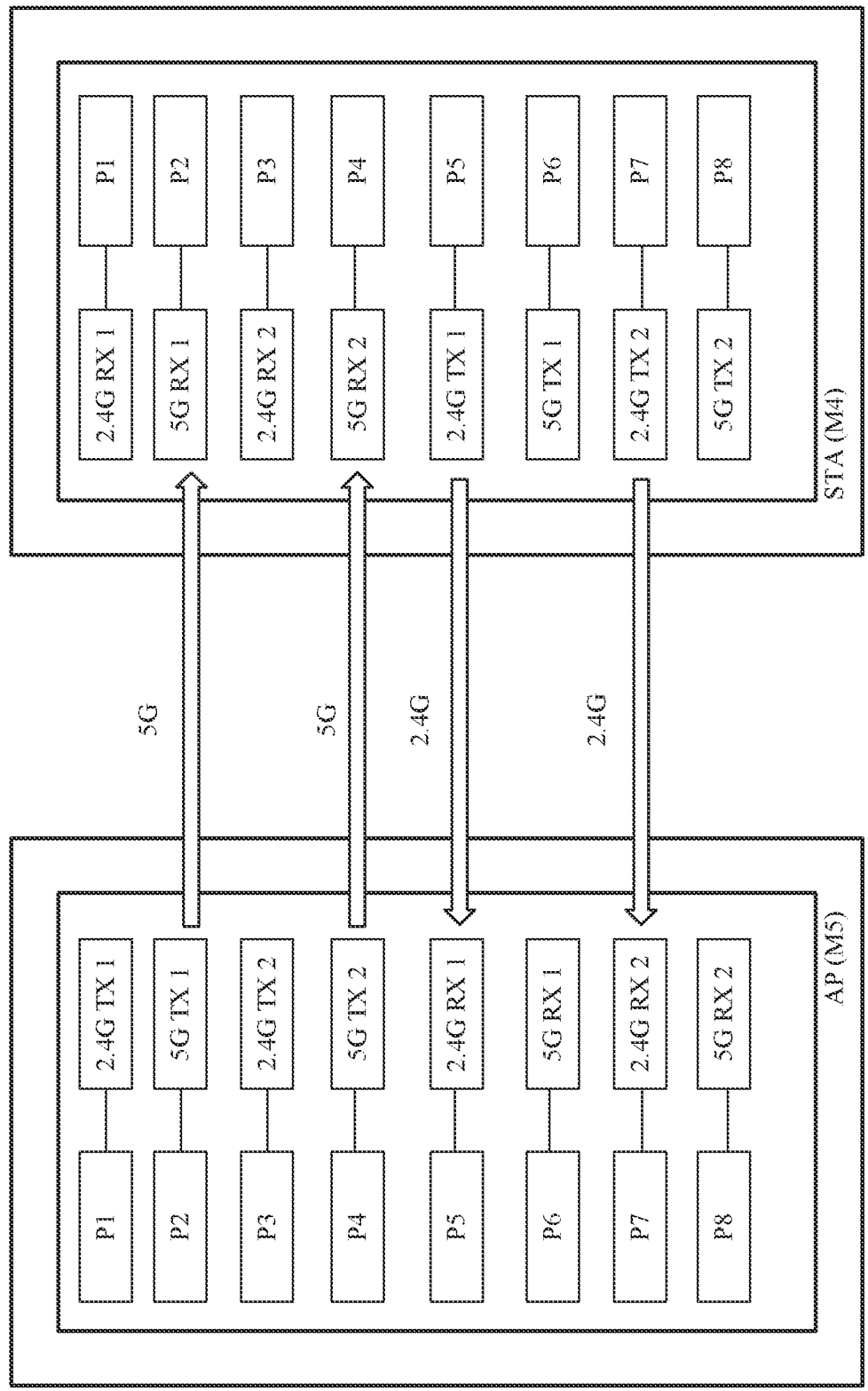

FIG. 18-1, FIG. 18-2, and FIG. 18-3 are schematic diagrams of communication existing when the AP is in the fifth mode M5 and the STA is in the fourth mode M4 in a possible implementation. FIG. 18-1 is a schematic diagram of communication existing when the working modes of both the AP end and the STA are the third mode M3 in a possible implementation. In this embodiment, both the wireless router AP and the STA are selectable dual-channel chips. Reference may be made to FIG. 18-1. In another embodiment of the present invention, the wireless router AP is a controllable dual-channel chip, and the STA is a selectable dual-channel chip. Reference may be made to FIG. 18-2. In another embodiment of the present invention, the wireless router AP is a controllable dual-channel chip, and the STA is a selectable dual-channel chip. Reference may be made to FIG. 18-3. Wi-Fi chip types of the wireless router AP and the STA may be selected based on a communication requirement of an actual product. In a possible implementation, when the STA is in the fourth mode M4, the uplink data of the STA is uploaded by using the 2.4G TX, and correspondingly, when the AP end is in the fifth mode M5, the data is received by using the 2.4G RX; and when the STA is in the fourth mode M4, the downlink data of the STA is downloaded by using the 5G RX, and correspondingly, when the AP end is in the fifth mode M5, the data is sent by using the 5G TX. When the STA is in the fourth mode M4 and the AP end is in the fifth mode M5, the uplink service data of the STA is communicated on the 2.4G frequency band, and the downlink service data of the STA is communicated on the 5G frequency band.

When the service state is the second service state, a throughput of an uplink service of the STA is relatively large. Due to a relatively long distance between the STA and the AP end, a signal transmitted by the STA on the 5G frequency band is relatively weak, and consequently there is poor communication quality. When the STA switches to the 2.4G frequency band to send a signal, a radiation range of a signal of data on the 2.4G frequency band is larger, and therefore strength of the signal transmitted by the STA is improved, and a data uploading rate of the STA is increased. In addition, during uploading by the STA, the AP end needs to receive a signal by using the corresponding 2.4G frequency band. For a downlink service of the STA, 5G information is still used to download data. The uplink service does not occupy the 5G frequency band, and therefore strength of a signal received on the 5G frequency band is improved, and a data download rate of the STA is increased.

Figure 19:
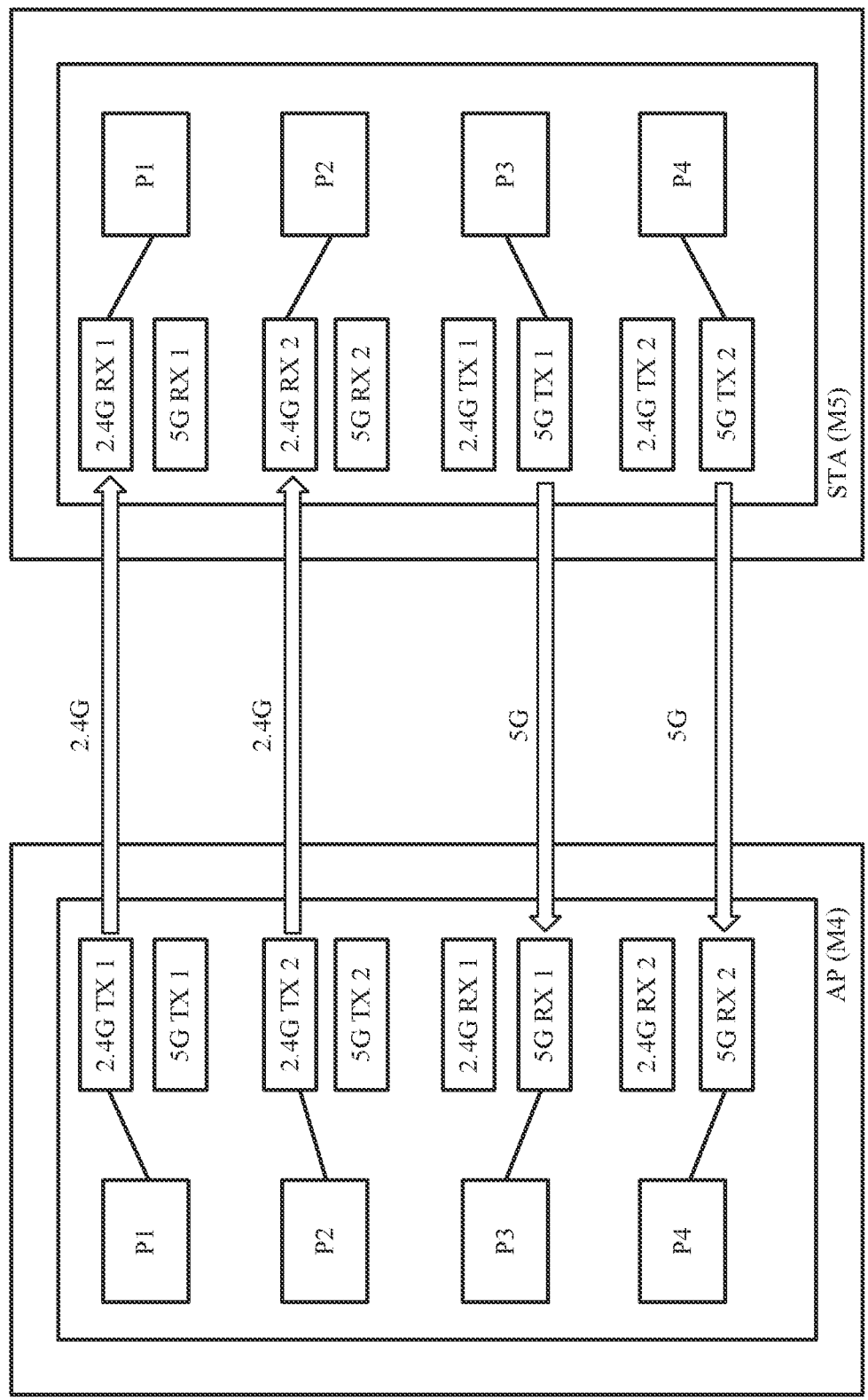
FIG. 19 is a schematic diagram of communication existing when a STA is in a fourth mode M4 and an AP is in a fifth mode M5 according to an embodiment of this application.

S135: If the service state is the third service state, determine that the working mode of the STA is a fifth mode M5, and the corresponding working mode of the AP end is a fourth mode M4. FIG. 19 is a schematic diagram of communication existing when the STA is in the fifth mode M5 and the AP is in the fourth mode M4 in a possible implementation. In this embodiment, both the wireless router AP and the STA are selectable dual-channel chips. In another embodiment of the present invention, for Wi-Fi chip types of the wireless router AP and the STA, different types of Wi-Fi chips may be selected based on a communication requirement of an actual product. A specific communication method is similar to the method shown in FIG. 17-1, FIG. 17-2, FIG. 17-3, FIG. 18-1, FIG. 18-2, and FIG. 18-3. Details are not described herein. When the STA is in the fifth mode M5 and the AP end is in the fourth mode M4, the uplink service data of the STA is communicated on the 5G frequency band, and the downlink service data of the STA is communicated on the 2.4G frequency band. When the STA is in the fifth mode M5, the downlink data is downloaded by using the 2.4G RX, and correspondingly, when the AP end is in the fourth mode M4, the data is sent by using the 2.4G TX. When the STA is in the fifth mode M5, the uplink data of the STA is uploaded by using the 5G TX, and correspondingly, when the AP is in the fourth mode M4, the data is received by using the 5G RX.

When the service state is the third service state, a throughput of a downlink service of the STA is relatively large. Due to a relatively long distance, a signal received by the STA on the 5G frequency band is relatively weak, and consequently there is poor communication quality. When the STA switches to the 2.4G frequency to download data, a radiation range of a signal of data on the 2.4G frequency band is larger, and therefore strength of the signal received by the STA on the 5G frequency band is improved, and a data download rate of the STA is increased. In addition, during downloading by the STA, the AP end needs to send a signal by using the corresponding 2.4G frequency band. For an uplink service of the STA, 5G information is still used to transmit a signal. The downlink service does not occupy the 5G frequency band, and therefore strength of a signal transmitted by the STA is improved, and a data uploading rate of the STA is increased.

Figure 20:
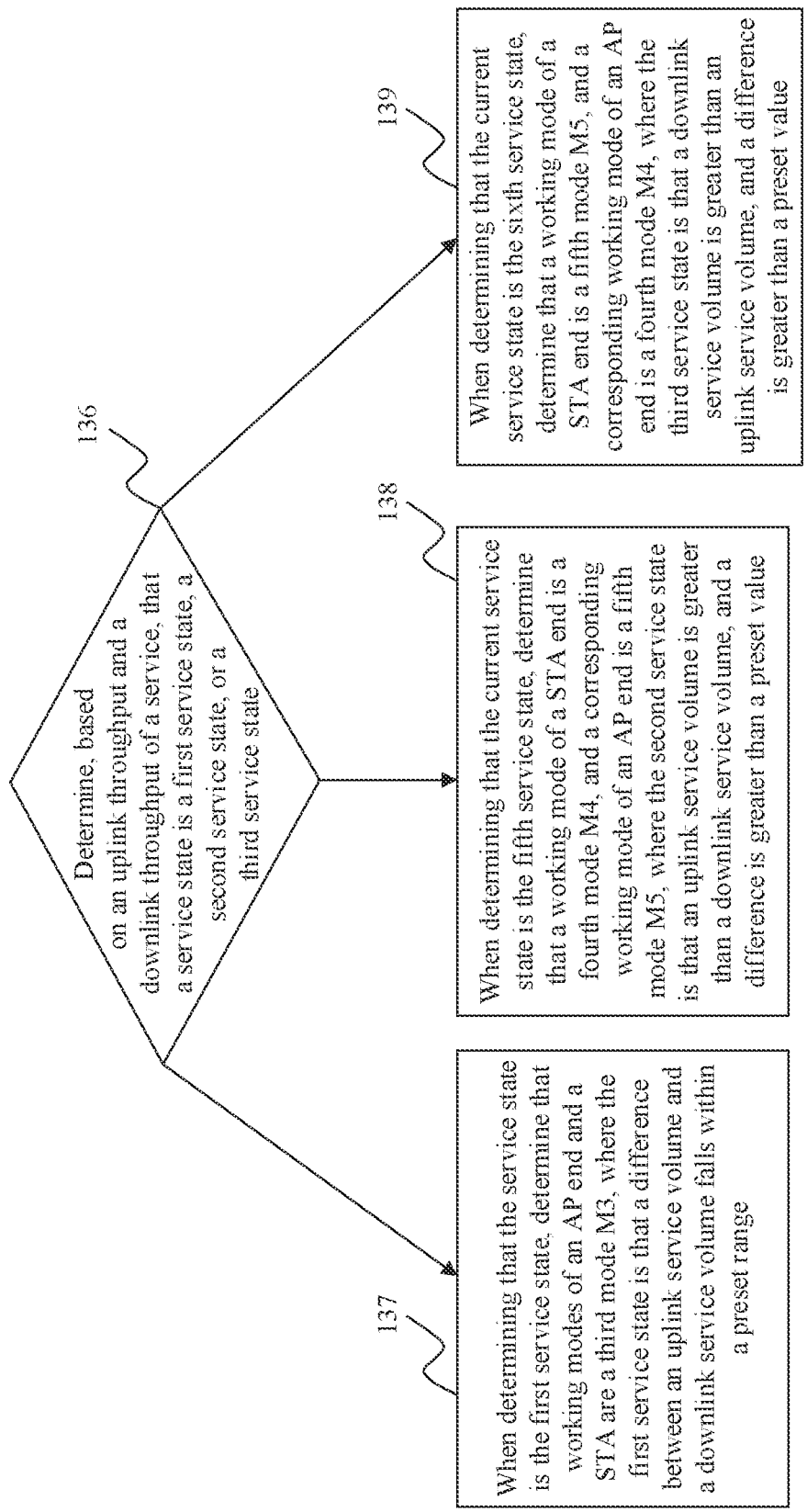
FIG. 20 is a flowchart of a method for determining a corresponding working mode according to an embodiment of this application.

In a possible implementation, FIG. 20 is a flowchart of a method for selecting a corresponding working mode in a possible implementation. Step S130 of determining, based on the service state, working modes that correspond to the AP and the STA and that are suitable for the current service state includes:

S136: Determine, based on an uplink throughput and a downlink throughput of a service, that the service state of the electronic device is a first service state, a second service state, or a third state.

The uplink throughput and the downlink throughput may be obtained by executing AT drive commands "iwpriv wl0 get_tx_throughput" and "iwpriv wl0 get_rx_throughput" or same functional commands, or by querying corresponding interface parameters by the Wi-Fi chip of the AP end.

In a possible implementation, a preset time T and a predetermined threshold N (N is a positive integer) are set, and in the preset time T, for example, 10 seconds, when the AP end detects that a difference between a TX throughput and an RX throughput falls within an interval [−N, +N], it is determined that the service state is the first service state; when the AP end detects that a TX throughput is greater than (an RX throughput+N), it is determined that the service state is the second service state; or when an RX throughput is greater than (a TX throughput+N), it is determined that the service state is the third service state. A value range of N is 0 and a positive number.

In a possible implementation, a preset time T and a predetermined threshold N (N is a positive integer) are set, and in the preset time T, for example, 10 seconds, when the AP end detects that a difference between a TX throughput and an RX throughput falls within an interval (−N, +N), it is determined that the service state is the first service state; when the AP end detects that a TX throughput is greater than or equal to (an RX throughput+N), it is determined that the service state is the second service state; or when an RX throughput is greater than or equal to (a TX throughput+N), it is determined that the service state is the third service state. A value range of N is 0 and a positive number.

S137: If determining that the service state is the first service state, determine that the working modes of the AP end and the STA are a third mode M3. A data transmission method existing when the AP and the STA are in the third mode M3 is similar to the foregoing related content. Details are not described herein.

S138: If determining that the service state is the second service state, determine that the working mode of the STA is a fourth mode M4, and the corresponding working mode of the AP end is a fifth mode M5. A data transmission method existing when the STA is in the fourth mode M4 and the AP is in the fifth mode M5 is similar to the foregoing related content. Details are not described herein.

S139: If determining that the service state is the third service state, determine that the working mode of the STA is a fifth mode M5, and the corresponding working mode of the AP end is a fourth mode M4. A data transmission method existing when the STA is in the fifth mode M4 and the AP is in the fourth mode M5 is similar to the foregoing related content. Details are not described herein.

In the foregoing embodiment, the fourth mode M4 includes a fourth mode in a first state and a fourth mode in a second state, and the fifth mode M5 includes a fifth mode in the first state and a fifth mode in the second state. The first state is a half-duplex data transmission manner, and the second state is a full-duplex data transmission manner.

Figures 1, 21:
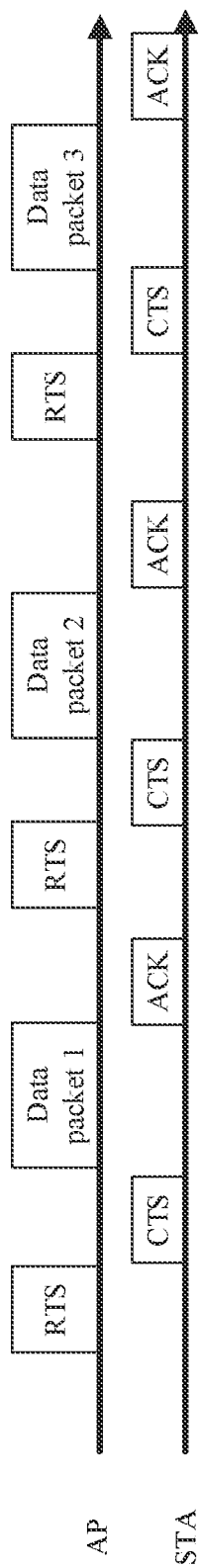
Figures 2, 21:
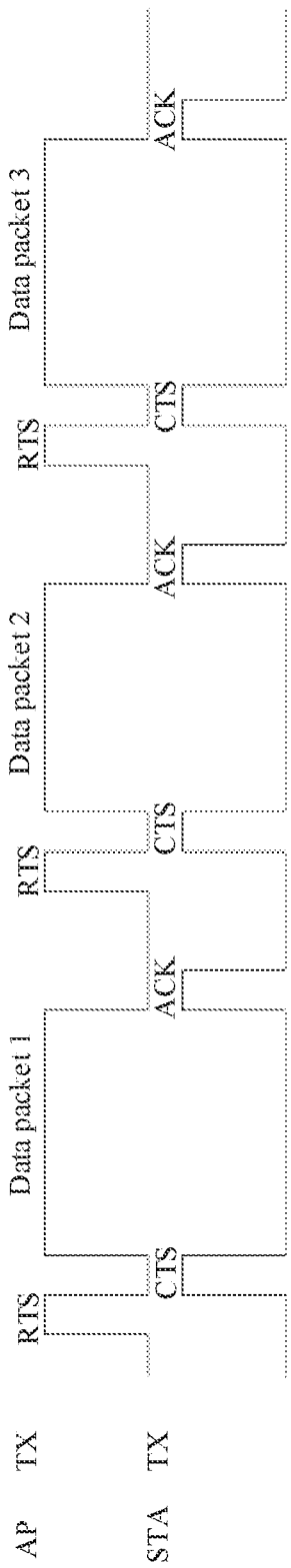
Figures 3, 21:
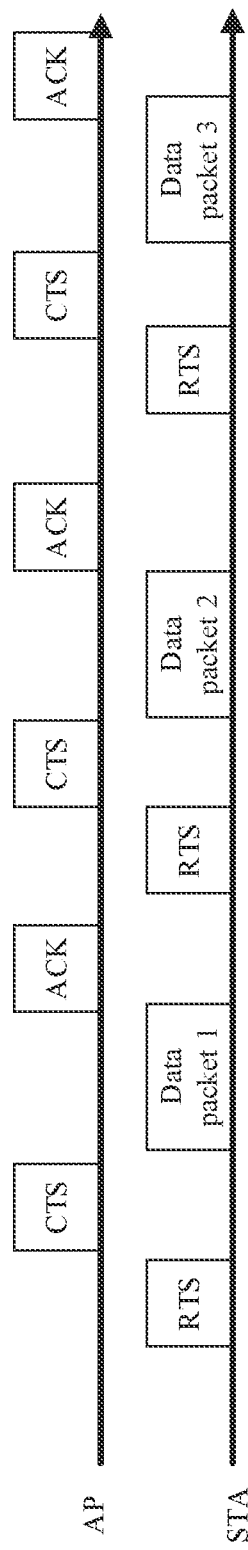
Figures 4, 21:
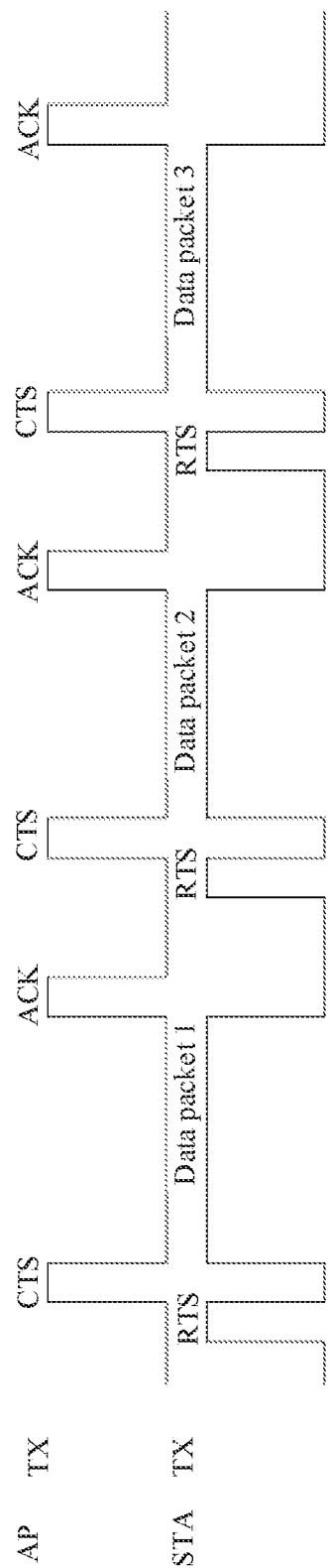
Figures 5, 21:
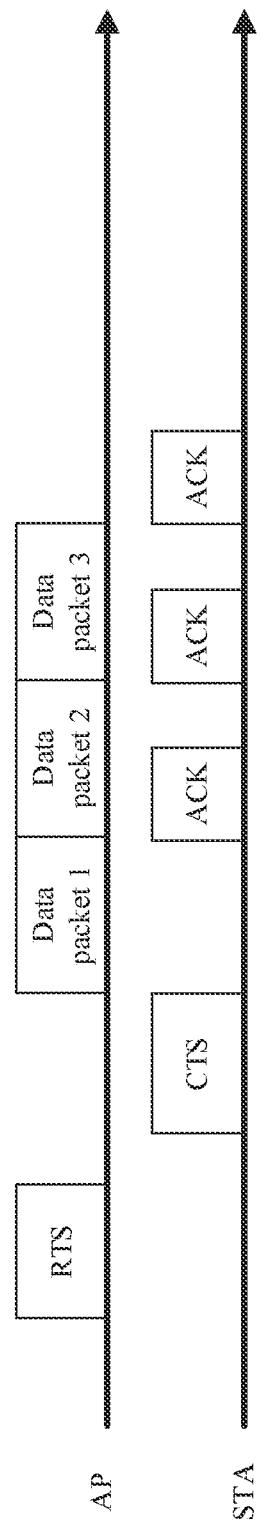
Figures 6, 21:
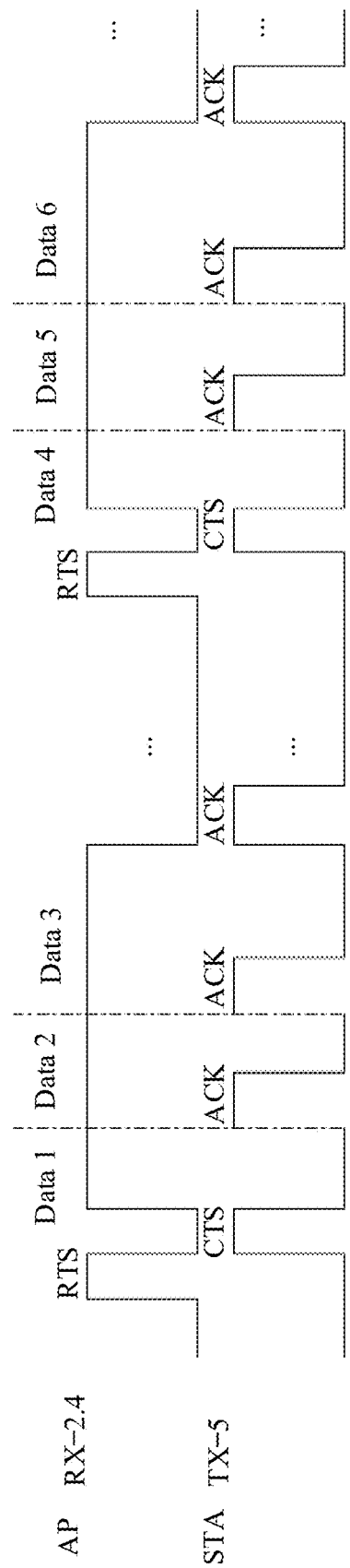

In a possible implementation, in the half-duplex data transmission manner, only one of the AP end and the STA can send data at a same time. FIG. 21-1 to FIG. 21-4 are schematic diagrams of communication between the AP and the STA in the half-duplex data transmission manner. As shown in FIG. 21-1, when the AP sends data to the STA, the transmit end AP first sends an RTX for query, and after receiving a CTS acknowledgement signal sent by the receive end STA, the AP learns, based on a received CTS frame, that the STA successfully receives an RTS frame and is ready to receive a data packet 1 to be sent by the AP. The AP starts to send the data packet 1, and the STA starts to receive the data packet 1. After receiving the data packet 1, the STA sends an ACK frame to the AP, to indicate that data receiving is completed.

FIG. 21-2 is a schematic diagram of link communication existing when the AP is in the half-duplex data transmission manner. The 2.4G TX (or 5G TX) of the transmit end AP first sends an RTS for query. After the STA receives the RTS, the STA sends a CTS acknowledgement signal by using the 2.4G RX (or 5G RX), and the 2.4G TX (or 5G TX) of the AP sends data. Only one of the AP and the STA sends (or receives) data at a same time.

FIG. 21-3 is a schematic diagram of link communication between the AP and the STA in the half-duplex data transmission manner in a possible implementation. When the STA sends data to the AP, the transmit end STA first sends an RTX for query, and after receiving a CTS acknowledgement signal sent by the receive end AP, the STA learns, based on a received CTS frame, that the AP successfully receives an RTS frame and is ready to receive a data packet 2 to be sent by the STA. The STA starts to send the data packet 2, and the AP starts to receive the data packet 2. After receiving the data packet 2, the AP sends an ACK frame to the STA, to indicate that data receiving is completed.

FIG. 21-4 is a schematic diagram of link communication existing when the AP is in the half-duplex data transmission manner. The 2.4G TX (or 5G TX) of the transmit end STA first sends an RTS for query. After the AP receives the RTS, the AP sends a CTS acknowledgement signal by using the 2.4G RX (or 5G RX), and the 2.4G TX (or 5G TX) of the STA sends data Only one of the AP and the STA sends (or receives) data at a same time.

In a possible implementation, when data transmission is performed by using the fourth mode M4 in the second state or the fifth mode M5 in the second state, an uplink frequency band and a downlink frequency band are different frequency bands, that is, working is independently implemented on the 2.4G frequency band and the 5G frequency band, a transmission protocol does not need to comply with a principle of query before transmission, and information may be simultaneously received or sent on the 2.4G frequency band and the 5G frequency band. Therefore, an information delay is reduced, a space loss value on a link can be reduced, a coverage area is increased, and an uplink and downlink coordination mechanism problem is alleviated.

FIG. 21-5 and FIG. 21-6 are schematic diagrams of communication between the AP and the STA in the full-duplex data transmission manner in a possible implementation. As shown in FIG. 21-5, when the AP needs to send a data packet combination to the STA, the AP first sends an RTS frame to the STA. After receiving a CTS frame sent by the STA, the AP learns, based on the received CTS frame, that the STA successfully receives the RTS frame and is ready to receive the data packet combination to be sent by the AP. In the full-duplex data transmission manner, the data packet combination to be sent may be a set of a plurality of data packets. For example, in an embodiment shown in FIG. 21-6, a first data packet combination includes a data packet 1, a data packet 2, and a data packet 3, and a second data packet combination includes a data packet 4, a data packet 5, and a data packet 6. A size of the data packet combination is determined based on a service type, and different preset values are set for different data packets based on the service type. For example, a size of a data packet combination of a game service may be 1 Kbps, and a size of a data packet combination of a video may be 2 M. After the AP receives the CTS frame sent by the STA, the TX of the AP starts to send the first data packet combination. In a process of sending the first data packet combination, the data packet 1, the data packet 2, and the data packet 3 are continuously sent. After receiving each data packet, the STA sends an ACK frame by using the TX, to indicate that the data packet is successfully received. In the full-duplex data transmission manner, data sent by the AP and data sent by the STA are sent by using different frequency bands. Therefore, for the data packet of the AP and the ACK of the STA, data may be simultaneously transmitted, so that data is continuously sent, to increase a data transmission speed.

Figure 22:
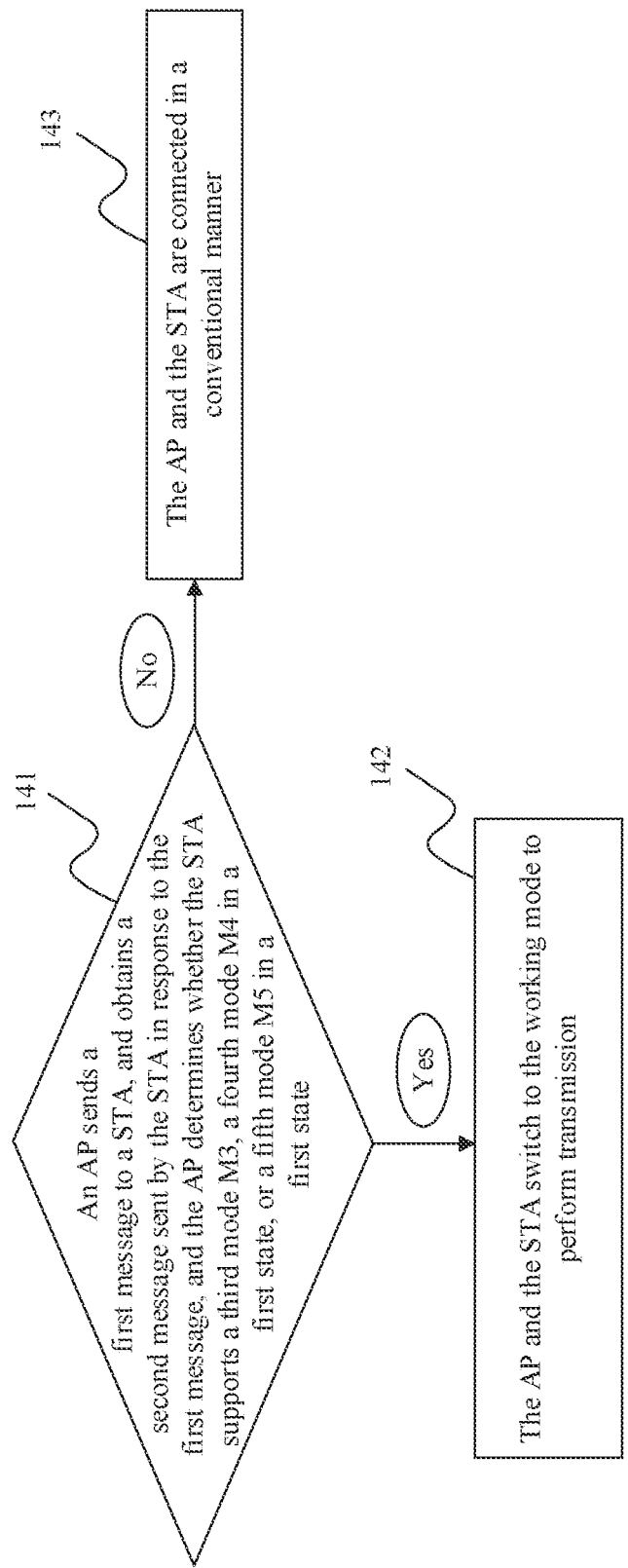
FIG. 22 is a flowchart of a method for switching to a corresponding working mode according to an embodiment of this application.

In a possible implementation, FIG. 22 is a flowchart of a method for switching to a corresponding working mode according to an embodiment of this application. Before step S140, the method includes:

S141: The AP sends a first message to the STA, and obtains a second message sent by the STA in response to the first message, and the AP determines whether the STA supports the third mode M3, the fourth mode M4 in the first state, or the fifth mode M5 in the first state.

The AP sends the first message to the STA, where the first message is used to query whether the STA supports the working mode, obtains the second message sent by the STA in response to the first message, and determines, based on the second message, whether the STA supports the working mode corresponding to the service state. The working mode includes the third mode M3, the fourth mode M4 in the first state, and the fifth mode M5 in the first state.

FIG. 22 is a schematic diagram of a method for determining, by the AP, whether the STA supports the working mode corresponding to the service state. The Wi-Fi chip of the AP end generates the first message based on a communication processing capability of the AP. The first message may include a first identifier, and the first identifier indicates whether the AP supports the corresponding working mode, for example, whether the AP supports the third mode M3, the fourth mode M4 in the first state, and the fifth mode M5 in the first state. The Wi-Fi chip of the AP end receives the second message returned by the STA. The second message includes a second identifier, and the second identifier indicates whether the STA supports the corresponding working mode, for example, whether the STA supports the third mode M3, the fourth mode M4 in the first state, and the fifth mode M5 in the first state.

In addition, when receiving the first message, the Wi-Fi chip of the STA generates the second message based on a rule or a protocol preset by the STA and a communication processing capability of the STA. The second identifier in the second message indicates whether the STA supports the corresponding working mode. The preset rule or protocol may be as follows: If the first identifier is that the AP supports the third mode M3, the corresponding second identifier is that the STA supports the third mode M3; if the first identifier is that the AP supports the fourth mode M4 in the first state, the corresponding second identifier is that the STA supports the fifth mode M5 in the first state; or if the first identifier is that the AP supports the fifth mode M5 in the first state, the corresponding second identifier is that the STA supports the fourth mode M4 in the first state. The communication processing capability is that whether the STA supports the corresponding working mode is determined based on a working mode that can be implemented by a switching module in the Wi-Fi chip of the STA.

The Wi-Fi chip of the AP end determines, based on the first identifier and the second identifier, whether the STA supports transmission in the corresponding working mode.

In some embodiments, the first message sent by the AP is a beacon frame. According to the protocol 802.11b-1999, a framework body of the beacon frame is shown in Table 1. In an implementation of the present invention, because a supported rates field is usually used to represent related state description of communication, a special flag bit is added to a blank flag bit in the supported rates field in the beacon, and whether the corresponding working mode is supported may be determined based on the special flag bit. In this embodiment, the special flag bit is used to determine whether the third mode M3, the fourth mode M4 in the first state, the fifth mode M5 in the first state, or the full-duplex data transmission manner is supported. For example, the third mode M3 is defined as 00A1, the fourth mode M4 in the first state is defined as 00A2, the fifth mode M5 in the first state is defined as 00A3, and the full-duplex data transmission manner is defined as 00B1.

| Order | Information | Note |
| --- | --- | --- |
| 1 | Timestamp | — |
| 2 | Beacon interval | — |
| 3 | Capability information | — |
| 4 | SSID | — |
| 5 | Supported rates | — |
| 6 | FH parameter set | 1 |
| 7 | DS parameter set | 2 |
| 8 | CF parameter set | 3 |
| 9 | IBSS parameter set | 4 |
| 10 | TIM | 5 |

In another embodiment of the present invention, the first identifier may be identified by using an element ID (Element id) in the message. The framework body includes a plurality of element IDs (Element id), a length (Length) and a value (Value) of the element ID are specified in the protocol, and an unused element ID is reserved. In a possible implementation, different values are defined for different working modes at a location of an element ID 221 in the message. When receiving a message that includes the element ID, the STA parses the element ID in the message and a value (Value) identified by the element ID.

In another embodiment of the present invention, the first message is a data frame, and it is queried, in content of the data frame, whether the STA supports the third mode M3, the fourth mode M4 in the first state, and the fifth mode M5 in the first state. In addition, when receiving the first message, the Wi-Fi chip of the STA generates the second message based on a communication processing capability of the STA, and the second identifier in the second message indicates whether the STA supports the third mode M3, the fourth mode M4 in the first state, and the fifth mode M5 in the first state.

In a possible implementation, the second message sent by the STA is a data frame, and content of the data frame includes the second identifier, indicating the communication processing capability of the STA and whether the corresponding working mode is supported. After receiving the first message sent by the AP, the STA makes a corresponding reply. The data frame may be communicated and exchanged by using a general protocol, for example, the 1905.1 protocol, or may be negotiated by using a proprietary protocol.

S142: If the STA supports the working mode corresponding to the service state, the AP and the STA switch to the working mode to perform transmission.

If the second message from the STA indicates that the working mode is supported, the AP end and the STA switch to the working mode, and perform data transmission. In this embodiment, the working mode is the third mode M3, the fourth mode M4 in the first state, or the fifth mode M5 in the first state.

After the working mode is determined, a processor of the Wi-Fi chip sends a switching instruction to a switching module, and the switching module determines a connection manner between a switching switch and a TX channel and an RX channel based on the instruction, and sends a connection acknowledgement instruction to the switching switch, so that the Wi-Fi chip switches to the corresponding working mode. The switching instruction is "wpriv wl1 write_reg b, wpriv wl2 write_reg b, 808, 11". Alternatively, the connection manner between the switching switch and the TX channel and the RX channel is obtained by using a same functional command.

In an embodiment of the present invention, after switching to the corresponding working mode, the AP sends a switching instruction to the STA. The switching instruction indicates the STA to switch to the corresponding working mode. When the STA receives the switching instruction, the Wi-Fi chip of the STA switches to the corresponding working mode, and sends a switching acknowledgement instruction to the AP. The switching acknowledgement instruction indicates that the STA has switched to the corresponding working mode. After receiving the switching acknowledgement instruction returned by the STA, the Wi-Fi chip of the AP starts to perform data transmission.

After switching the working mode, the AP end and the STA may perform communication by using a conventional data frame. Content of the data frame includes information such as a supported working mode. The data frame may be communicated and exchanged by using a general protocol, for example, the 1905.1 protocol, or may be negotiated by using a user-defined instruction or a proprietary protocol.

In a possible implementation, the switching acknowledgement instruction carries event code to indicate the STA to switch to the corresponding working mode. For example, 01 means to indicate the STA to switch to the first mode M1, 02 means to indicate the STA to switch to the second mode M2, 03 means to indicate the STA to switch to the third mode M3, 04 means to indicate the STA to switch to the fourth mode M4 in the first state, and 05 means to indicate the STA to switch to the fifth mode M5 in the first state.

S143: If the STA does not support the working mode corresponding to the service state, the AP and the STA are connected in a conventional manner.

Figure 23:
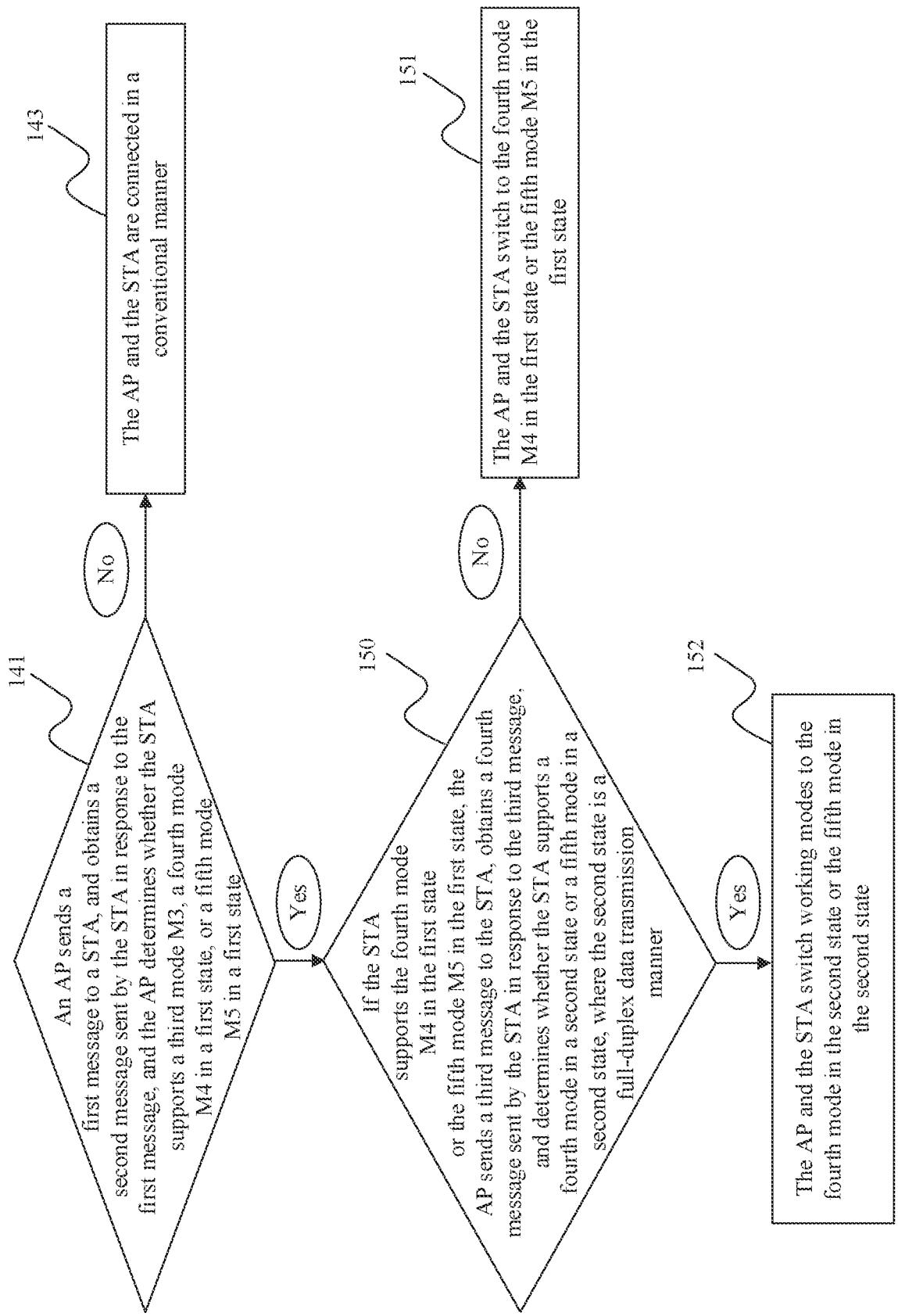
FIG. 23 is a flowchart of a method for switching to a corresponding working mode according to an embodiment of this application.

In a possible implementation, FIG. 23 is a flowchart of a method for switching to a corresponding working mode in a possible implementation. After step S141 of determining, by the AP, whether the STA supports the third mode M3, the fourth mode M4 in the first state, or the fifth mode M5 in the first state, the method further includes:

S150: If the STA supports the fourth mode M4 in the first state or the fifth mode M5 in the first state, the AP sends a third message to the STA, obtains a fourth message sent by the STA in response to the third message, and determines whether the STA supports the fourth mode in the second state or the fifth mode in the second state, where the second state is the full-duplex data transmission manner.

The AP sends the third message to the STA, where the third message may include a first identifier, and the first identifier indicates whether the AP supports the full-duplex data transmission manner, obtains the fourth message sent by the STA, and further determines whether the STA supports the full-duplex data transmission manner.

In a manner of transmitting the message, a conventional instruction or a user-defined instruction may be used. For details, refer to the foregoing content. Details are not described herein. In this embodiment, a beacon frame is used for the third message, and a special flag bit in the beacon frame is used to determine whether the full-duplex data transmission manner is supported. For example, if the full-duplex data transmission manner is supported, 00B1 is defined.

When receiving the third message, the Wi-Fi chip of the STA generates the fourth message based on a communication processing capability of the STA. A second identifier in the sixth message indicates the communication processing capability of the STA and whether the corresponding working mode is supported. Content related to the fourth message sent by the STA is similar to that related to the second message. Details are not described herein.

The Wi-Fi chip of the AP end receives the fourth message returned by the STA. The fourth message includes the second identifier, and the second identifier indicates whether the STA supports the full-duplex data transmission manner.

S151: If the STA does not support the full-duplex data transmission manner, the AP and the STA switch to the fourth mode M4 in the first state or the fifth mode M5 in the first state to perform transmission.

S152: If the STA supports the full-duplex data transmission manner, the AP and the STA switch the working modes to the fourth mode M4 in the second state or the fifth mode M5 in the second state to perform transmission.

Figure 24:
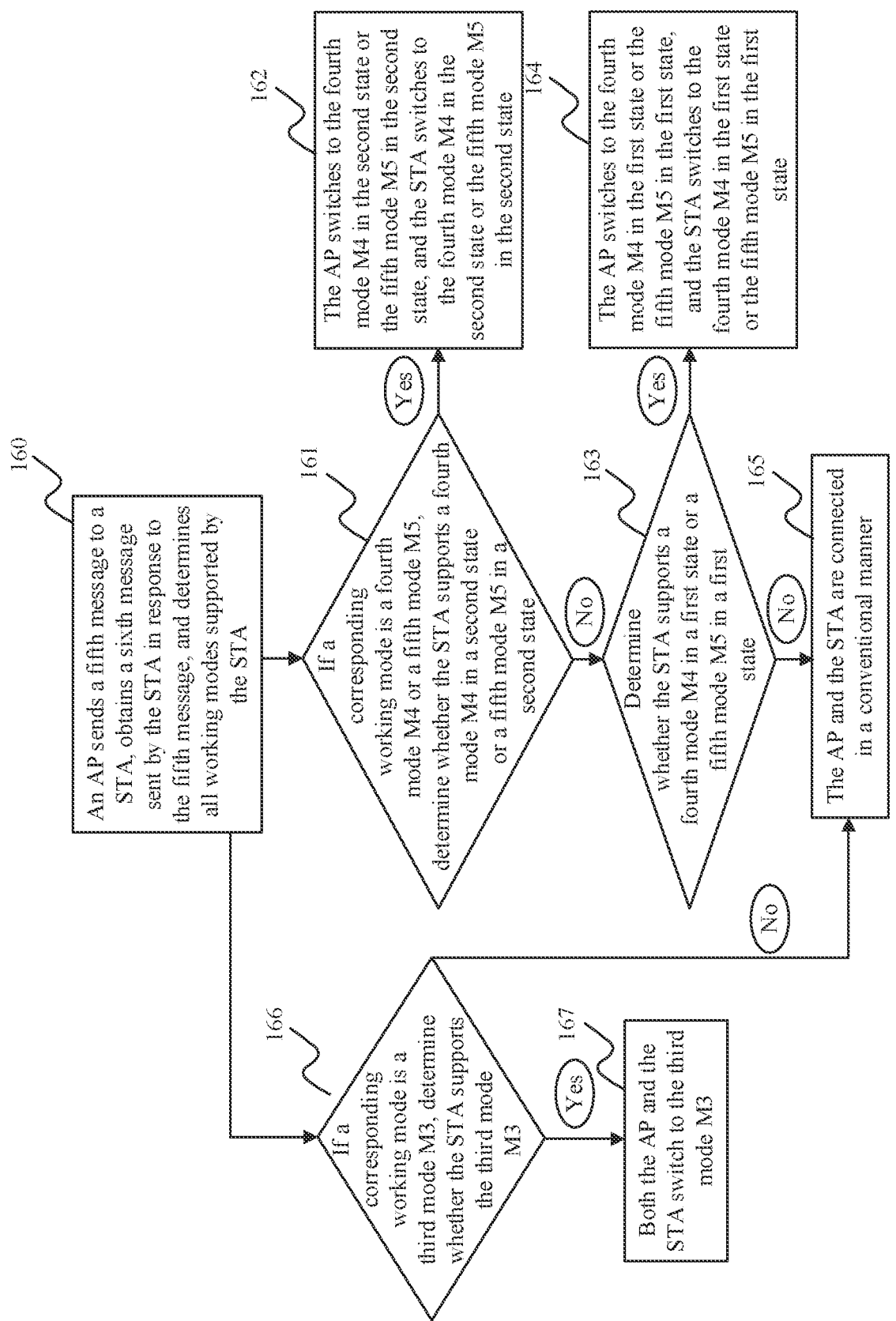
FIG. 24 is a flowchart of a method for switching to a corresponding working mode according to an embodiment of this application.

In a possible implementation. FIG. 24 is a flowchart of a method for switching to a corresponding working mode in a possible implementation. Before step S140, the method includes:

S160: The AP sends a fifth message to the STA, obtains a sixth message sent by the STA in response to the fifth message, and determines all working modes supported by the STA.

The AP sends the fifth message to the STA. The fifth message may include a first identifier, the first identifier indicates all working modes supported by the AP, and the all the supported working modes include whether the third mode M3, the fourth mode M4 in the first state, the fourth mode M4 in the second state, the fifth mode M5 in the first state, and the fifth mode M5 in the second state are supported.

In a manner of transmitting the message, a conventional instruction or a user-defined instruction may be used. For details, refer to the foregoing content. Details are not described herein. In this embodiment, a beacon frame is used for the fifth message, and a special flag bit in the beacon frame is used to determine whether the third mode M3, the fourth mode M4 in the first state, the fourth mode M4 in the second state, the fifth mode M5 in the first state, or the fifth mode M5 in the second state is supported. For example, the third mode M3 is defined as 00A1, the fourth mode M4 in the first state is defined as 00A2, the fifth mode M5 in the first state is defined as 00A3, the fourth mode M4 in the second state is defined as 00C1, and the fifth mode M5 in the second state is defined as 0021.

When receiving the fifth message, the Wi-Fi chip of the STA generates the sixth message based on a preset rule or protocol and a communication processing capability of the STA. A second identifier in the sixth message indicates all the working modes supported by the STA. The communication processing capability is that the working mode supported by the STA is determined based on a working mode that can be implemented by a switching module in the Wi-Fi chip of the STA.

The Wi-Fi chip of the AP end receives the sixth message returned by the STA, where the sixth message includes the second identifier, and determines, based on the sixth message, whether the STA supports the full-duplex or half-duplex data transmission manner.

In another embodiment of the present invention, the fifth message is a data frame, and it is queried, in content of the data frame, whether the STA supports the third mode M3, the fourth mode M4 in the first state, the fourth mode M4 in the second state, the fifth mode M5 in the first state, and the fifth mode M5 in the second state. In addition, when receiving the fifth message, the Wi-Fi chip of the STA generates the sixth message based on the communication processing capability of the STA, and the second identifier in the sixth message indicates all the working modes supported by the STA.

S161: If the corresponding working mode is the fourth mode M4 or the fifth mode M5, determine whether the STA supports the fourth mode M4 in the second state or the fifth mode M5 in the second state; or when the working mode corresponding to the STA is the third mode M3, directly perform step S166.

S162: When the STA supports the fourth mode M4 in the second state or the fifth mode M5 in the second state, the AP switches to the fourth mode M4 in the second state or the fifth mode M5 in the second state, and the STA switches to the fourth mode M4 in the second state or the fifth mode M5 in the second state.

S163: When the STA does not support the fourth mode M4 in the second state or the fifth mode M5 in the second state, determine whether the STA supports the fourth mode M4 in the first state or the fifth mode M5 in the first state.

S164: When the STA supports the fourth mode M4 in the first state or the fifth mode M5 in the first state, the AP switches to the fourth mode M4 in the first state or the fifth mode M5 in the first state, and the STA switches to the fourth mode M4 in the first state or the fifth mode M5 in the first state.

S165: When the STA does not support the fourth mode M4 in the first state or the fifth mode M5 in the first state, the AP and the STA are connected in a conventional manner.

S166: If the corresponding working mode is the third mode M3, determine whether the STA supports the third mode M3.

S167: When the STA supports the third mode M3, both the AP and the STA switch to the third mode M3.

S168: When the STA does not support the third mode M3, S165 is performed, and the AP and the STA are connected in a conventional manner.

In this embodiment, a manner of determining the mode supported by the STA is similar to the method in the foregoing embodiment. Details are not described herein.

Figure 25:
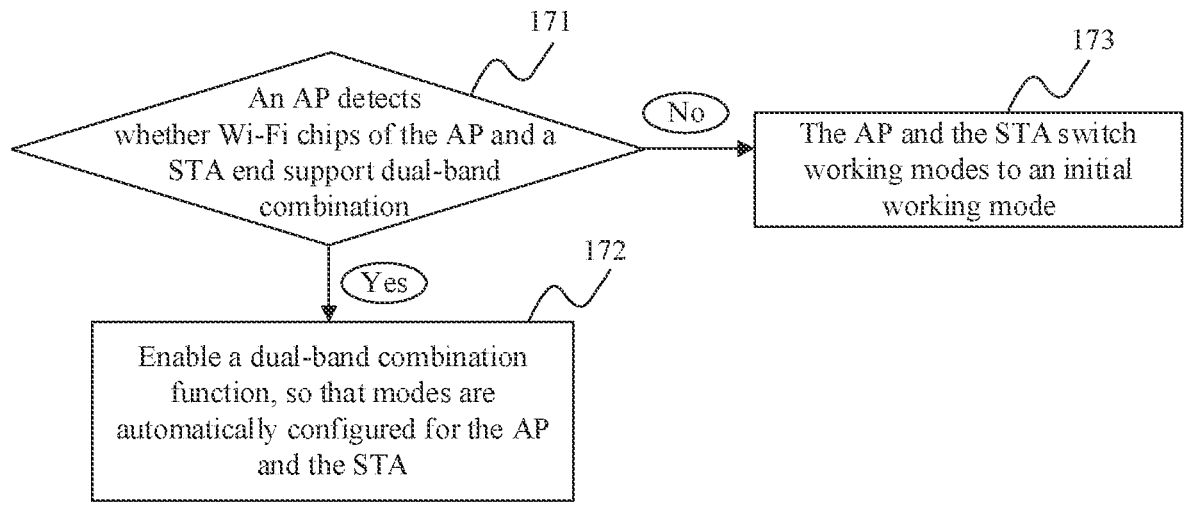
FIG. 25 is a flowchart of a method for connecting an AP and a STA in a conventional manner according to an embodiment of this application.

In a possible implementation, FIG. 25 is a flowchart of a method for connecting the AP and the STA in a conventional manner in a possible implementation. Step S143 of connecting the AP and the STA in a conventional manner includes:

S171: The AP detects whether the Wi-Fi chips of the AP and the STA support dual-band combination.

A dual-band combination function means that a same wireless SSID is used for a plurality of frequency bands. When there is a same wireless SSID, a related trigger rule is set, so that the AP may implement seamless switching between different frequency bands based on trigger of factors in different scenarios and environments. An AP and a STA that support dual-band combination may automatically switch to the 2.4G frequency band or the 5G frequency band for transmission based on an actual situation. After a dual-band combination mode is enabled, the AP usually automatically connects to the 5G frequency band with a higher speed when the AP is at a short distance, and connects to the 2.4G frequency band with better wall penetration quality when the AP is at a long distance. Based on a distance of a dual-band wireless terminal and an attribute of the wireless terminal, a wireless router automatically selects/switches to one of the frequency bands for the wireless terminal to connect.

S172: If the AP and the STA support a dual-band combination mode, a dual-band combination function is enabled, so that most proper modes are automatically configured for the AP and the STA.

S173: If the AP and the STA do not support a dual-band combination mode, the AP and the STA switch the working modes to the initial working mode, namely, the first mode or the second mode. FIG. 12 is a schematic diagram of a communication method existing when both the AP and the STA are in the working mode M2.

Figure 26:
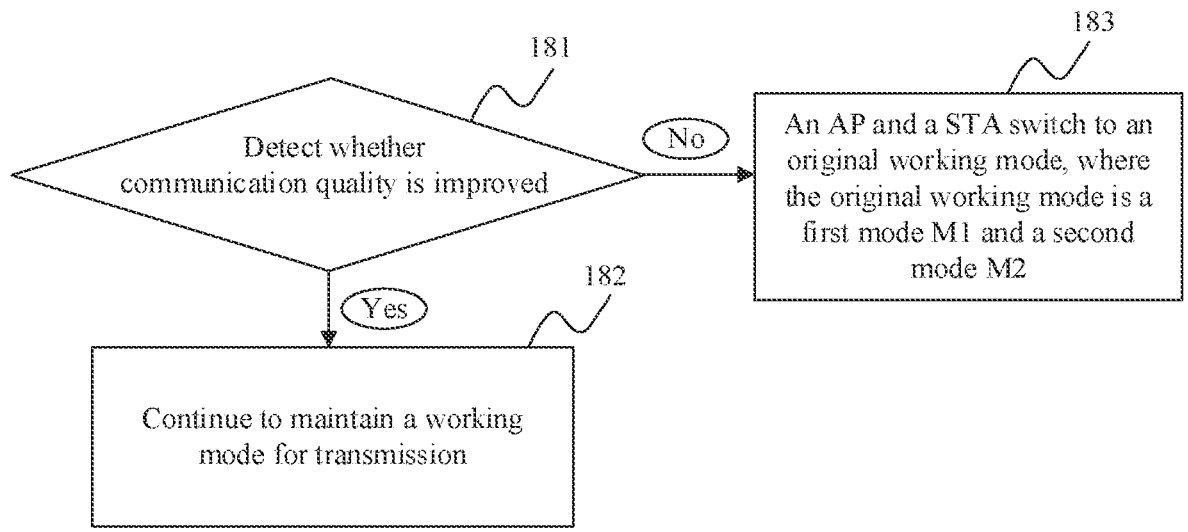
FIG. 26 is a schematic diagram of a method for detecting communication quality after a working mode is switched according to an embodiment of this application.

FIG. 26 is a schematic diagram of a method for detecting communication quality after a working mode is switched. After step S140 in which the AP and the STA switch to the corresponding working mode, the method further includes:

S181: The AP detects whether communication quality is improved.

The working mode includes the third mode M3, the fourth mode M4, and the fifth mode M5.

The communication quality may be detected by evaluating information transmission validity and reliability, for example, detecting a data transmission rate or a bit error rate.

In an embodiment of the present invention, whether the communication quality is improved is detected by using a PER (Package Error Rate). If a difference between a packet loss rate and an original packet loss rate is greater than a preset threshold, it indicates that packet loss is reduced, and the communication quality is improved. If the difference between the packet loss rate and the original packet loss rate falls within a preset threshold range, it indicates that the communication quality is not improved. A cause for packet loss may be network congestion, signal interference, multipath fading, or the like. If the packet loss rate is reduced, it indicates that after the mode is switched for data transmission, a network transmission environment is improved, and transmission efficiency is improved.

S182: If the communication quality is improved, continue to maintain the working mode for transmission.

S183: If the communication quality is not improved, the AP and the STA switch to the original working mode, where the original working mode is the first mode M1 and the second mode M2.

In another possible implementation. S210: The STA detects wireless signal strength existing when the AP communicates with the STA, and determines whether the signal strength is less than a preset value N. In this embodiment, the STA end detects signal strength received by a TX to evaluate the wireless signal strength between the AP and the STA. The wireless signal strength is an RSSI value.

In a possible implementation, a timing period T is set, and after the timing period T is reached, the AP end automatically initiates signal strength detection.

In a possible implementation, the preset value N is RSSI=−70 dBm.

S220: If the detected wireless signal strength is not less than the preset value N, it indicates that there is a good communication state between the AP and the STA, and in this case, the AP end and the STA are kept to continue to communicate in an original working mode, where the original working mode is a first mode M1 or a second mode M2.

S230: If the detected wireless signal strength is less than the preset value N, it indicates that there is poor wireless signal strength or a poor communication connection between the AP and the STA, and in this case, the STA end determines a current service state, and determines, based on the service state, working modes corresponding to the AP and the STA.

S240: The STA end switches to the corresponding working mode, and sends an instruction to indicate the AP to switch a working mode to the determined working mode that corresponds to the AP and that is suitable for the current service state, to perform data transmission.

In this embodiment, the determining a current service state, and determining, based on the service state, working modes corresponding to the AP and the STA in S230 is similar to the related part in S130. For details, refer to the foregoing description. Details are not described herein.

In this embodiment, after step S240, the method further includes:

After step S140 in which the AP and the STA switch to the corresponding working mode, the method further includes:

S281: The STA detects whether communication quality is improved.

The working mode includes a third mode M3, a fourth mode M4, and a fifth mode M5.

The communication quality may be detected by evaluating information transmission validity and reliability, for example, detecting a data transmission rate or a bit error rate.

In an embodiment of the present invention, whether the communication quality is improved is detected by using a PER (Package Error Rate). If a difference between a packet loss rate and an original packet loss rate is greater than a preset threshold, it indicates that packet loss is reduced, and the communication quality is improved. If the difference between the packet loss rate and the original packet loss rate falls within a preset threshold range, it indicates that the communication quality is not improved. A cause for packet loss may be network congestion, signal interference, multipath fading, or the like. If the packet loss rate is reduced, it indicates that after the mode is switched for data transmission, a network transmission environment is improved, and transmission efficiency is improved.

S282: If the communication quality is improved, continue to maintain the working mode for transmission.

S283: If the communication quality is not improved, the AP and the STA switch to the original working mode, where the original working mode is the first mode M1 and the second mode M2.

The wireless transmission method according to the embodiments of the present invention is described above in detail with reference to FIG. 1 to FIG. 26. A first electronic device and a second electronic device that implement the wireless transmission method in a possible implementation are described below in detail with reference to FIG. 27 and FIG. 28.

Figure 27:
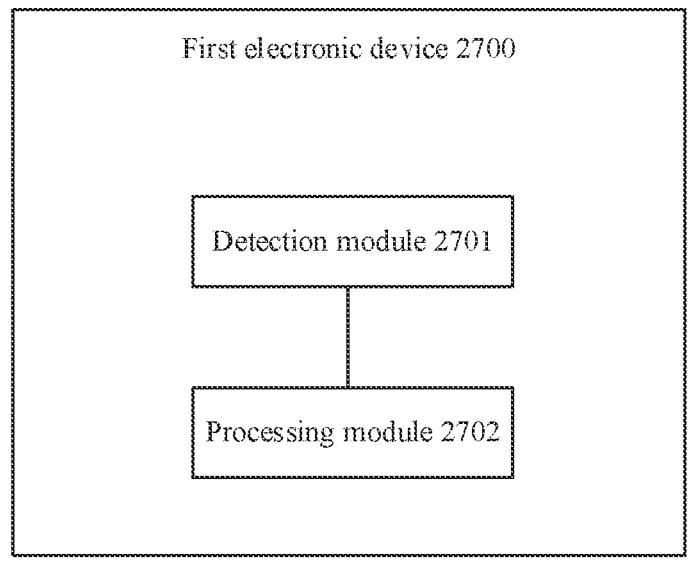
FIG. 27 is a schematic diagram of a structure of a first electronic device according to an embodiment of this application.

FIG. 27 is a schematic diagram of a structure of a first electronic device according to an embodiment of this application. The first electronic device 2700 includes: a detection module 2701, configured to: detect signal strength existing when the first electronic device communicates with a second electronic device, and determine whether the signal strength is less than a preset value, where both the first electronic device and the second electronic device work in a first mode or a second mode; and a processing module 2702, configured to: when the signal strength is less than the preset value, determine a current service state of the second electronic device, and determine, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band, where the processing module 2702 is further configured to: switch a working mode to the determined working mode that corresponds to the first electronic device and that is suitable for the current service state, and send an instruction to indicate the second electronic device to switch a working mode to the determined working mode that corresponds to the second electronic device and that is suitable for the current service state.

In some possible implementations, that a processing module 2702 is configured to determine a current service state of the second electronic device includes at least one of the following: determining whether the service state is the first service state, where the first service state includes that a current service of the second electronic device is a preset service, and the preset service is a game service or a voice service; and determining which one of the second service state and the third service state is the service state, where the second service state is that an uplink service volume is greater than a downlink service volume, and the third service state is that a downlink service volume is greater than an uplink service volume.

In some possible implementations, the processing module 2702 is further configured to: determine, by using a format of a data frame, whether the service state is the first service state; and determine, by using a data throughput, which one of the second service state and the third service state is the service state.

In some possible implementations, that a processing module 2702 is configured to determine a current service state of the second electronic device includes at least one of the following: determining, based on the data throughput, which one of the first service state, the second service state, and the third service state is the service state, where the first service state is that a difference between an uplink service volume and a downlink service volume falls within a preset range; the second service state is that the uplink service volume is greater than the downlink service volume, and a difference is greater than a preset value; and the third service state is that the downlink service volume is greater than the uplink service volume, and a difference is greater than the preset value.

In some possible implementations, the processing module 2702 is further configured to: when the second electronic device is in the first service state, and the working modes of both the first electronic device and the second electronic device are the third mode, send same data on the 2.4G frequency band and the 5G frequency band.

In some possible implementations, the detection module 2701 is further configured to detect whether communication quality is improved; and the processing module is further configured to: if the communication quality is not improved, switch the working mode to the first mode or the second mode, and send an instruction to indicate the second electronic device to switch the working mode to the first mode or the second mode.

Figure 28:
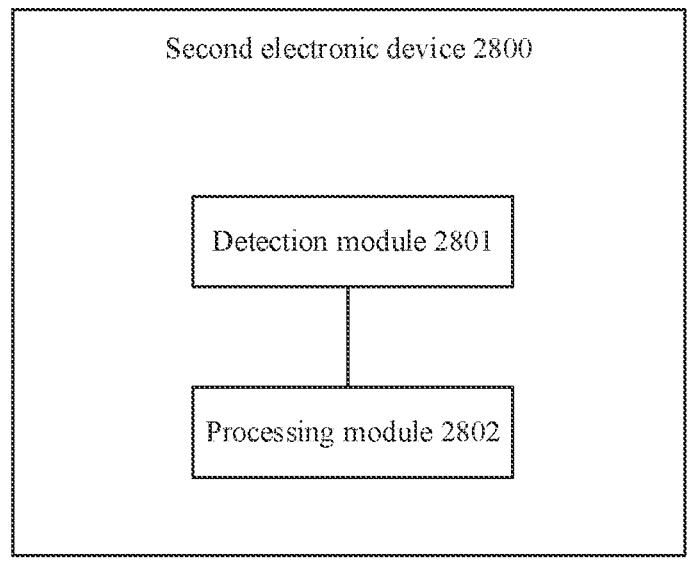
FIG. 28 is a schematic diagram of a structure of a second electronic device according to an embodiment of this application.

FIG. 28 is a schematic diagram of a structure of a second electronic device according to an embodiment of this application. The second electronic device 2800 includes: a detection module 2801, configured to: detect signal strength existing when a first electronic device communicates with the second electronic device, and determine whether the signal strength is less than a preset value, where both the first electronic device and the second electronic device work in a first mode or a second mode, and a processing module 2802, configured to: when the signal strength is less than the preset value, determine a current service state, and determine, based on the current service state, working modes that respectively correspond to the first electronic device and the second electronic device and that are suitable for the current service state, where the determining, based on the service state, working modes that correspond to the first electronic device and the second electronic device includes at least one of the following: if the service state is a first service state, both the working modes respectively corresponding to the first electronic device and the second electronic device are a third mode, where the third mode is sending data on a 2.4G frequency band and a 5G frequency band, and receiving data on the 2.4G frequency band and the 5G frequency band; if the service state is a second service state, the working mode corresponding to the first electronic device is a fifth mode, and the working mode corresponding to the second electronic device is a fourth mode; and if the service state is a third service state, the working mode corresponding to the first electronic device is the fourth mode, and the working mode corresponding to the second electronic device is the fifth mode, where the first mode is sending data on the 5G frequency band, and receiving data on the 5G frequency band, the second mode is sending data on the 2.4G frequency band, and receiving data on the 2.4G frequency band, the fourth mode is sending data on the 2.4G frequency band, and receiving data on the 5G frequency band, and the fifth mode is sending data on the 5G frequency band, and receiving data on the 2.4G frequency band, where the processing module 2802 is further configured to: switch a working mode to the determined working mode that corresponds to the second electronic device and that is suitable for the current service state, and send an instruction to indicate the first electronic device to switch a working mode to the determined working mode that corresponds to the first electronic device and that is suitable for the current service state.

In some possible implementations, that a processing module 2802 is configured to determine a current service state includes at least one of the following: determining whether the service state is the first service state, where the first service state includes a state in which a current service of the second electronic device is a preset service, and the preset service is a game service or a voice service.

In this embodiment, the processing module 2802 is further configured to: determine, by using a format of a data frame, whether the service state is the first service state; and determine, by using a data throughput, which one of the second service state and the third service state is the service state.

In some possible implementations, that a processing module 2802 is configured to determine a current service state includes at least one of the following: determining, based on a data throughput, which one of the first service state, the second service state, and the third service state is the service state, where the first service state is that a difference between an uplink service volume and a downlink service volume falls within a preset range; the second service state is that an uplink service volume is greater than a downlink service volume, and a difference is greater than a preset value; and the third service state is that a downlink service volume is greater than an uplink service volume, and a difference is greater than the preset value.

In some possible implementations, the processing module 2802 is further configured to: when the second electronic device is in the first service state, and the working modes of both the first electronic device and the second electronic device are the third mode, send same data on the 2.4G frequency band and the 5G frequency band.

In some possible implementations, the detection module 2801 is further configured to detect whether communication quality is improved; and the processing module is further configured to: if the communication quality is not improved, switch the working mode to the first mode or the second mode, and send an instruction to indicate the first electronic device to switch the working mode to the first mode or the second mode.

An embodiment of this application further provides an electronic device. The electronic device includes a processor, a memory, and a transceiver. The processor, the memory, and the transceiver are coupled to each other. The memory stores program instructions, and when the program instructions stored in the memory are executed by the processor, the electronic device is enabled to implement the wireless data transmission method.

An embodiment of this application further provides a computer-readable storage medium. The computer storage medium stores a computer program, and the computer program includes program instructions. When the program instructions are executed by a processor, the wireless data transmission method is performed.

An embodiment of this application further provides a chip system. The chip system includes a processor and a data interface. The processor reads, by using the data interface, instructions stored in a memory, to perform the wireless data transmission method provided in the embodiments of this application. In some possible implementations, the chip system may be the Wi-Fi chip provided in some embodiments of this application, and the Wi-Fi chip may include a processor, a switching module, a signal processing module, and the like.

Figure 29:
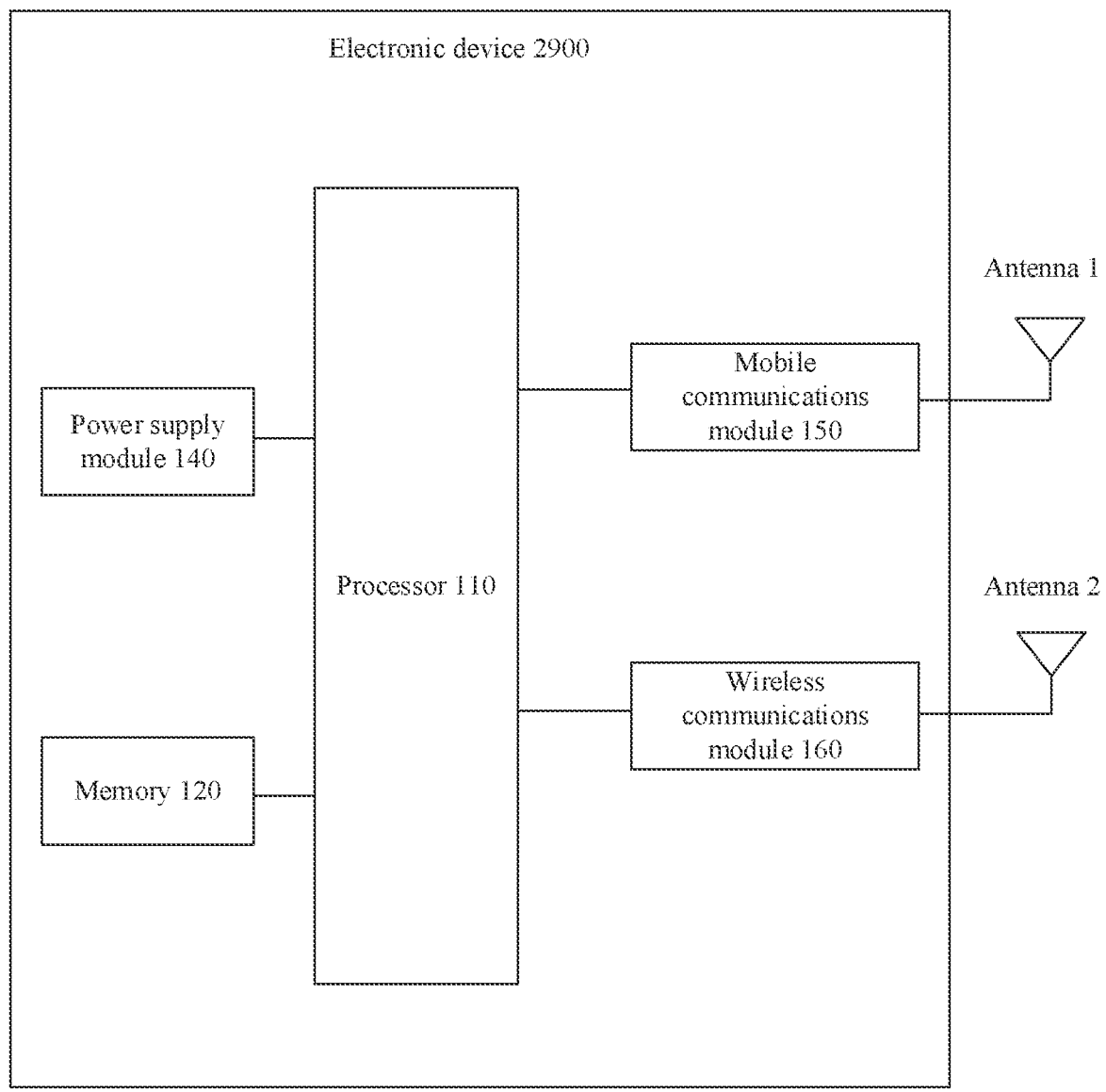
FIG. 29 is a schematic diagram of a structure of an electronic device according to an embodiment of this application.

FIG. 29 is a schematic diagram of a structure of an electronic device in a possible manner according to an embodiment of this application. The electronic device 100 may include a processor 110, a memory 120, a power supply module 140, a mobile communications module 150, and a wireless communications module 160. All of the memory 120, the power supply module 140, the mobile communications module 150, and the wireless communications module 160 are coupled to the processor.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus. USB) interface, and/or the like.

The memory 120 may be configured to store computer-executable program code. The executable program code includes instructions. The memory 120 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the memory 120 may include a high-speed random access memory, and may further include a non-volatile memory, for example, at least one magnetic disk storage device, a flash storage device, a universal flash storage (universal flash storage, UFS), or the like. The processor 110 runs instructions stored in the memory 120 and/or instructions stored in the memory disposed in the processor, to perform various function applications and data processing of the electronic device 100.

The power supply module 140 is configured to supply power to modules such as the processor 110 and the wireless communications module 160. The power supply module 140 may be further configured to monitor parameters such as a battery capacity, a battery cycle count, and a battery state of health (electric leakage and impedance). In some other embodiments, the power supply module 140 may alternatively be disposed in the processor 110.

The mobile communications module 150 may provide a wireless communications solution that includes 2G/3G/4G/5G and the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution that is applied to the electronic device 100 and that includes a wireless local area network (wireless local area network, WLAN) (for example, a wireless fidelity (wireless fidelity, Wi-Fi) network), and may further include a wireless communications solution that includes Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. In some embodiments, at least some functional modules of the wireless communications module 160 may be disposed in a same device as at least some modules of the processor 110. In some embodiments, the wireless communications module 160 may include the Wi-Fi chip provided in some embodiments of this application.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

It may be clearly understood by a person skilled in the art that, for the purpose of convenient and brief description, for a detailed working process of the foregoing system, apparatus, and unit, refer to a corresponding process in the foregoing method embodiments. Details are not described herein again.

It should be understood that, the processor mentioned in a possible implementation may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a discrete gate or a transistor logic device, a discrete hardware component, or the like. The general-purpose processor may be a microprocessor, or the processor may be any conventional processor or the like.

It should be further understood that the memory in a possible implementation may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (random access memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this specification is intended to include but not limited to these memories and any memory of another appropriate type.

It should be further understood that, "first", "second", and various numbers in this specification are merely used for differentiation for ease of description, and are not intended to limit the scope of the embodiments of this application.

In this application, the term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In addition, functional units in the embodiments of this application may be integrated into one processing unit, each of the units may exist alone physically, or two or more units may be integrated into one unit.

Mutual reference may be made to related parts in the method embodiments of the present invention. The apparatuses provided in the apparatus embodiments are configured to perform the methods provided in the corresponding method embodiments. Therefore, for the apparatus embodiments, refer to the related parts in the related method embodiments for understanding.

A name of the message/frame/indication information, module, unit, or the like provided in the embodiments of the present invention is merely an example, and another name may be used provided that the message/frame/indication information, module, unit, or the like has a same function.

Terms used in a possible implementation are merely for the purpose of describing a specific embodiment, and are not intended to limit the present invention. The terms "a", "the" and "this" of singular forms used in the embodiments and the appended claims of the present invention are also intended to include plural forms, unless otherwise specified in the context clearly. It should also be understood that, the term "and/or" used in this specification indicates and includes any or all possible combinations of one or more associated listed items. The character "/" in this specification generally indicates an "or" relationship between the associated objects.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that modifications may still be made to the technical solutions described in the foregoing embodiments or equivalent replacements may still be made to some technical features thereof, without departing from the spirit and scope of the technical solutions of the embodiments of the present invention.

What is claimed is:

1. A wireless data transmission method implemented by a first electronic device, wherein the wireless data transmission method comprises:
   detecting, a signal strength when the first electronic device communicates with a second electronic device;
   determining whether the signal strength is less than a first preset value, wherein the first electronic device and the second electronic device are in a first mode or a second mode, wherein the first mode is sending and receiving data on a 5 gigahertz (G) frequency band, and wherein the second mode is sending and receiving data on a 2.4G frequency band;
   when the signal strength is less than the first preset value;
      determining a current service state of the second electronic device; and
      determining, based on the current service state, working modes that respectively correspond to the first electronic device and the second electronic device and that are suitable for the current service state, wherein determining the working modes comprises at least one of:
         determining that the first electronic device and the second electronic device are in a third mode when the current service state is a first service state, wherein the third mode is sending and receiving data on the 2.4G frequency band and the 5G frequency band;
         determining that the first electronic device is in a fifth mode and the second electronic device is in a fourth mode when the current service state is a second service state, wherein the fifth mode is sending data on the 5G frequency band and receiving data on the 2.4G frequency band, and wherein the fourth mode is sending data on the 2.4G frequency band and receiving data on the 5G frequency band; and determining that the first electronic device is in the fourth mode and the second electronic device is in the fifth mode when the current service state is a third service state;

switching the first electronic device from the first mode or the second mode to a first determined mode that corresponds to the first electronic device, wherein the first determined mode is one of the third mode, the fourth mode, or the fifth mode; and sending a first instruction to indicate to the second electronic device to switch from the first mode or the second mode to a second determined mode that corresponds to the second electronic device, wherein the second determined mode is one of the third mode, the fourth mode, or the fifth mode.

2. The wireless data transmission method of claim 1, further comprising determining whether the current service state is the first service state, wherein the first service state comprises that a current service of the second electronic device is a preset service, and wherein the preset service is a game service or a voice service.

3. The wireless data transmission method of claim 1, further comprising at least one of:
  determining, using a format of a data frame, whether the current service state is the first service state; or
  determining, using a data throughput, whether the current service state is one of the second service state or the third service state.

4. The wireless data transmission method of claim 3, further comprising further determining, based on the data throughput, whether the current service state is one of the first service state, the second service state, or the third service state, wherein the first service state comprises that a difference between an uplink service volume and a downlink service volume falls within a preset range, wherein the second service state comprises that the uplink service volume is greater than the downlink service volume and the difference is greater than a second preset value, and wherein the third service state comprises that the downlink service volume is greater than the uplink service volume and the difference is greater than the second preset value.

5. The wireless data transmission method of claim 1, comprising sending same data on the 2.4G frequency band and the 5G frequency band when the second electronic device is in the first service state and both the first electronic device and the second electronic device are in the third mode.

6. The wireless data transmission method of claim 1, wherein after switching the first electronic device and sending the first instruction, the wireless data transmission method further comprises:
  detecting whether communication quality is improved;
  maintaining the first determined mode to perform data transmission when the communication quality is improved; and
  performing when the communication quality does not improve:
    switching the first determined mode to the first mode or the second mode; and
    sending a second instruction to indicate to the second electronic device to switch the determined mode to the first mode or the second mode.

7. The wireless data transmission method of claim 1, further comprising determining whether the current service state is one of the second service state or the third service state, wherein the second service state comprises that an uplink service volume is greater than a downlink service volume, and wherein the third service state comprises that the downlink service volume is greater than the uplink service volume.

8. A wireless data transmission method implemented by a second electronic device, wherein the method comprises:
  detecting a signal strength when a first electronic device communicates with the second electronic device, wherein both the first electronic device and the second electronic device are in a first mode or a second mode, wherein the first mode is sending and receiving data on a 5 gigahertz (G) frequency band, and wherein the second mode is sending and receiving data on a 2.4G frequency band;
  determining whether the signal strength is less than a first preset value;
  when the signal strength is less than the first preset value:
    determining a current service state; and
    determining, based on the current service state, working modes that respectively correspond to the first electronic device and the second electronic device and that are suitable for the current service state,
    wherein determining the working modes comprises at least one of:
      determining that the first electronic device and the second electronic device are in a third mode when the current service state is a first service state, wherein the third mode is sending and receiving data on the 2.4G frequency band and the 5G frequency band;
      determining that the first electronic device is in a fifth mode and the second electronic device is in a fourth mode when the current service state is a second service state, wherein the fourth mode is sending data on the 2.4G frequency band and receiving data on the 5G frequency band, and wherein the fifth mode is sending data on the 5G frequency band and receiving data on the 2.4G frequency band;
      determining that the first electronic device is in the fourth mode and the second electronic device is in the fifth mode when the current service state is a third service state;
  sending a first message to the first electronic device to determine whether the first electronic device supports a first determined mode that corresponds to the second electronic device, wherein the first determined mode is one of the third mode, the fourth mode, or the fifth mode;
  receiving a second message from the first electronic device in response to the first message;
  switching, based on the second message, the second electronic device from the first mode or the second mode to the first determined mode when the first electronic device supports the first determined mode; and
  sending an instruction to indicate the first electronic device to switch to a second determined mode that corresponds to the first electronic device, wherein the second determined mode is one of the third mode, the fourth mode, or the fifth mode.

9. The wireless data transmission method of claim 8, further comprising determining whether the current service state is the first service state, wherein the first service state comprises a state in which a current service of the second electronic device is a preset service, and wherein the preset service comprises a game service or a voice service; or determining whether the current service state is one of the second service state or the third service state, wherein the second service state comprises that an uplink service volume is greater than a downlink service volume, and wherein the third service state is that a downlink service volume is greater than an uplink service volume.

10. The wireless data transmission method of claim 8, further comprising determining, based on a data throughput, whether the current service state is one of the first service state, the second service state, or the third service state, wherein the first service state comprises that a difference between an uplink service volume and a downlink service volume falls within a preset range, wherein the second service state comprises that the uplink service volume is greater than the downlink service volume and the difference is greater than a second preset value, and wherein the third service state comprises that the downlink service volume is greater than the uplink service volume and the difference is greater than the second preset value.

11. The wireless data transmission method of claim 8, further comprising:
  determining, based on the second message, whether the first electronic device supports the fourth mode or the fifth mode in a first state;
  sending, when the first electronic device supports the fourth mode or the fifth mode in the first state, a third message to the first electronic device to determine whether the first electronic device supports the fourth mode or the fifth mode in a second state; and
  receiving a fourth message from the first electronic device in response to the second message.

12. The wireless data transmission method of claim 11, further comprising:
  determining, based on the fourth message, whether the first electronic device supports the fourth mode or the fifth mode in the second state; and
  performing one of:
    further switching to the fourth mode or the fifth mode in the first state when the first electronic device does not support the fourth mode or the fifth mode in the second state; or
    further switching to the fourth mode or the fifth mode in the second state when the first electronic device supports the fourth mode or the fifth mode in the second state.

13. The wireless data transmission method of claim 11, wherein the first state is a half-duplex data transmission manner, and wherein the second state is a full-duplex data transmission manner.

14. The wireless data transmission method of claim 11, wherein the current service state is the second service state or the third service state.

15. A first electronic device comprising:
  a memory configured to store instructions; and
  a processor coupled to the memory and configured to execute the instructions to cause the first electronic device to:
    detect a signal strength when the first electronic device communicates with a second electronic device, wherein both the first electronic device and the second electronic device work in a first mode or a second mode, wherein the first mode is sending and receiving data on a 5 gigahertz (G) frequency band, wherein the second mode is sending and receiving data on a 2.4G frequency band;
    determine whether the signal strength is less than a first preset value;
    when the signal strength is less than the first preset value:
      determine a current service state of the second electronic device; and
      determine, based on the current service state, working modes that respectively correspond to the first electronic device and the second electronic device and that are suitable for the current service state,
      wherein determining the working modes comprises at least one of:
        determine that the first electronic device and the second electronic device are in a third mode when the current service state is a first service state, wherein the third mode is sending and receiving data on the 2.4G frequency band and the 5G frequency band;
        determine that the first electronic device is in a fifth mode and the second electronic device is in a fourth mode when the current service state is a second service state,
        wherein the fourth mode is sending data on the 2.4G frequency band and receiving data on the 5G frequency band, and wherein the fifth mode is sending data on the 5G frequency band and receiving data on the 2.4G frequency band; and
        determine the first electronic device is in the fourth mode and the second electronic device is in the fifth mode when the current service state is a third service state;
    switch the first electronic device from the first mode or the second mode to a first determined mode that corresponds to the first electronic device, wherein the first determined mode is one of the third mode, the fourth mode, or the fifth mode; and
    send an instruction to indicate to the second electronic device to switch the second electronic device from the first mode or the second mode to a second determined mode that corresponds to the second electronic device.

16. The first electronic device of claim 15, wherein the processor is further configured to execute the instructions to cause the first electronic device to perform at least one of:
  determine whether the current service state is the first service state, wherein the first service state comprises that a current service of the second electronic device comprises a preset service, and wherein the preset service comprises a game service or a voice service; or
  determine whether the current service state is one of the second service state or the third service state, wherein the second service state comprises that an uplink service volume is greater than a downlink service volume, and wherein the third service state comprises that the downlink service volume is greater than the uplink service volume.

17. The first electronic device of claim 15, wherein the processor is further configured to execute the instructions to cause the first electronic device to perform at least one of:
  determine, using a format of a data frame, whether the current service state is the first service state; or
  determine, using a data throughput, whether the current service state one of the second service state and the third service state.

18. The first electronic device of claim 15, wherein the processor is further configured to execute the instructions to cause the first electronic device to determine, based on a data throughput, whether the current service state is one of the first service state, the second service stat, or the third service state, wherein the first service state comprises that a difference between an uplink service volume and a downlink service volume falls within a preset range, wherein the second service state comprises that the uplink service volume is greater than the downlink service volume and the difference is greater than a second preset value, and wherein the third service state comprises that the downlink service volume is greater than the uplink service volume and the difference is greater than the second preset value.

19. The first electronic device of claim 15, wherein the processor is further configured to execute the instructions to cause the first electronic device to send same data on the 2.4G frequency band and the 5G frequency band when the second electronic device is in the first service state and the working modes are the third mode.

20. The first electronic device of claim 15, wherein after switching the first electronic device and sending the instruction, the processor is further configured to cause the first electronic device to:
  detect whether communication quality is improved;
  maintain the first determined mode to perform data transmission when the communication quality is improved; and
  when the communication quality does not improve:
    switch the first determined mode to the first mode or the second mode; and
    send a second instruction to indicate to the second electronic device to switch to the first mode or the second mode.

* * * * *